US012311386B2

(12) United States Patent
Kim et al.

(10) Patent No.: US 12,311,386 B2
(45) Date of Patent: May 27, 2025

(54) DEVICE AND METHOD FOR MANAGING FINE PARTICLE CONCENTRATION

(71) Applicant: AETHER, INC., Daejeon (KR)

(72) Inventors: Jaehyun Kim, Daejeon (KR); Sang Won Lee, Daejeon (KR); Inshik Bae, Daejeon (KR)

(73) Assignee: AETHER, INC., Daejeon-si (KR)

( * ) Notice: Subject to any disclaimer, the term of this patent is extended or adjusted under 35 U.S.C. 154(b) by 652 days.

(21) Appl. No.: 17/520,528

(22) Filed: Nov. 5, 2021

(65) Prior Publication Data

US 2022/0072562 A1 Mar. 10, 2022

Related U.S. Application Data

(63) Continuation-in-part of application No. PCT/KR2020/005123, filed on Apr. 16, 2020.

(30) Foreign Application Priority Data

May 17, 2019 (KR) ........................ 10-2019-0058287

(51) Int. Cl.
*B05B 5/03* (2006.01)
*B03C 3/16* (2006.01)
(Continued)

(52) U.S. Cl.
CPC .................. *B03C 3/16* (2013.01); *B03C 3/53* (2013.01); *B03C 3/68* (2013.01); *B05B 5/025* (2013.01); *B05B 5/032* (2013.01)

(58) Field of Classification Search
CPC .. B05B 5/025; B03C 3/16; B03C 3/53; B03C 3/68
See application file for complete search history.

(56) References Cited

U.S. PATENT DOCUMENTS 3,958,959 A 5/1976 Cohen et al.
4,072,477 A 2/1978 Hanson et al.
(Continued)

FOREIGN PATENT DOCUMENTS

CN 102105231 A 6/2011
CN 102671506 A 9/2012
(Continued)

OTHER PUBLICATIONS

High Voltage Technology, Issue 02, Feb. 28, 2017 Wang Junfeng et al., Experimental study on the influence of spray charging characteristics in the induction charging process, pp. 514-519.
(Continued)

*Primary Examiner* — Tuongminh N Pham
(74) *Attorney, Agent, or Firm* — WTA Patents

(57) ABSTRACT

One aspect of the present invention relates to a device for managing a fine particle concentration of a target region by supplying charges to a target region, the device comprising: a container configured to store liquid, at least one nozzle configured to output the liquid, a pump configured to supply the liquid from the container to the at least one nozzle, a power supply configured to supply power to the device, and a controller configured to supply the charges to the target region through the at least one nozzle by using the power supply, wherein the controller is configured to, by using the power supply, apply a voltage equal to or greater than a reference value to the at least one nozzle, and provide electric force in a direction away from the device to the fine particles in the target region charged by the supplied charges.

6 Claims, 49 Drawing Sheets

(51) Int. Cl.

| | |
|---|---|
| ***B03C 3/53*** | (2006.01) |
| ***B03C 3/68*** | (2006.01) |
| ***B05B 5/025*** | (2006.01) |

(56) References Cited

U.S. PATENT DOCUMENTS

| | | | | |
|---|---|---|---|---|
| RE30,479 | E | 1/1981 | Cohen et al. | |
| 4,670,026 | A | 6/1987 | Hoenig | |
| 4,764,188 | A | 8/1988 | Porle et al. | |
| 6,471,753 | B1 | 10/2002 | Ahn et al. | |
| 8,241,562 | B1 * | 8/2012 | Betty | A62D 3/38 422/4 |
| 9,138,760 | B2 * | 9/2015 | Cooper | B05B 5/043 |
| 10,894,262 | B1 * | 1/2021 | Cooper | B05B 5/1691 |
| 2003/0196552 | A1 | 10/2003 | Willey et al. | |
| 2004/0139853 | A1 | 7/2004 | Bologa et al. | |
| 2007/0256922 | A1 | 11/2007 | Ahn | |
| 2011/0186646 | A1 * | 8/2011 | Tsuji | B05B 5/0533 239/3 |
| 2014/0090562 | A1 | 4/2014 | Choi et al. | |

FOREIGN PATENT DOCUMENTS

| | | | |
|---|---|---|---|
| CN | 104169656 | A | 11/2014 |
| CN | 106256057 | A | 12/2016 |
| CN | 107175169 | A | 9/2017 |
| CN | 108883385 | A | 11/2018 |
| GB | 556939 | A | 10/1943 |
| JP | H 0794022 | A | 4/1995 |
| JP | H07-094022 | B | 10/1995 |
| JP | 2005-230568 | A | 9/2005 |
| JP | 2006-212588 | A | 8/2006 |
| JP | 2010-155200 | A | 7/2010 |
| JP | 2018-012068 | A | 1/2018 |
| JP | 2019053957 | A | 4/2019 |
| KR | 2005-0030335 | A | 3/2005 |
| KR | 10-2007-0090438 | A | 9/2007 |
| KR | 10-2009-0104404 | A | 10/2009 |
| KR | 10-2015-0024311 | A | 3/2015 |
| WO | WO 2013-161476 | A1 | 10/2013 |

OTHER PUBLICATIONS

High Voltage Technology, Issue 05 May 31, 2008 Wang Zhentao et al., High Voltage Electrostatic Liquid Atomization Technology p. 1067-1072.

Notice of Allowance of CN Patent Application No. 202080049758.8.

Korean Intellectual Property Office, Office Action, KR Patent Application No. 10-2019-0061501, Oct. 10, 2019, 32 pages.

PCT International Search Report, PCT Application No. PCT/KR2020/005123, Jul. 24, 2020, five pages.

PCT Written Opinion, PCT Application No. PCT/KR2020/005123, Jul. 24, 2020, five pages.

Intellectual Property Office of Singapore, Search Report, Singaporean Application No. 11202112717Y, Dec. 5, 2022, two pages.

* cited by examiner

1000

DEVICE AND METHOD FOR MANAGING FINE PARTICLE CONCENTRATION

CROSS-REFERENCE TO RELATED APPLICATIONS

This application is a bypass continuation-in-part application of PCT International Application No. PCT/KR2020/005123, filed on Apr. 16, 2021, which claims priority to Republic of Korea Patent Application No. 10-2019-0058287, filed on May 17, 2019, which are incorporated by reference herein in their entirety.

TECHNICAL FIELD

The present disclosure relates to a device for managing a fine particle concentration, and more particularly, relates to a device for managing a fine particle concentration by causing electric force to act on a target region.

BACKGROUND ART

Recently, there has been a risk of harmful components in the air due to development of manufacturing industry and increase in industrial waste. In particular, fine dust or ultra-fine dust moving in the wind is not sufficiently filtered despite wearing masks, which may cause serious respiratory diseases to vulnerable groups, for example, children and the elderly.

In the related art, an air circulation and collection method sucks ambient air containing fine dust and performs non-selective treatment, which has low energy efficiency. In addition, purified clean air is mixed with polluted air and only the same air is purified in the same place. When a high-density filter is used, a fine-dust removal rate is increased, but pressure loss is large.

In the related art, reactant sprinkling methods include a watering method and an artificial rainfall method. The watering method provides low ultra-fine dust reduction effect even though a large amount of water is sprinkled. In addition, the artificial rain rainfall method in the related art requires high rainfall for fine-dust removal effect. In the present disclosure, there is provided a method for overcoming such problems and reducing a concentration of harmful substances in the air.

SUMMARY

The present disclosure is directed to providing a device and a method for managing air quality over a large region efficiently.

In addition, the present disclosure is directed to providing a device and a method for reducing a concentration of particles of a predetermined size or smaller in the air.

Technical problems to be solved by the present disclosure are not limited to the aforementioned technical problems and other technical problems which are not mentioned will be clearly understood by those skilled in the art from the present disclosure and the accompanying drawings.

According to one aspect of the present invention, a device for managing a fine particle concentration of a target region by supplying charges to a target region may be provided, the device comprising: a container configured to store liquid, at least one nozzle configured to output the liquid, a pump configured to supply the liquid from the container to the at least one nozzle, a power supply configured to supply power to the device, and a controller configured to supply the charges to the target region through the at least one nozzle by using the power supply, wherein the controller is configured to, by using the power supply, apply a voltage equal to or greater than a reference value to the at least one nozzle, and provide electric force in a direction away from the device to fine particles charged by the supplied charges, wherein the electric force provided to the fine particles is provided by electric field formed by the charges supplied to the target region, and wherein the fine particles in the target region are charged with the same polarity as the supplied charges by the supplied charges.

According to another aspect of the present invention, a device for managing a fine particle concentration of a target region by supplying charges to a target region may be provided, the device comprising: a container configured to store liquid, at least one nozzle configured to output the liquid, a pump configured to supply the liquid from the container to the at least one nozzle, a power supply configured to supply power to the device, a controller configured to supply a charged substance to the target region through the at least one nozzle by using the power supply, and a particle dispersion unit configured to provide non-electric force to the charged substance, wherein the controller is configured to, by using the power supply, output charged droplets through the at least one nozzle by applying a voltage equal to or greater than a first reference value to the at least one nozzle.

According to yet another aspect of the present invention, a method for managing a concentration of fine particles in a target region by using a charge supplying device may be provided, wherein the device comprises a container configured to store liquid, at least one nozzle configured to output the liquid, a pump configured to supply the liquid from the container to the at least one nozzle, a power supply configured to supply power and a controller configured to supply charges to the target region through the at least one nozzle by using the power supply, the method comprising: applying, by the controller, a voltage equal to or greater than a first reference value to the at least one nozzle by using the power supply, supplying, by the controller, the liquid to the at least one nozzle by using the pump, generating charged droplets through the at least one nozzle and supplying charges to the target region, by the controller, by using the power supply and the pump, and by the controller, charging the fine particles in the target region by forming space charge in the target region, and providing electric force at least partially including a component directed away from the device to the fine particles charged with the same polarity as the supplied charges by the charges supplied to the target region.

According to yet another aspect of the present invention, a method for managing a concentration of fine particles in a target region by using a charge supplying device may be provided, wherein the device comprises a container configured to store liquid, at least one nozzle configured to output the liquid, a pump configured to supply the liquid from the container to the at least one nozzle, a power supply configured to supply power, a controller configured to supply a charged substance to the target region through the at least one nozzle by using the power supply, and a particle dispersion unit configured to provide non-electric force to the charged substance, the method comprising: applying, by the controller, a voltage to the at least one nozzle by using the power supply, supplying, by the controller, the liquid to the at least one nozzle by using the pump, generating charged droplets through the at least one nozzle and supplying charges to the target region, by the controller, by using the power supply and the pump, and providing, by the controller, non-electric force to the charged substance located near one end of the nozzle where the liquid is generated with a direction away from the one end by using the particle dispersion unit.

Technical solutions in the present disclosure may not be limited to the above, and other not-mentioned technical solutions will be clearly understandable to those skilled in the art from the present disclosure and the accompanying drawings.

According to the present disclosure, a device and a method for managing air quality over a large region efficiently can be provided.

According to the present disclosure, a device and a method for managing outdoor air quality can be provided.

According to the present disclosure, a device and a method for managing air quality in an eco-friendly manner can be provided.

According to the present disclosure, a device and a method for reducing a concentration of particles of a predetermined size or smaller in the air can be provided.

Effects of the present disclosure are not limited to the aforementioned effects, and other effects which are not described herein should be clearly understood by those skilled in the art from the present disclosure and the accompanying drawings.

DETAILED DESCRIPTION

Figure 1:
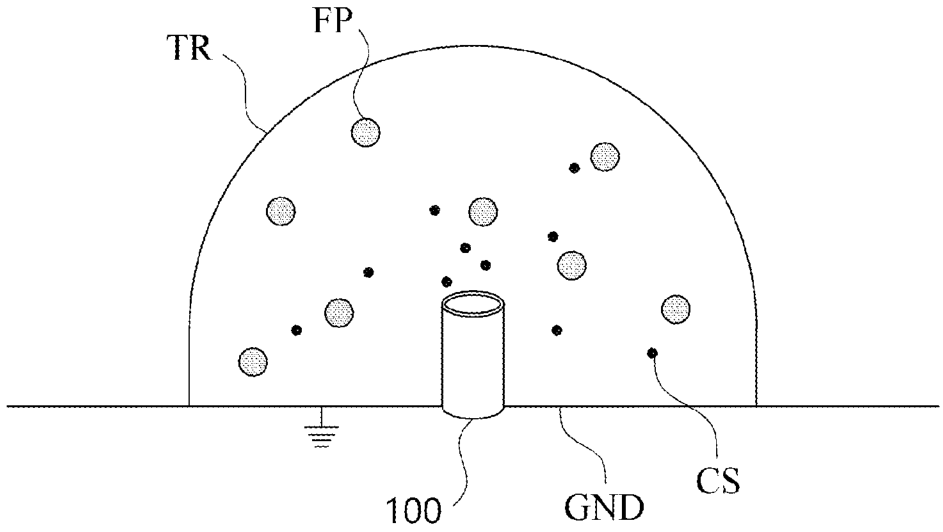
FIG. 1 is a diagram illustrating an operation of reducing a particle concentration according to the present disclosure.

The above-described objectives, features, and advantages of the present disclosure will be more apparent from the following description in conjunction with the accompanying drawings. The present disclosure may be modified in various ways and implemented by various embodiments, so that specific embodiments are shown in the drawings and will be described in detail.

In the drawings, the thicknesses of layers and regions are exaggerated for clarity. In addition, it should be understood that when an element or layer is referred to as being on another element or layer, it may be disposed directly on the other element or layer or may be disposed on the other element with an intervening layer or element therebetween. Throughout the disclosure, the same reference numerals denote the same elements in principle. In addition, in the drawings of each embodiment, the elements having the same function within the same scope are described using the same reference numerals.

When it is determined that a detailed description of a known function or configuration related to the present disclosure may make the gist of the present disclosure unclear, the detailed description thereof will be omitted. In addition, the numbers (for example, first, second, etc.) used in describing the present disclosure are only identification symbols for distinguishing one element from other elements.

In addition, the words "module" and "unit" for elements used in the following description are given or mixed and used considering only easiness in preparing a disclosure, and do not have a meaning or role distinguished from each other in themselves.

A method according to an embodiment may be realized as program instructions executable by various computer means and may be recorded on a computer-readable medium. The computer-readable medium may include program instructions, data files, data structures, and the like separately or in combinations. The program instructions recorded on the medium may be specially designed and configured for the present disclosure or may be well-known to and usable by those skilled in the art of computer software. Examples of the computer-readable recording medium include: magnetic media such as hard disks, floppy disks, and magnetic tapes; optical media such as CD-ROMs, and DVDs; magneto-optical media such as floptical disks; and hardware devices, such as ROM, RAM, and flash memory, which are particularly structured to store and execute program instructions. Examples of the program instructions may include mechanical language codes made by a compiler, as well as high level language codes executable by a computer using an interpreter, etc. The above-described hardware devices may be configured to act as one or more software modules in order to perform the operation of an embodiment, or vice versa.

1. SUMMARY

1.1 Purpose

In the present disclosure, a method, a device, and a system for reducing a concentration of particles floating in the air in a target region, by using an electric field will be described with reference to some embodiments. Hereinafter, a method, a device, and a system for reducing a concentration of target particles in a target region by releasing charged particles will be described with reference to some embodiments.

When microparticles are floating in the air in a large target region, it may be difficult to remove the microparticles with chemical or physical methods. For example, when fine dust of a predetermined size (for example, PM 2.5) or less is distributed at a predetermined concentration or greater in a target region, the effect of purifying ultra-fine dust through watering treatment is extremely small. When the target region is large, the efficiency of purification using a filter may be significantly reduced. Hereinafter, a method, a device, and a system that may be used for wide-area air quality management in various environments including the case exemplified herein will be described with reference to some embodiments.

1.2 Summary of Operation

A method, a device, and a system for reducing a density of particles floating in the air in a target region, which are described in the present disclosure, forcibly move particles from the target region by using an electrostatic phenomenon, thereby obtaining the desired density reduction effect. Herein, an example of such an operation of reducing a particle concentration will be described.

The operation of reducing a particle concentration described in the present disclosure may include releasing charged fine droplets to a target region in order to reduce the distribution concentration of target particles in the target region (or target space). The operation of reducing the particle concentration may include forming an electric field in the target region by releasing the charged fine droplets to the target region. The operation of reducing the particle concentration may include maintaining the electric field in the target region such that the target particles having the same charges as the droplets are pushed out of the target region.

FIGS. 1 to 5 are diagrams illustrating an operation of reducing a particle concentration according to the present disclosure. Referring to FIGS. 1 to 5, the operation of reducing the particle concentration, which is described in the present disclosure, may be performed by a device 100 for forming an electric field.

Referring to FIG. 1, the operation of reducing the particle concentration, which is described in the present disclosure, may include supplying a charged substance CS by the device 100. The device 100 may release or generate the charged substance CS. The supplying of the charged substance CS by the device 100 may be performed using various methods.

For example, the device 100 may spatter or spray charged droplets. The device 100 may spray the charged droplets to the outside thereof using electrostatic repulsion or physical force. For example, the device 100 may generate the charged droplets using an electrospray or electrostatic spray.

As another example, the device 100 may supply the charged substance CS using a discharge means such as a corona discharge electrode. The device 100 may generate charged droplets using the discharge means such as a corona discharge electrode.

The droplets generated by the device 100 may be generated to have a size in a predetermined range. For example, the droplets may be generated to have an average diameter between several tens of nm and several hundreds of nm.

The droplets generated by the device 100 may mean the liquid that has the form of droplets after being separated from liquid bulk released from a nozzle of the device 100. The size of the droplets generated by the device 100 may mean the size immediately after the droplets are generated. In other words, the device 100 may generate droplets of which the average diameter is several μm immediately after their generation. The droplets generated by the device 100 may change in size because of evaporation. For example, the droplets generated by the device 100 may decrease in diameter from approximately several μm to several nm.

The device 100 may supply a charged substance CS to the atmosphere. According to an embodiment, the device 100 may release charged droplets to the atmosphere. The device 100 may release the charged droplets at an interface between liquid and outside. The interface between liquid and outside may be an interface at which liquid and the space outside the device 100 meet. The interface between liquid and outside may be an interface between liquid and the inside of a chamber provided in the device 100.

The charged substance CS supplied to the device 100 may be charges, ions, or a liquid or solid substance containing the charges or ions supplied from the device. For example, the charged substance CS may be negatively or positively charged ions. Alternatively, the charged substance CS supplied to the device 100 may include a charge transfer substance that obtains charges supplied by the device and transfers the same to fine particles FPs.

According to an embodiment, the device 100 may output charged droplets.

The droplets generated by the device 100 may be in a charged state. The charged droplets may mean liquid drops having negative or positive charges. The charged droplets may mean droplets containing a negatively or positively charged substance. The charged droplets may mean droplets of a solution containing a negatively or positively charged substance.

The droplets generated by the device 100 may be liquid drops containing a charged substance and liquid (or solvent). The droplets may be liquid drops containing charged ions and solvent. The droplets may be negatively and/or positively charged. The droplets may contain negatively and/or positively charged ions. The droplets may contain both negative and positive charges, but may contain negative or positive charges more.

The droplets generated from the device may be split (exploded). For example, the droplets containing the charged substance and solvent may decrease in size (or volume or mass) because of evaporation. As the size of the droplets decreases, the electric force may be greater than the surface tension of the droplets. As the size of the droplets decreases, the electrostatic repulsive force cancels the surface tension of the droplets and thus the droplets are subjected to fission. When the droplets are subjected to fission, a number of smaller droplets are generated.

The operation of reducing the particle concentration, which is described in the present disclosure, may include transferring, by the device 100 through the charged substance CS, charges directly or indirectly to the fine particles FPs floating in the air.

According to an embodiment, the device 100 may at least partially transfer, through charged droplets, charges to a charge transfer substance or fine particles FPs in the air. The droplets may provide charges indirectly to the fine particles FPs through the charge transfer substance. The droplets may provide charges directly to the fine particles FPs. The indirect or direct transfer of the droplets or charges may occur complexly.

The device 100 may charge, through the charged droplets, at least some of the fine particles FPs in the target region TR such that the fine particles FPs have negative or positive charges. For example, when the droplets released from the device 100 are negatively charged, the droplets transfer negative charges directly or indirectly to the fine particles FPs. For example, the droplets may come into contact with the fine particles FPs to transfer negative charges directly, or may come into contact with the fine particles FPs to transfer charges to the charge transfer substance transferring negative charges.

The fine particles FPs may be charged by receiving negative charges or positive charges from the charged substance CS supplied by the device 100, for example, charged droplets or charge transfer components in the air that have received charges from charged droplets.

The charge transfer substance may mean a substance that carries electrons or charges. The charge transfer substance may mean a substance that receives charges contained in the released droplets and transfers the charges directly or indirectly to the fine particles FPs. According to an embodiment, the charge transfer substance may be a gas substance constituting the air in the target region TR. Alternatively, the charge transfer substance may be the substance obtaining the droplets or a charged substance contained in the droplets. The charge transfer substance may be a substance that the device 100 does not provide. Alternatively, the charge transfer substance may be separately provided by the device 100. The charge transfer substance may mean a substance, particles, molecules, or ions included in the target region TR. For example, the charge transfer substance may be molecules of a predetermined substance (for example, oxygen molecules) floating in the target region.

The target region TR may mean a region or space in which the distribution concentration of the fine particles FPs is to be reduced. The target region TR may mean a 3D space. The target region TR may be a space defined by a physical boundary. The target region TR may be a space defined by a virtual boundary. The target region TR may be a region defined as having a predetermined geometric shape with the device in the center. For example, the target region TR may be a region in a hemispherical shape having a predetermined radius or in a deformed hemispherical shape, both with the device in the center.

The distribution concentration of the fine particles FPs may mean the mass of the fine particles FPs contained in the air of a unit volume. Alternatively, the distribution concentration of the fine particles FPs may mean the volume of fine particles FPs contained in the air of a unit volume. The distribution concentration of the fine particles FPs may be replaced by another parameter that indicates the degree to which the fine particles FPs are contained in a predetermined volume.

According to an embodiment, the operation of reducing the fine particle concentration, which is described in the present disclosure, may include spraying the droplets in the form of electrospray by the device 100. Hereinafter, spraying the droplets through electrospray will be described with reference to FIG. 2.

Figure 2:
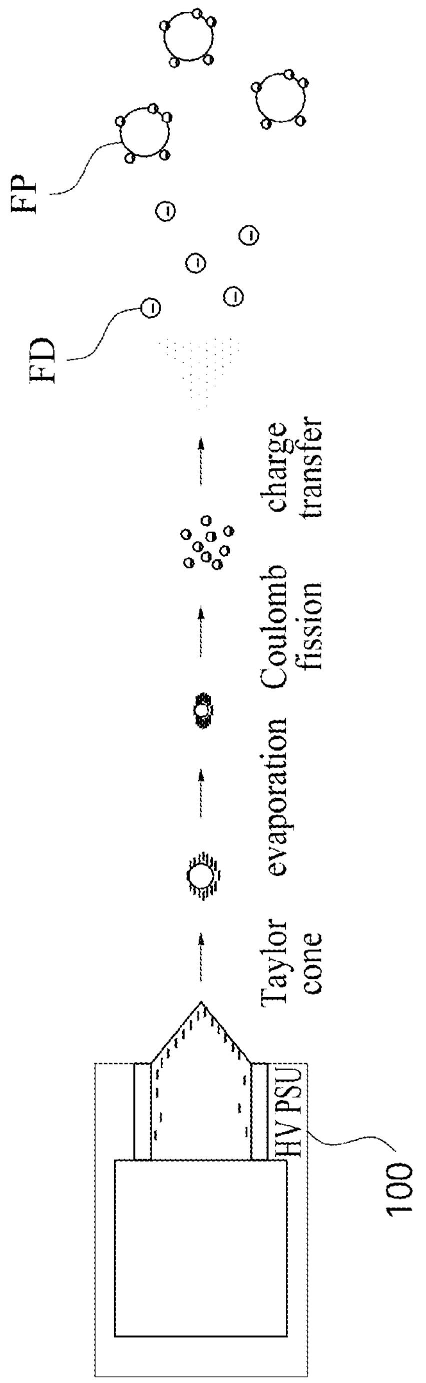
FIG. 2 is a diagram illustrating an operation of reducing a particle concentration according to the present disclosure.

Referring to FIG. 2, as liquid is supplied to a nozzle of a device 100 according to an embodiment and a voltage is applied to the nozzle, electrostatic repulsion acts on the liquid at the nozzle end. In other words, as a voltage is applied to the nozzle, polarization occurs in the liquid (or the substance contained in the liquid) inside the nozzle, and in proportion to the degree of polarization, repulsion acts between polarized pieces of a substance. For example, when a negative (−) voltage is applied to the nozzle, polarization occurs with respect to the ions in the liquid, so that positive (+) ions approach the surface of the nozzle by attraction and negative (−) ions move in a direction away from the surface of the nozzle by repulsion. As such repulsion intensifies, the liquid containing negative (−) ions may separate in the form of droplets.

As the voltage is applied to the nozzle, the electrostatic repulsion forms a Taylor cone at the nozzle end. As a voltage is applied to the nozzle, when repulsion at a predetermined level or higher acts on the polarized liquid at the nozzle end, the liquid separated from the end forms droplets. The separated droplets are accelerated by the electric field, thus forming a jet.

Referring to FIG. 2, when the volume of droplets released from the nozzle is reduced because of evaporation, a number of children droplets or fine droplets FDs are generated by fission (Coulomb fission). In other words, as the size of droplets decreases, when the droplets reach the Rayleigh limit, the droplets are subjected to Coulomb fission. The droplets are subjected to fission and a spray of fine droplets FDs is formed.

The droplets or fine droplets FDs may at least partially transfer charges to the charge transfer substance or fine particles FPs in the air. For example, the droplets may at least partially transfer negative charges to the charge transfer substance in the air, for example, oxygen molecules in the air. The oxygen molecules may receive the negative charges from the droplets and may at least partially transfer negative charges to the fine particles FPs in the air. Alternatively, the droplets or children droplets may directly transfer negative charges to the fine particles FPs.

In the meantime, the electrospray described with reference to FIG. 2 is only an example, and the present disclosure is not limited thereto. The present disclosure may be realized using another form of a charge release method rather than electrospray.

According to an embodiment, the device may release the droplets in the form of electrostatic spray. For example, unlike the electrospray as described above an example in which the droplets are released by electric repulsive force, electrostatic spray in which the droplets are formed by non-electric force, such as physical force, may generate the droplets. Even in the case of using the electrostatic spray, a high voltage is applied to the nozzle so that the liquid is charged, and the droplets may be formed by vibration caused by ultrasonic waves, or by spraying gas.

According to another embodiment, the device 100 may release a substance having charges in another form rather than droplets. The substance released from the device 100 will suffice as long as it can form an electric field with charges, and does not necessarily have to be released in the form of fine droplets. The substance released from the device 100 may be in a form other than the droplets, which has charges, transfers charges to the fine particles FPs distributed in the space, and affects the fine particles FPs. For example, the substance released from the device 100 may be discharged charges or ions having charges.

The operation of reducing the particle concentration, which is described in the present disclosure, may include outputting a current to the target region TR by the device 100. The device 100 may output a current to the target region TR through the above-described droplets. The outputting of the current by the device 100 may mean that negative or positive charges are released from the device 100. For example, the outputting of the current by the device 100 may mean that the droplets released from the device 100 are released having negative or positive charges.

According to an embodiment, the device 100 may output a current to the target region TR by using electrospray shown in FIG. 2. The device 100 may output negatively or positively charged droplets through electrospray, thus outputting a current of a positive (+) or negative (−) value.

The operation of reducing the particle concentration, which is described in the present disclosure, may include at least partially charging the fine particles FPs in the target region TR. The fine particles FPs in the target region TR may directly or indirectly obtain at least some of the charges released from the device.

The fine particles FPs may be understood as the term covering small-sized particles. The fine particles FPs may mean particles of a particular type to be removed. The fine particles FPs may be dust particles floating in the air in the target region TR. The fine particles FPs may mean total dust (TSP, Total Suspended Particles), fine dust (PM, Particulate Matter), and/or ultra-fine dust (PM 2.5 or less). The fine particles FPs may be understood as ultra-fine dust of a predetermined size or less (for example, PM 2.5, or 2.5 μm or less in diameter). The fine particles FPs may be understood as a floating substance that is a harmful substance in the target region TR and is intended to be reduced in concentration.

The fine particles FPs may contain one or more among an ion component, a carbon component, and a metal component. For example, the fine particles FPs may contain an ion component such as a chlorine ion (Cl−), nitrate (NO3−), ammonium (NH4+), sulfate (SO4 2−), or a sodium ion (Na+). The fine particles FPs may contain a metal component, such as chromium (Cr), beryllium (Be), arsenic (As), cadmium (Cd), iron (Fe), zinc (Zn), or titanium (Ti).

The fine particles FPs may come into contact with or be combined with a charged substance, a charge transfer substance, or fine droplets. The fine particles FPs may receive charges from a charged substance, a charge transfer substance, or fine droplets.

The device 100 may charge the fine particles FPs. The fine particles FPs may be charged by a field charging mechanism or a diffusion charging mechanism. In other words, the fine particles FPs may be charged by the field charging mechanism in which charged particles moved by an electric field meet fine dust and charge the fine dust. Alternatively, the fine particles FPs may be charged by the diffusion charging mechanism in which fine dust is charged by a random motion of charged particles.

Figure 3:
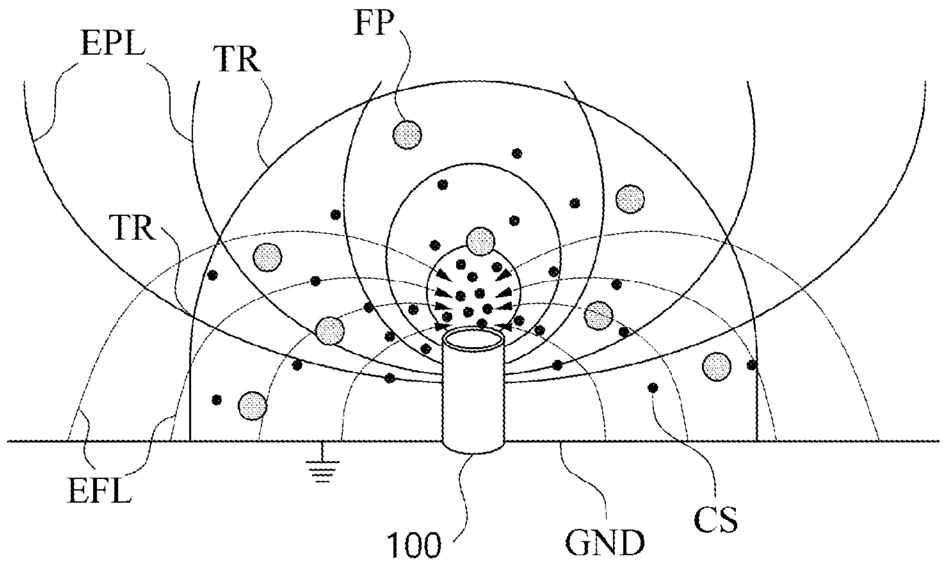
FIG. 3 is a diagram illustrating an operation of reducing a particle concentration according to the present disclosure.

Referring to FIG. 3, the operation of reducing the particle concentration, which is described in the present disclosure, may include forming space charge or an electric field in the target region TR by the device 100.

The device 100 may form space charge in the target region TR by continuously or repeatedly releasing the droplets having charges. The device 100 may release the droplets having charges and may form space charge having a non-uniform charge density in the target region TR. The charge density may mean a volume charge density, that is, the amount of charge present per unit volume ($C/m^3$). The space charge may affect the movement of fine particles FPs from the device 100. For example, the device 100 may release charges continuously to form space charge of which the charge density is high near the device and the charge density becomes lower as going away from the device. The space charge formed by the device 100 may form an electric field in the target region TR.

The device 100 may form an electric field in the target region TR by continuously or repeatedly releasing the droplets having charges. For example, the device 100 may form an electric field in the direction of the device from the ground GND. For example, the device 100 may operate in such a manner that negative or positive charges are generated continuously and an electric field is formed between the generated charges and the ground GND. The device 100 may form an electric field in the direction of the device from the ground GND, by releasing the droplets having negative charges.

For example, the device 100 may release charges continuously to form an electric field of which the intensity is high near the device and the intensity becomes lower as going away from the device. The device 100 may form space charge by releasing charges, thereby forming an electric field.

The device 100 may adjust the intensity, direction, characteristics, or distribution range of the electric field formed in the target region TR. For example, the device 100 may adjust the amount of droplets released to the outside, and the current (or charges) released through the droplets such that an electric field of an appropriate intensity is formed in an appropriate range. As a specific example, the device 100 adjusts the current released into the air by adjusting the voltage applied to the nozzle from which the droplets are released, so that the characteristics of the electric field are adjusted.

Alternatively, the device 100 may adjust the range, density, or intensity of the space charge distributed in the target region TR. The device may adjust the amount of droplets released to the outside and the current released through the droplets. For example, the device 100 may adjust the characteristics of the space charge distributed in the target region TR, by adjusting the voltage applied to the nozzle.

Figure 4:
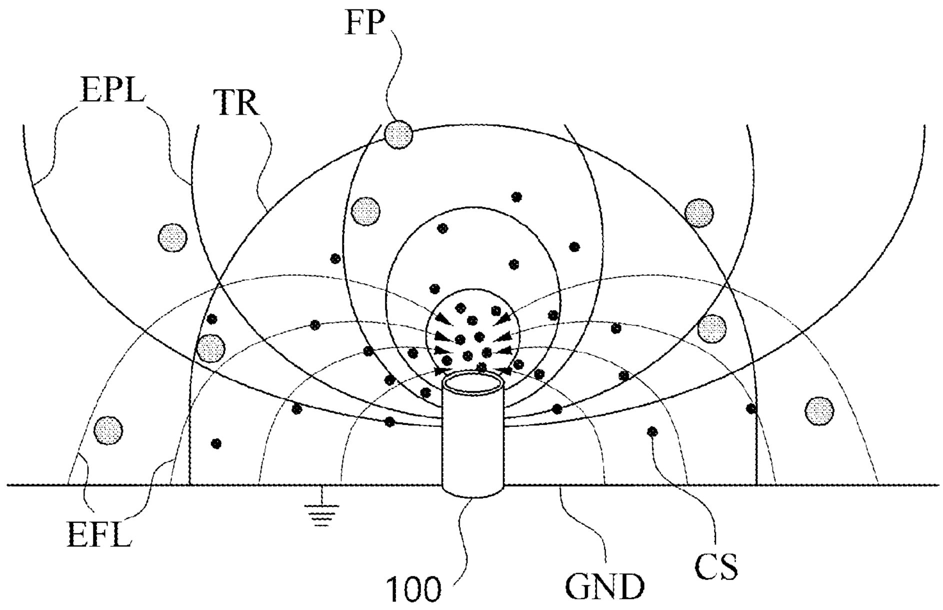
FIG. 4 is a diagram illustrating an operation of reducing a particle concentration according to the present disclosure.

Referring to FIG. 4, the operation of reducing the particle concentration, which is described in the present disclosure, may further include reducing the concentration of the fine particles FPs in the target region TR. The operation of reducing the particle concentration may include forming an electric field (or space charge) in the target region TR, and reducing the concentration of the fine particles FPs in the target region TR by at least some ratio.

The operation of reducing the particle concentration may include dropping, by the device 100, the density of the fine particles FPs in the target region TR by participating directly or indirectly in the movement of the charged fine particles FPs. For example, the device 100 may reduce the density of the fine particles FPs by forming and maintaining an electric field in the target region TR. To maintain the electric field, the device 100 may continuously or repeatedly release the droplets.

The operation of reducing the particle concentration may include reducing the concentration of the fine particles FPs in the target region TR by maintaining the electric field in the target region TR. The maintaining of the electric field may include maintaining the state in which the electric field of a predetermined intensity or stronger is formed in the target region TR. The maintaining of the electric field may mean maintaining the state in which the gradient of the charge density in the target region TR is present, by releasing charged particles. The device 100 may maintain the electric field in the target region TR by continuously or repeatedly releasing the droplets.

As the device 100 maintains the electric field in the target region TR, the density of the fine particles FPs in the target region TR may be reduced over time. As the device 100 maintains the electric field in the target region TR, the density of the fine particles FPs in the target region TR may be maintained at a predetermined level or lower.

The device 100 may adjust the maintenance state of the electric field. To reduce the density of the fine particles FPs in the target region TR, the device 100 may maintain the electric field for more than a predetermined time period. For example, the device 100 may adjust the maintenance time period for the electric field according to the concentration of the fine particles FPs in the target region TR. The device 100 may control the maintenance state of the electric field considering external conditions. For example, the device 100 may adjust the maintenance time period or the maintenance period for the electric field considering environmental conditions, such as the temperature, humidity, or altitude of the target region TR.

The operation of reducing the particle concentration may include pushing, by the device 100, at least some of the charged fine particles FPs in the target region TR out of the target region TR. For example, the device 100 may form the electric field by continuously outputting negative or positive charges to the target region TR such that negatively or positively charged fine particles FPs are pushed out by repulsion.

As a specific example, when the device 100 forms the electric field by continuously or repeatedly releasing the negatively charged droplets, at least some of the charged fine particles FPs are moved out of the target region TR along the formed electric field by the negative charges released from the device 100. The device 100 may move negatively or positively charged fine particles FPs in the direction away from the device by continuously outputting negative or positive charges.

The electric field (or space charge) formed by the device 100 may affect the movement characteristics of the fine particles FPs. For example, the intensity of the formed electric field may affect the movement speed of the fine particles FPs. The intensity of the electric field may weaken as it goes away from the device. Herein, the charged fine particles FPs may move under the influence of the electric field or space charge, and may move faster near the device where the intensity of the electric field is strong (or the density of space charge is high) than at the location far from the device. In other words, the fine particles FPs close to the device may be pushed out at a faster movement speed than the fine particles FPs far from the device. As another example, the direction of the formed electric field may affect the movement direction of the fine particles FPs.

Figure 5:
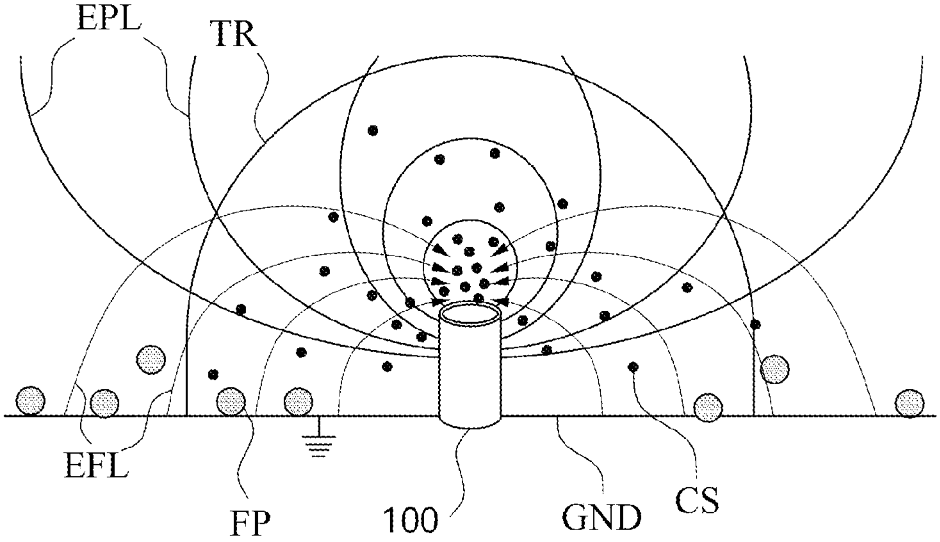
FIG. 5 is a diagram illustrating an operation of reducing a particle concentration according to the present disclosure.

Referring to FIG. 5, the operation of reducing the particle concentration, which is described in the present disclosure, may further include removing the floating fine particles FPs. The operation of reducing the particle concentration may include maintaining, by the device 100, the distribution of space charge by releasing charges to the target region TR, and at least partially removing the fine particles FPs floating in the target region TR through the space charge.

As a specific example, the device 100 may maintain the state in which space charge is formed in the target region TR, for more than a predetermined time period by releasing charged droplets. Accordingly, the charged fine particles FPs in the target region TR may be affected by the electric force caused by the space charge formed by the device 100. The charged fine particles FPs may be moved by the electric force by the device 100, or gravity.

The charged fine particles FPs may be pushed out of the target region TR. The charged fine particles FPs may be moved out of the target region TR or moved toward the ground GND or a target object (for example, outer walls of a building in the target region). The charged fine particles FPs may reach the ground GND or target object, are grounded, and thus may lose charges. The fine particles FPs may come into contact with the ground GND or target object and may enter an electrically neutral state. In the operation of reducing fine particles, the ground GND or the target object connected to the ground GND may function as a main loss channel.

Regarding the operation of reducing the particle concentration, the case in which fine particles FPs are charged by the current released from the device, and the charged fine particles FPs are pushed out of the target region TR under the influence of the electric field formed in the target region TR by the current released from the device has been described as an example. However, the operation of reducing the particle concentration described in the present disclosure is not limited thereto.

The operation of reducing the particle concentration described in the present disclosure may be realized in various forms in which the electric field in the target region TR is maintained by releasing a current and the fine particles FPs in the target region TR are at least partially moved under the influence of the electric field. Hereinafter, with respect to the device, the system, and the method for performing the operation of reducing the particle concentration described above, some embodiments will be described in detail.

2. DEVICE FOR REDUCING FINE PARTICLE CONCENTRATION

2.1 Definition

Herein, as an embodiment of the present disclosure, a device for reducing a fine particle concentration will be described. According to the embodiment, the device may form an electric field near the device by outputting negative or positive charges so as to reduce a fine particle concentration of a target region.

The device may perform the above-described operation of reducing fine dust. The device may output negative or positive charges in the target region, may form an electric field in the target region, and may reduce a concentration of fine dust in the target region.

2.2 Configuration of Device

2.2.1 Configuration of Device for Reducing Fine Particle Concentration

According to the present disclosure, there is provided a device 100 for reducing a fine particle concentration.

Figure 6:
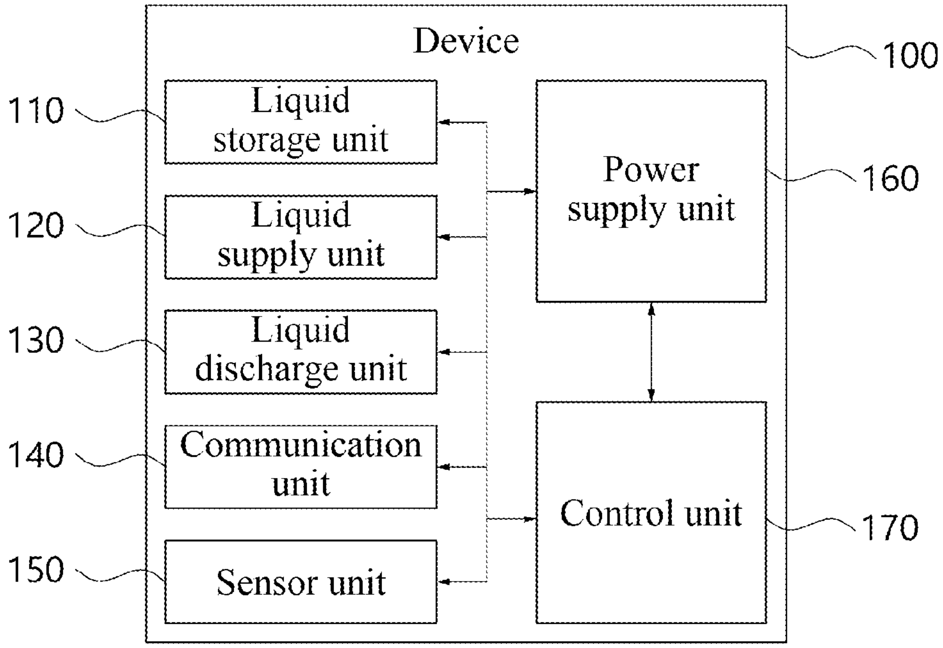
FIG. 6 is a diagram exemplarily illustrating a device according to an embodiment of the present disclosure.

FIG. 6 is a diagram exemplarily illustrating a device according to an embodiment of the present disclosure. Referring to FIG. 6, the device according to the embodiment may include a liquid storage unit 110, a liquid supply unit 120, a liquid discharge unit 130, a communication unit 140, a sensor unit 150, a power supply unit 160, and a control unit 170.

The liquid storage unit 110 may store liquid. The liquid storage unit 110 may store liquid supplied from outside or pre-stored liquid. The liquid storage unit 110 may prevent the liquid from leaving or changing in quality.

The liquid storage unit 110 may include a storage container storing liquid. The liquid storage unit 110 may include an inflow hose receiving liquid from the outside, and/or an outflow hose supplying liquid to the liquid discharge unit 130.

The liquid storage unit 110 may be provided to prevent the liquid from changing in quality or to prevent degeneration caused by the liquid. For example, the liquid storage unit 110 may be coated (e.g., anti-corrosion coating) to prevent the liquid from changing in quality and prevent the degeneration of the liquid storage container. In addition, for example, the liquid storage unit 110 may include a heat insulating material, a heat resistant material, a heat reserving material, or a fire-proofing material so that the liquid does not change in quality according to the external environment. The liquid storage unit 110 may include a ceramic heat insulating material formed outside the liquid storage container.

The liquid storage unit 110 may store liquid having electrical conductivity. The liquid storage unit 110 may store liquid including a particular component. The liquid stored in the liquid storage unit 110 may include one or more types of ions. According to an embodiment, the liquid stored in the liquid storage unit 110 may include an ion component. To the liquid stored in the liquid storage unit 110, an ion component may be added when necessary. The liquid may include a negative ion or positive ion component. The liquid storage unit 110 may store liquid having the viscosity of a reference value or higher. For example, the liquid stored in the liquid storage unit 110 may be distilled water, domestic water, industrial water, or underground water.

The liquid storage unit 110 may be connected to the liquid discharge unit 130. The liquid storage unit 110 may be connected to the liquid discharge unit 130 through the outflow hose, and may supply the liquid to the liquid discharge unit 130. The liquid storage unit 110 may supply the liquid to the liquid discharge unit 130 by the liquid supply unit. The liquid storage unit 110 may be realized in the form of a cartridge in which liquid is previously stored, a cartridge in which liquid is to be stored, or a liquid storage container in which liquid supplied from the outside is to be stored.

The liquid supply unit 120 may cause movement of the liquid. The liquid supply unit 120 may use a hydraulic, pneumatic, or mechanical motor to make the liquid flow. The liquid supply unit 120 may transfer the liquid from one location to another location. For example, the liquid supply unit 120 may move the liquid at a predetermined flow rate. The liquid supply unit 120 may transfer the liquid at a predetermined flow rate or flow velocity. The liquid supply unit 120 may provide a travel path of liquid. For example, in addition to causing the movement of the liquid by consuming additional power as described above, the liquid supply unit 120 may provide a path so that the liquid flows by gravity or capillary force. As a specific example, the liquid supply unit 120 may include a liquid container and an outlet formed to enable the liquid stored in the container to be released from the container a predetermined amount by a predetermined amount by atmospheric pressure or gravity.

The liquid supply unit 120 may include a pump module. Examples of the pump module may include a syringe pump, a hydraulic pump, and a pneumatic pump.

According to an embodiment, the liquid supply unit 120 may supply the liquid stored in the liquid storage unit 110 to the liquid discharge unit 130. The liquid supply unit 120 may supply the liquid stored in the liquid storage unit to the liquid discharge unit 130 at a predetermined flow rate under the control of the control unit. The liquid supply unit 120 may supply the liquid at the flow rate of several μL/min to several hundreds of μL/min. For example, the liquid supply unit 120 may supply the liquid at the rate of 20 μL/min or slower.

The liquid discharge unit 130 may output the liquid. The liquid discharge unit 130 may release the liquid supplied from the liquid storage unit through the liquid supply unit. The liquid discharge unit 130 may be connected to the power supply unit. The liquid discharge unit 130 may receive power from the power supply unit. A high voltage may be applied to the liquid discharge unit 130 by the power supply unit. As the high voltage is applied, the liquid discharge unit 130 may release the charged droplets to the outside.

The liquid discharge unit 130 may include at least one nozzle for ejecting the liquid. The liquid discharge unit 130 may include at least one nozzle for spraying the droplets. The liquid discharge unit 130 may include at least one nozzle to which a high voltage is applied. The liquid discharge unit 130 may include at least one nozzle that is provided such that as a high voltage is applied, the liquid located in the liquid discharge unit 130 is subjected to electrospray. A high voltage may be applied to the nozzle by the power supply unit. The nozzle may be formed of glass, fused silica, or a metal such as stainless steel.

The nozzle may have a shape facilitating electrospray or electrostatic spray. The nozzle may be formed to have the inner diameter ranging from several tens to several hundreds of μL, and to have the outer diameter of several hundreds of μm or larger. For example, as the nozzle, a nozzle having the outer diameter of 0.3 mm and the inner diameter of 0.1 mm may be used.

The nozzle may have an outer surface and an inner surface. The nozzle may have an end surface. The nozzle may have a tapered-tip shape that narrows toward the end. The outer surface of the nozzle may be provided in a cylindrical shape or in a tapered shape that narrows toward the end. The inner surface of the nozzle may be provided in a cylindrical shape or in a tapered shape.

Each of the surfaces of the nozzle may be hydrophilic or hydrophobic. Each of the surfaces of the nozzle may be formed of a hydrophilic or hydrophobic substance, or may be coated with a hydrophilic or hydrophobic substance. The surfaces of the nozzle may have different properties. For example, the outer surface and the end surface of the nozzle may be hydrophobic and the inner surface of the nozzle may be hydrophilic.

Figure 7D:
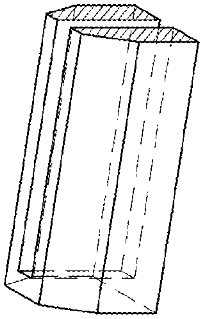
FIGS. 7A through 7D are diagrams illustrating some examples of nozzles that may be used in the present disclosure.
Figure 7C:
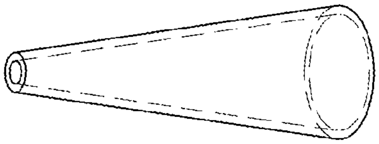
Figure 7B:
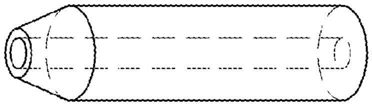
Figure 7A:
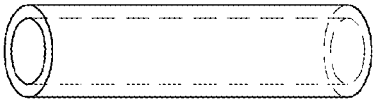

FIGS. 7A and 7B are diagrams illustrating some examples of nozzles that may be used in the present disclosure.

Referring to FIG. 7A, the nozzle may have the outer surface in a cylindrical shape and the inner surface in a cylindrical shape. Referring to FIG. 7B, the nozzle may have the inner surface in a cylindrical shape and the outer surface in a tapered shape. Referring to FIG. 7C, the nozzle may have the outer surface in a cone shape and the inner surface in a cone shape. Referring to FIG. 7C, the nozzle may have a linear nozzle, for example, a slit-shaped nozzle. The nozzle may have a complex shape that is a combination of the shapes shown in FIGS. 7A to 7D. For example, the nozzle may have the outer surface that is a combination of a polygonal column shape and a tapered shape, and the inner surface in a cylindrical shape.

Referring to FIGS. 7A to 7D, a nozzle may have an end. The end of the nozzle may be formed to be blunt or sharp depending on the shape of the nozzle. The cylindrical-shaped nozzle shown in FIG. 7A may have a blunt end. The cone-shaped nozzle shown in FIG. 7C may have a sharp end.

The nozzle used in the device described in the present disclosure may have an inner diameter and an outer diameter. Herein, the ratio between the outer diameter and the inner diameter of the nozzle may vary according to the length direction of the nozzle. For example, in the case of the nozzle shown in FIG. 7B or 7C, the ratio of the outer diameter to the inner diameter may decrease toward the end.

At the end of the nozzle, the shape of the nozzle end may vary according to the ratio of the outer diameter to the inner diameter. For example, the nozzle of which the ratio of the outer diameter to the inner diameter is high may have a blunt end. In addition, for example, the nozzle of which the ratio of the outer diameter to the inner diameter at the end portion is low may have a narrow end surface.

Figure 8A:
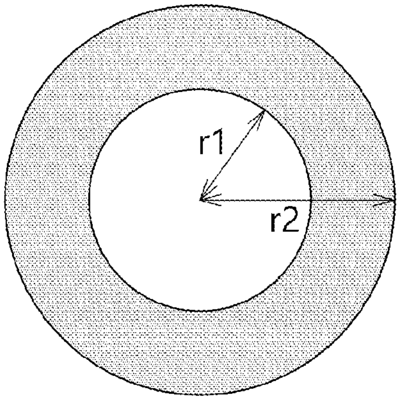
FIGS. 8A and 8B are diagrams exemplarily illustrating an end of a nozzle.
Figure 8B:
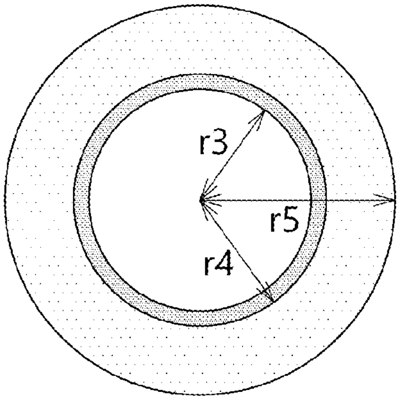

FIGS. 8A and 8B are diagrams exemplarily illustrating an end surface of a nozzle. FIGS. 8A and 8B are plan views viewed in a length direction of the nozzle.

FIG. 8A is a diagram illustrating a nozzle having a blunt end surface. Referring to FIG. 8A, a ratio of an outer diameter r2 to an inner diameter r1 of the nozzle having the blunt end surface may have a relatively large value. For example, the ratio of the outer diameter r2 to the inner diameter r1 may be 1.5 to 2.

FIG. 8B is a diagram illustrating a nozzle having a narrow end surface. Referring to FIG. 8B, the nozzle may have a tapered shape of which the outer diameter decreases toward the end. For example, an outer diameter r4 at the end surface of the nozzle may be smaller than an outer diameter r5 at a location spaced apart from the end surface of the nozzle. Referring to FIG. 8B, a ratio of the outer diameter r4 to the inner diameter r3 of the nozzle may have a relatively large value. For example, the ratio of the outer diameter r4 to the inner diameter r3 having the narrow end surface may be 1.001 to 1.01.

The liquid discharge unit 130 may include multiple nozzles. The liquid discharge unit 130 may include a nozzle array of multiple nozzles. The nozzle array may include multiple nozzles arranged parallel with each other. The nozzle array may include multiple nozzles arranged in different directions. For example, the multiple nozzles may be arranged radially. The multiple nozzles may be arranged in different directions such that the mutual influence caused by the currents released from the respective nozzles is minimized.

Figure 9:
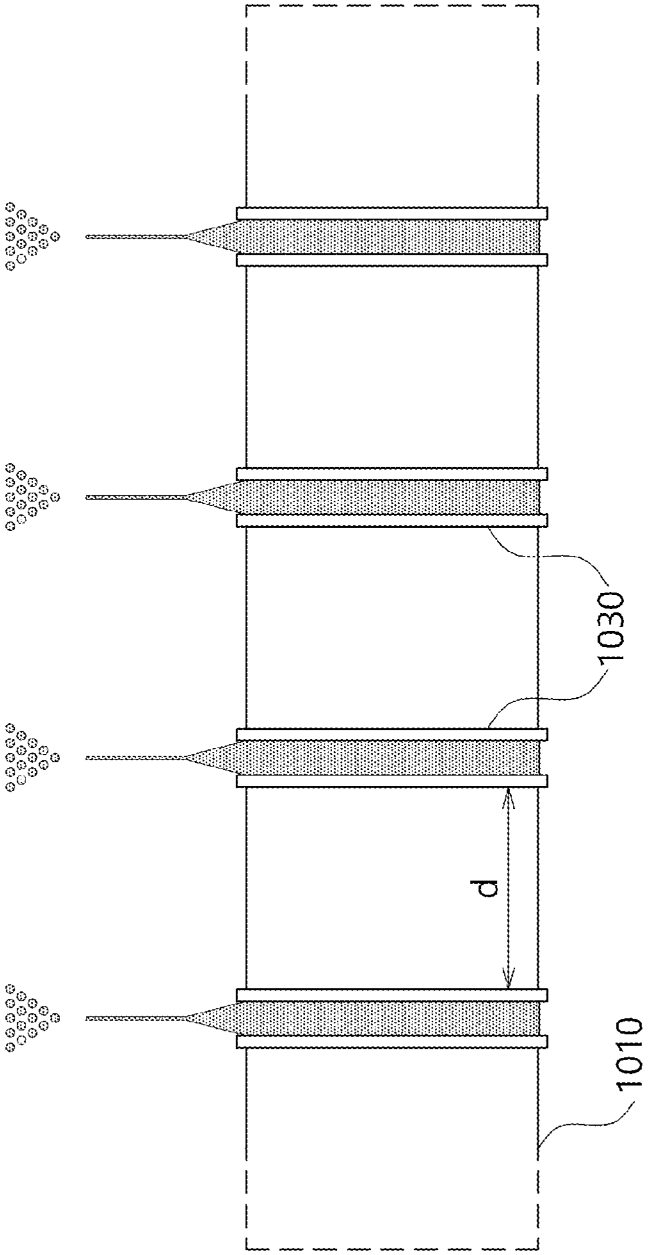
FIG. 9 is a diagram illustrating a nozzle array according to an embodiment.

FIG. 9 is a diagram illustrating a nozzle array 1000 according to an embodiment.

Referring to FIG. 9, the nozzle array 1000 according to the embodiment may include a base and multiple nozzles located in the base. The nozzle array 1000 may include the multiple nozzles 1030 fixed in the base. The nozzle array 1000 may include multiple through-holes in which the nozzles are fixed, and may include the nozzles 1030 formed in the respective through-holes. The multiple nozzles may be located to have a predetermined interval d therebetween. The interval d between the nozzles may be determined considering the voltage applied to the nozzles.

Figure 10A:
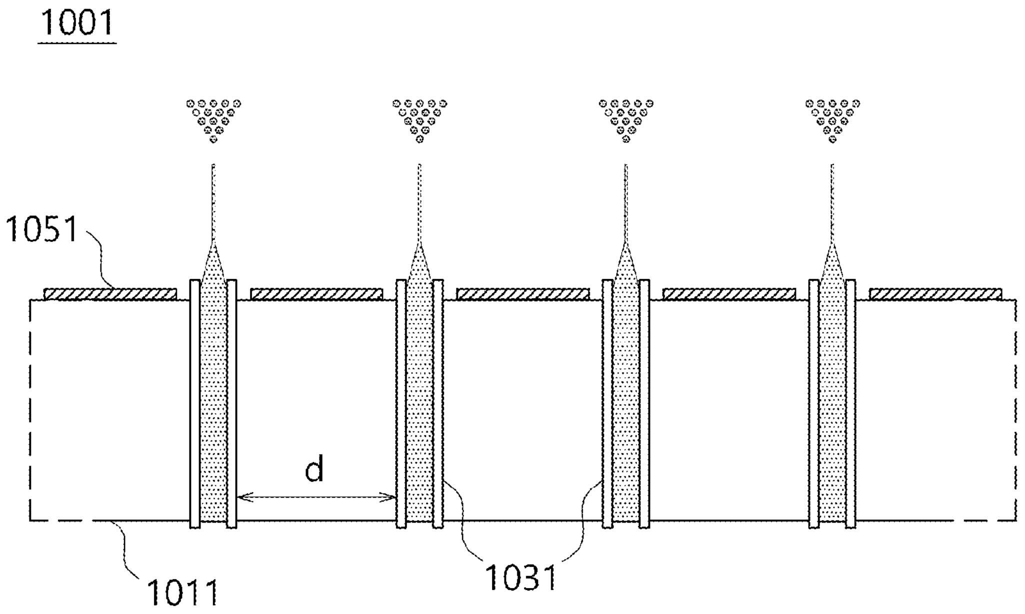
FIGS. 10A and 10B are diagrams illustrating a nozzle array according to an embodiment.
Figure 10B:
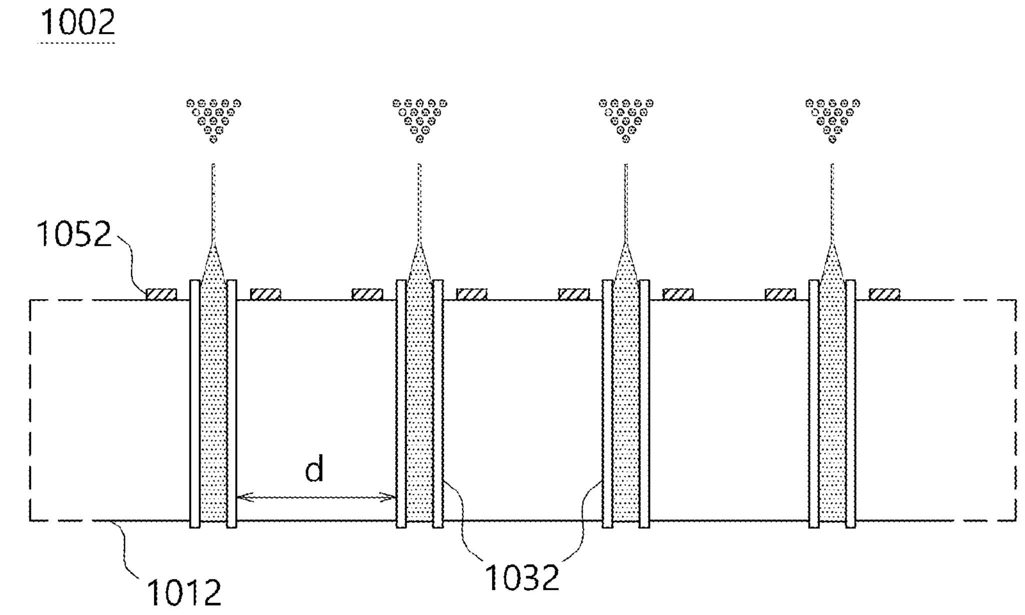

FIGS. 10A and 10B are diagrams illustrating nozzle arrays 1001 and 1002 according to some embodiments. Referring to FIG. 10, the nozzle array 1001 may be provided in the form of a substrate including multiple nozzles 1031 and control electrodes 1051. The multiple nozzles 1031 may be formed to have the predetermined interval d. The interval d between the nozzles may be determined considering the voltage applied to the nozzles.

The control electrodes may be located on one surface of the substrates 1011 and 1012. The control electrodes may be located on the surface on which the liquid is released. The control electrodes may be located on the opposite surfaces, for example, an upper surface and a lower surface, of the substrates 1011 and 1012. The control electrodes may be located not to be connected to the nozzles.

A high voltage may be applied to the control electrodes or the multiple nozzles 1031 and 1032 formed at the respective substrates 1011 and 1012. When a high voltage is applied to the control electrodes or the multiple nozzles 1031 and 1032, the liquid released at the end portion of the through-hole is charged. In particular, by varying the voltage applied to each of the separated control electrodes, the direction in which the liquid is released may be controlled.

Referring to FIG. 10A, a control electrode surface 1051 may be formed on one surface of the nozzle array. Referring to FIG. 10B, on one surface of the nozzle array, a control electrode pattern 1052 may be formed near the through-holes.

According to an embodiment, the nozzle array may be provided in the form of a printed circuit board (PCB). The nozzle array may include through-holes formed through a via process, and may be provided in the form of a printed circuit board that an electrode patterns near the through-holes.

The electrode patterned on the substrate may be used in pattern controlling for multiple nozzles. For example, in the case in which the substrate includes multiple electrodes patterned on the substrate, the device 100 may control the electrospray output or the direction of the electrospray of each of the nozzles by varying the voltage applied to each of the electrodes. As another example, multiple electrodes may be divided into one or more nozzle groups and controlled. The device 100 may control the electrospray operation for each group by adjusting the voltage value applied to the electrodes corresponding to the groups.

When the charged droplets are released through all discharge holes of the nozzle array simultaneously and continuously, the density of space charge near the discharge holes increases and the voltage for outputting a target current value also increases, thus causing an unintended incidental phenomenon. For example, an unintended corona discharge may occur due to the increase in the required voltage. A similar problem may occur when the charged droplets are released in the same direction through all the discharge holes of the nozzle array. To prevent this, multiple nozzle groups included in the nozzle array may be controlled separately. For example, the device 100 may apply a voltage to the individual nozzle groups sequentially or alternately in order to cancel the voltage increase effect caused by the space charge near the discharge holes (for example, one ends of the nozzles or through-holes) through which the droplets are discharged. Alternatively, the device 100 may manage the nozzle voltage near the discharge holes by changing the directions in which the individual nozzle groups release the charged droplets.

Figure 11A:
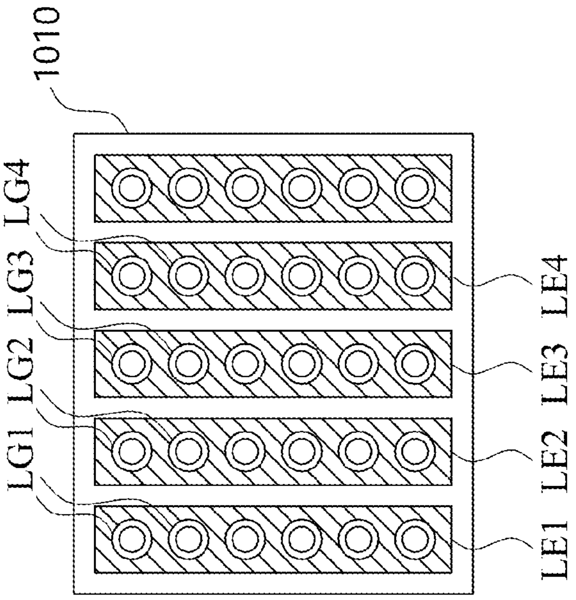
FIGS. 11A and 11B are diagrams illustrating an embodiment of a nozzle array.
Figure 11B:
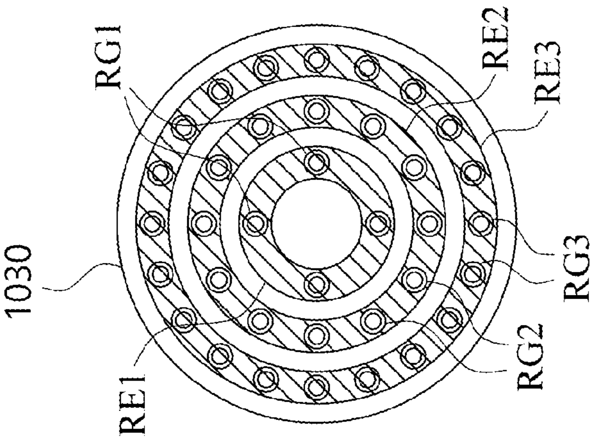

FIGS. 11A and 11B are diagrams illustrating some embodiments of an electrode patterned on a substrate.

Referring to FIG. 11A, multiple through-holes and linear control electrodes may be formed on a substrate. The linear (that is, bar-shaped) control electrodes may be formed to correspond to through-hole columns or rows. The linear control electrodes may be formed to surround the through-hole columns or rows. One linear control electrode may be used in controlling electrospray in one nozzle group of multiple nozzles. The device 100 may control the electrospray of through-hole groups individually by controlling the linear control electrodes individually.

According to an embodiment, a nozzle array may include a first electrode LE1, a second electrode LE2, a third electrode LE3, and a fourth electrode LE4. The first to the fourth electrode LE1, LE2, LG3, and LE4 may be formed to surround a first to a fourth nozzle group LG1, LG2, LG3, and LG4, respectively.

The device 100 may apply different voltages to the first electrode to the fourth electrode LE1, LE2, LG3, and LE4. The device 100 may apply a voltage to the first electrode to the fourth electrode LE1, LE2, LG3, and LE4 sequentially. The device 100 may perform the following repeatedly: applying a first voltage to the first electrode LE1 and the third electrode LG3, applying a second voltage to the second electrode LE2 and the fourth electrode LE4, applying the second voltage to the first electrode LE1 and the third electrode LG3, and applying the first voltage to the second electrode LE2 and the fourth electrode LE4.

Referring to FIG. 11B, a nozzle array may include a substrate 1012, multiple nozzles 1032, and multiple control electrodes 1032 having the shape of concentric circles. The multiple control electrodes 1032 may be formed in the shape of multiple rings having the same interval. The ring electrodes may be formed in the shape surrounding multiple through-holes arranged in circles. Each individual ring electrode may be used in controlling the electrospray in a through-hole group including the multiple through-holes arranged in a circle.

According to an embodiment, the nozzle array may include a first ring electrode RE1, a second ring electrode RE2, and a third ring electrode RE3. The first to the third electrode RE1, RE2, and RE3 may be formed to surround a first to a third through-hole group RG1, RG2, and RG3, respectively.

The device 100 may control the first ring electrode to the third ring electrode RE1, RE2, and RE3 individually, and may control the electrospray operation in the first to the third through-hole group RG1, RG2, and RG3 individually. The device 100 may apply a voltage to the first ring electrode RE1, the second ring electrode RE2, and the third ring electrode RE3 sequentially. The device 100 may apply a first voltage, a second voltage, and a third voltage to the first ring electrode RE1, the second ring electrode RE2, and the third ring electrode RE3, respectively, to determine whether to release the fine droplets, or adjust the release direction. The device 100 may perform the following repeatedly: applying a first voltage to the first ring electrode RE1 and the third ring electrode RE3, applying a second voltage to the second ring electrode RE2, applying the second voltage to the first ring electrode RE1 and the third ring electrode RE3, and applying the first voltage to the second ring electrode RE2.

In the meantime, the nozzle arrays have been described with reference to the plan views of FIGS. 11A and 11B, but the surfaces that the respective nozzle groups included in the nozzle array or the respective control electrodes form may differ from each other. For example, an end of each nozzle included in a first nozzle group and an end of each nozzle included in a second nozzle group may have different heights protruding from the base of the nozzle array. Alternatively, the first electrode and the second electrode may have different heights protruding from the base of the nozzle array. Alternatively, the first electrode and an end of each nozzle included in the first nozzle group corresponding to the first electrode may have different heights protruding from the base of the nozzle array.

In FIGS. 9 to 11B, the nozzle array for generating the droplets through electrospray has been described as a reference, but this is merely an example and the present disclosure is not limited thereto. The nozzle array may further include a droplet generation means (for example, a gas ejection unit or a vibration unit), and may generate the droplets by electrostatic spray.

According to an embodiment, the liquid storage unit 110 and the liquid discharge unit 130 may be integrated with each other. For example, the device according to an embodiment may be realized in the form of spraying the charged droplets using a cartridge that includes a liquid storage container for storing the liquid therein, and a nozzle connected to the liquid storage container.

The communication unit 140 may communicate with an external device in a wired or wireless manner. The communication unit 130 may perform bi-directional or uni-directional communication. For example, the communication unit 140 may communicate with an external device through a local area network (LAN), a wireless local area network (WLAN), Wi-Fi, Zigbee, WiGig, or Bluetooth. The communication unit 140 may include a wired or wireless communication module.

The communication unit 140 may obtain information from an external device or may transfer information to an external device. For example, the communication unit 140 may obtain a control command from an external device and may transfer the same to the control unit or a corresponding unit. Alternatively, the communication unit 140 may transfer device information and state information obtained by the sensor unit to an external device. The communication unit 140 may communicate with external devices such as a user terminal, a control device, a control server, or other devices or all. For example, the communication unit 140 may communicate with an external server and may obtain environmental information including weather information on a target region.

The sensor unit 150 may obtain information. The sensor unit 150 may obtain environmental information including a measurement value of a measurement parameter. For example, the sensor unit 150 may obtain state information on the inside of the device, operation information of the device, or environmental information on the outside of the device, or all.

For example, the sensor unit 150 may obtain state information of the elements constituting the device, such as the liquid storage unit 110, the liquid supply unit 120, the liquid discharge unit 130, the communication unit 140, a gas spray unit, and the power supply unit 160. For example, the sensor unit may obtain state information such as the temperature of the liquid stored in the liquid storage unit 110, the amount of the liquid, the operation state of the liquid supply unit 120, the liquid discharge efficiency (for example, whether nozzle clogging occurs) of the liquid discharge unit 130, the temperature inside the device, the temperature of the liquid discharge unit 130, or the temperature of the liquid storage unit 110.

According to an embodiment, in the case in which the device includes the gas spray unit, the sensor unit 150 may obtain state information, such as the intensity and the temperature of the gas output from the gas spray unit.

As another example, the sensor unit 150 may obtain environmental information such as temperature information, humidity information, air current (for example, wind velocity) information, or air quality (for example, a concentration of fine dust) information. The environmental information may be information that the sensor unit 150 measures or obtains from the outside. For example, the sensor unit 150 may receive the environmental information from an external measurement center.

As another example, the sensor unit 150 may obtain operation information related to the operation of the device. The sensor unit 150 may obtain the operation information that is used in determining whether the device operates appropriately according to a control command. For example, the sensor unit 150 may obtain a current output from the device, a voltage applied to a nozzle of the device, the charge density near the device, the intensity of the electric field near the device, or a fine particle concentration near the device.

According to an embodiment, in the case in which the device includes a particle dispersion unit, the sensor unit 150 may obtain the operation information, such as the charge density in a region in which particles are dispersed by the particle dispersion unit, or the intensity of the electric field.

The sensor unit 150 may obtain, for a particular parameter (for example, environmental information), an ambient value measured near the device where the sensor unit 150 is located, an average value indicating the average of the target region, or a particular location value indicating a value at a particular location.

The sensor unit 150 may include a sensor module obtaining information. Alternatively, the sensor unit 150 may obtain a measurement value from an external device including a sensor module and obtaining information directly.

The sensor module may be located inside the device or exposed outside the device. For example, the sensor module obtaining state information on the device or operation information may be fixed inside the device. In addition, for example, the sensor module obtaining environmental information on the outside of the device or operation information may be located exposed outside the device.

The information obtained through the sensor unit 150 may be used for control of the device. For example, the state information or the environmental information may be used in determining an operation command. The operation information may be used in generating a user notification when abnormal-operation information is generated. When information obtained through the sensor unit 150 is sufficiently accumulated, history control of the device is performed. The control of the device will be described later in detail in relation to the operation of the control unit.

The power supply unit 160 may supply power required for the operation of the device. The power supply unit 160 may supply power to each of the elements constituting the device. The power supply unit may supply power to the liquid discharge unit, the liquid supply unit, the liquid storage unit, the communication unit, the sensor unit, and/or the control unit. The power supply unit 160 may supply DC or AC power. The power supply unit 160 may supply power to each of the units in different forms.

The power supply unit 160 may apply a high voltage to an element of the device, for example, the liquid discharge unit 130. For example, the power supply unit 160 may apply a high voltage to the liquid discharge unit 130 through a connector. The power supply unit 160 may apply a high voltage to the nozzle such that the liquid discharged through the liquid discharge unit 130 is ejected in the form of charged droplets. The power supply unit 160 may apply a voltage having an intensity that is sufficient to cause electrospray to occur at the nozzle. The power supply unit 160 may apply, to the nozzle, a voltage having a large potential difference with respect to the ground GND. The power supply unit 160 may apply, to the nozzle, a positive voltage or a negative voltage with respect to the ground GND. For example, the power supply unit 160 may apply a high voltage of −1 kV or lower to a unit nozzle.

Although not shown in FIG. 6, the device may further include the gas spray unit. The gas spray unit may spray gas to the location to which the droplets are ejected by the liquid discharge unit 130.

The gas spray unit may accelerate evaporation of the droplets by releasing gas toward the droplets ejected from the liquid discharge unit 130. The gas spray unit may accelerate evaporation of the droplets and may thus enable fission of the droplets to occur more stably. The gas spray unit may accelerate evaporation of the droplets and may thus enable the space charge to be stably distributed in the target region.

The gas spray unit ejects gas toward the discharge holes through which the droplets are ejected and pushes out the charged particles near the discharge holes, thereby reducing the density of space charge near the discharge holes locally. The gas spray unit may reduce the density of space charge near the discharge holes, and may thus perform the function of the particle dispersion unit which will be described later.

The gas spray unit may accelerate generation of the droplets by ejecting gas toward the discharge hole through which the liquid is released. The gas spray unit may eject gas toward the discharge holes through which the liquid is released, so that physical force acts to separate the droplets from the liquid. The gas spray unit may release gas toward the liquid or generated droplets so that droplets of a smaller size are generated.

The gas spray unit may provide a progress path of the droplets. The gas spray unit may eject gas toward the discharge holes through which the liquid is released, and may induce the released droplets or particles to move in a particular direction.

The gas spray unit may include an air nozzle and an air pump. According to an embodiment, the air pump may be integrated with a pump for supplying liquid. The gas spray unit may include an inlet through which gas is introduced. The gas spray unit may include a flow regulator for adjusting the ejection of gas.

The gas spray unit may include multiple air nozzles. The multiple air nozzles may be provided parallel with each other, or may be provided to face different directions. According to an embodiment, the multiple air nozzles may be provided to face a region in which the droplets are released by the liquid discharge unit 130. According to an embodiment, the gas spray unit may be provided in the liquid discharge unit 130 described above. The gas spray unit may be integrated with the liquid discharge unit 130 described above.

When necessary, the gas spray unit may further include a heating module. The heating module may include a heating means, such as an electric heating coil, an induction heating coil, or a thermoelectric element. According to an embodiment, the gas spray unit may include an air nozzle, an air pump, and a heating module, and may spray heated gas.

The gas spray unit may spray gas with low reactivity. For example, the gas spray unit may spray nitrogen gas, argon gas, or compressed air. The gas spray unit may spray inert gas.

The gas spray unit may spray gas including a charge transfer substance. The gas spray unit may release gas including a charge transfer substance that obtains charges from a charged substance included in the droplets. For example, the gas spray unit may release gas including an oxygen (O2) component.

Figure 12A:
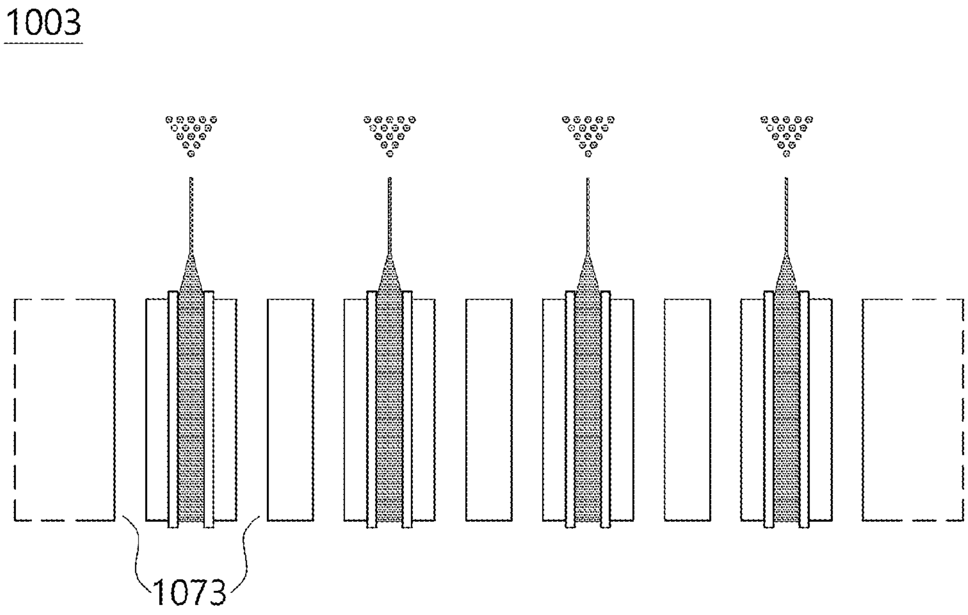
FIGS. 12A and 12B are diagrams illustrating an embodiment of a nozzle array.

FIG. 12A is a diagram illustrating an embodiment of a nozzle array.

Referring to FIG. 12A, the nozzle array 1003 may further include gas ejection holes 1073. The gas ejection holes 1073 may be provided to have a coaxial structure with the nozzles. The gas ejection holes 1073 may be formed between the nozzle and the nozzle. The gas ejection holes 1073 may be provided as separate through-holes formed near the nozzles. The gas ejection holes 1073 are formed side by side with the nozzles, so that the charged droplets sprayed from the nozzles are pushed out. The multiple gas ejection holes 1073 may receive gas from one air pump.

Although not shown in FIG. 6, the device may further include the particle dispersion unit. The particle dispersion unit may adjust the voltage applied to the nozzles by adjusting the density of space charge near the discharge holes through which the charged droplets are ejected.

For example, the particle dispersion unit may disperse the charged particles near the nozzle ends through which the droplets are discharged, by causing non-electric force to act on the region in which the charged droplets are discharged by the liquid discharge unit 130. The particle dispersion unit may reduce the density of space charge near the nozzle ends by dispersing the charged particles near the nozzle ends. By reducing the density of space charge near the nozzle ends, the particle dispersion unit may decrease a reference voltage to be applied to the nozzles to release a reference current through the nozzles. The particle dispersion unit may decrease the reference voltage such that the voltage applied to the nozzle ends is maintained in an appropriate range.

For example, the voltage applied to the nozzle ends may be maintained at a value in a range of 10 kV to 15 kV. The appropriate range of the voltage applied to the nozzle ends may vary according to the shape of the nozzle end portion. According to the shape of the nozzle end portion, a voltage value at which a direct discharge such as corona discharge occurs from the nozzles may vary, and accordingly, an appropriate range of the voltage applied to the nozzle ends may vary. For example, in the case in which a nozzle includes a sharp edge, the appropriate range of the voltage may have a lower upper limit.

As a specific example, a reference voltage to be applied to a nozzle of the device 100 to release a reference current of 1 mA through charged droplets from the nozzle, may vary according to the density of space charge near a discharge hole of the nozzle. For example, at the time point when the device 100 starts to operate, the reference voltage for releasing the reference current of 1 mA in a state in which there is almost no space charge near the discharge hole, may be 8 kV. After the device has operated continuously for more than a predetermined time period, the density of space charge near the discharge hole may be high, and the reference voltage may be 9 kV or higher. The particle dispersion unit pushes out the charged particles near the discharge hole, so that the density of space charge near the discharge hole is reduced and the reference voltage is decreased to a value lower than 9 kV, for example, to 8.5 kV.

The particle dispersion unit may maintain the reference voltage in an appropriate range by decreasing the reference voltage. The particle dispersion unit may improve the energy efficiency of the device 100 by maintaining the reference voltage in an appropriate range. The particle dispersion unit may prevent unnecessary discharge or generation of a substance that may occur at the nozzle ends. The particle dispersion unit may improve the stability and the safety of the device.

The particle dispersion unit may be realized in the form of the gas spray unit described above.

Although not shown in FIG. 6, the device may further include a heating unit.

The heating unit may heat the liquid or gas released from an element of the device 100 or from the device 100. The heating unit may be used to heat one or more among the units of the device. For example, the heating unit may heat a portion of the liquid storage unit, the liquid discharge unit 130, or the gas spray unit.

For example, the heating unit may be located near the liquid storage unit. The heating unit may surround the liquid storage container of the liquid storage unit, and may heat the liquid storage container and the liquid stored in the liquid storage container. The heating unit may be located near the nozzles of the liquid discharge unit 130, and may heat the nozzles and the liquid passing through the nozzles. The heating unit may be located near an air nozzle of the gas spray unit, and may heat the air nozzle and the gas passing through the air nozzle. The heating unit may heat the region in which the droplets are released. For example, the heating unit may heat the gas sprayed to the region in which the droplets are released, and may thus heat the region in which the droplets are released.

The heating unit may include a heating means, such as an electric heating coil, an induction heating coil, or a thermoelectric element.

Figure 12B:
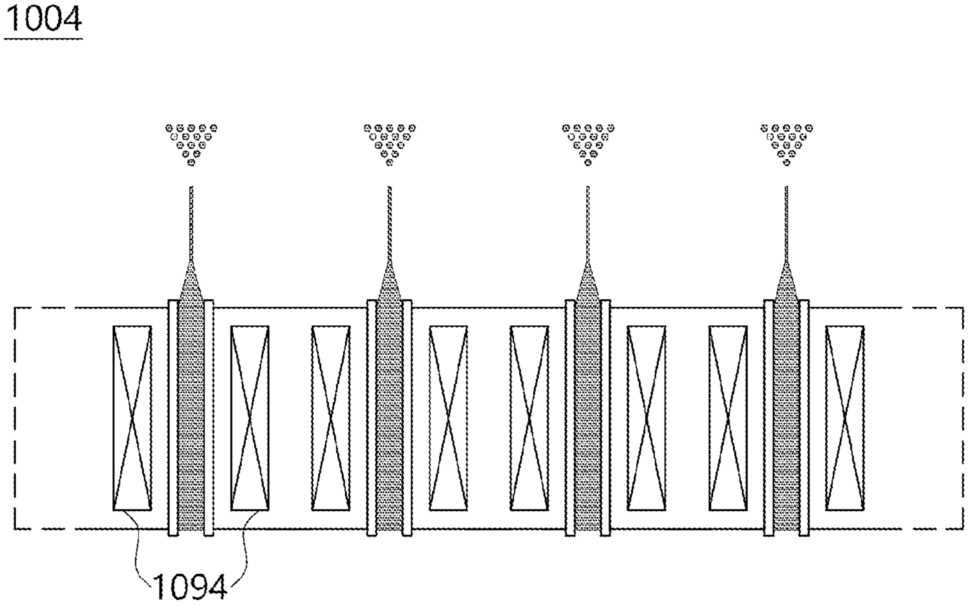

FIG. 12B is a diagram illustrating an embodiment of a nozzle array 1004.

Referring to FIG. 12B, the nozzle array 1004 may further include a heating module 1094. The heating module 1094 may be placed near the nozzles. The heating module 1094 may be placed between the nozzle and the nozzle. The heating module 1094 may be placed to surround the multiple nozzles. The heating module 1094 may be formed to have a coaxial structure with the nozzles. The heating module 1094 may be provided in the form of a coil. The heating module 1094 may be provided in the form of a coil surrounding the gas ejection holes and may be placed to heat the ejected gas. The heating module 1094 may be provided in the form of a coil surrounding the nozzles, and may heat the sprayed liquid.

Although not shown in FIG. 6, the device 100 may include an interface unit.

The interface unit may be realized as a space connecting the outside air and the liquid discharge unit 130. The interface unit may provide a space at least partially blocked from the outside so that changes in an external environment have minimal influence on the formation of the space charge caused by the droplets released from the device.

The interface unit may provide an environment required for the droplets released from the liquid discharge unit 130. For example, the interface unit may provide temperature or humidity for the evaporation or fission of the droplets to occur sufficiently.

The interface unit may include a reaction space, for example, a chamber. The chamber may include a component for weakening the influence of an external environment, for example, a heat insulating material, an insulation material, a heat resistant material, a waterproof material, or a water repellent material. The interface unit may include a cover for blocking external influences. The cover may be opened or closed according to the operation state of the device 100.

The interface unit may be formed to be connected with the liquid discharge unit 130. The interface unit may be formed to be connected with the gas spray unit, the particle dispersion unit, or the heating unit.

The control unit may control the operation of the device or each unit or both. The control unit may generate a control command, and may control each unit of the device. The control unit may obtain a control command through the communication unit, and may use the obtained control command to control a unit corresponding thereto.

The control unit may control the operation of the liquid storage unit, the liquid supply unit, the liquid discharge unit 130, the communication unit, the sensor unit, the power supply unit, or other device elements or all. For example, the control unit may control on/off of the liquid supply operation of the liquid supply unit. The amount of liquid supplied per hour by the liquid supply unit may be controlled. In addition, for example, the control unit may control an information acquisition operation of the sensor unit.

The control unit may control a power supply operation of the power supply unit. The control unit may control the voltage or current output by the power supply unit. The control unit may apply a voltage to a particular element through the power supply unit. For example, the control unit may control the voltage applied to the liquid discharge unit 130 through the power supply unit. The control unit may perform control through the power supply unit such that electrospray occurs at the liquid discharge unit 130. The control unit may control the current output from the liquid discharge unit 130 through the power supply unit.

The control unit may use the power supply unit to apply a high voltage to the nozzles so that the charged droplets are released from nozzles. The control unit may use the power supply unit to apply a high voltage to the nozzles so that electrospray occurs at the nozzles. The control unit may use the power supply unit to apply a high voltage to the nozzles so that fine particles in the air at least partially obtain negative charges from the charged droplets and are charged. The control unit may use the power supply unit to apply a high voltage to the nozzles so that the charged fine particles are pushed out by the electric field formed by the negative charges released from the device.

The control unit may apply a high voltage to some elements of the device through the power supply unit. For example, the control unit may apply a voltage equal to or lower than a reference value, or equal to or higher than the reference value to the nozzles through the power supply unit. For example, the control unit may perform control such that the power supply unit applies a voltage of 2 kV or higher to a unit nozzle. The control unit may perform control such that the power supply unit applies a voltage of 20 kV or lower to a unit nozzle. The control unit may perform control such that the power supply unit applies an average voltage of 20 kV or lower to the nozzle array.

Although not shown in FIG. 6, the device 100 may include an output unit. The output unit may include an output means for outputting operation information or state information of the device. The output unit may include a visual information display means, such as a display, and an LED light bulb, or an audio information display means, such as a speaker.

In the meantime, the device and the elements described with reference to FIGS. 6 to 12B are only an example, so the elements described with reference to FIGS. 6 to 12B may be omitted and an element not shown in FIGS. 6 to 12B may be further included in the device 100.

The device according to an embodiment of the present disclosure may include a liquid discharge unit including a linear electrode. For example, the device may include a substrate having a linear conductor positioned on a surface of the substrate. The device may include a substrate having a stripline formed on a surface of the substrate. The device, a linear electrode located on a surface of the device The device may supply the liquid to the surface of the substrate and may apply a high voltage to the electrode located on the surface of the substrate such that electrospray occurs at the electrode on the substrate.

Figure 44A:
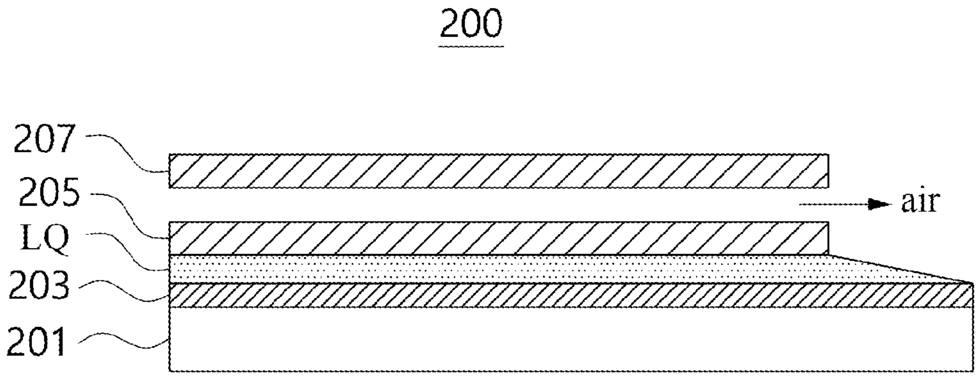
FIGS. 44A and 44B are diagrams illustrating some constituents of a device according to an embodiment.
Figure 44B:
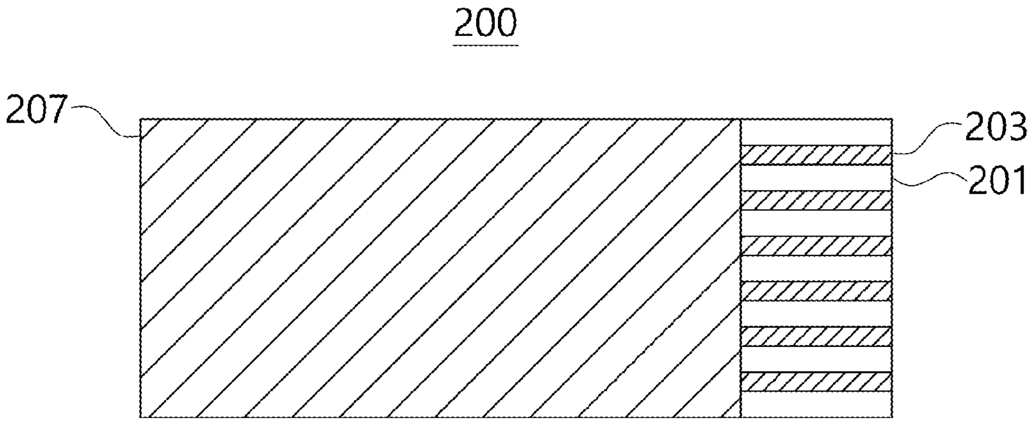

FIGS. 44A and 44B are diagrams illustrating some constituents of a device according to an embodiment. FIG. 44A is a cross-sectional view of a liquid discharge module 200 of the device according to the embodiment. FIG. 44B is a plan view of the liquid discharge module 200 of the device according to the embodiment. Hereinafter, a description will be given with reference to FIGS. 44A and 44B.

The device according to the embodiment may include the liquid discharge module in the form of a substrate for generating charged droplets. Referring to FIGS. 44A and 44B, the liquid discharge module 200 according to the embodiment may include electrodes 203 formed on a substrate 201, and a first sub substrate 205 and a second sub substrate 207 disposed above the electrode.

The substrate 201 may be provided in the form of a flat plate. The substrate 201 may have a multi-layer structure. The substrate 201 may be a printed circuit board (PCB). In the substrate 201, a hole (through-hole or via-hole) penetrating through the substrate perpendicularly to the surface direction of the substrate, or a stripline formed on or in the surface of the substrate may be located.

The electrodes 203 may be located on one surface (specifically, an upper surface) of the substrate 201. Referring to FIG. 44B, the liquid discharge module 200 may include the multiple electrodes 203 formed on one surface of the substrate 201. Referring to FIG. 44B, the multiple electrodes 203 may be located on the substrate 201 and may extend in one direction. The electrodes 203 may be arranged spaced apart from each other by a predetermined distance. It is preferable that the electrodes 203 are arranged spaced apart from each other by 1 mm to 10 mm. The multiple electrodes 203 may be arranged parallel with each other. The electrodes 203 may be a stripline or microstrip provided at the printed circuit board.

The liquid discharge module 200 may further include the first sub substrate 205 provided to at least partially cover the electrodes 203. The first sub substrate 205 may be placed spaced apart from the electrodes 203 and/or the substrate 201 by a predetermined distance. The first sub substrate 205 may be placed spaced apart from the substrate 201 by a predetermined distance, and may provide a space for liquid LQ to flow between the electrodes 203 and/or the substrate 201 and the first sub substrate 205.

Referring to FIGS. 44A and 44B, the first sub substrate 205 may be placed to cover the electrodes 203. Referring to FIGS. 44A and 44B, the first sub substrate 205 may be placed such that ends of the respective electrodes 203 are exposed. The first sub substrate 205 may be placed such that the respective ends of the multiple electrodes 20 are exposed.

The liquid discharge module 200 may further include the second sub substrate 207 placed above the first sub substrate 205. The second sub substrate 207 may be placed to cover the first sub substrate 205. The second sub substrate 207 may be placed spaced apart from the first sub substrate 205 by a predetermined distance. The second sub substrate 207 may be placed spaced apart from the first sub substrate 205 by a predetermined distance such that a space for air to be supplied between the first sub substrate 205 and the second sub substrate 207 is formed.

The liquid discharge module 200 may obtain the liquid LQ stored in the liquid storage container, and may supply the obtained liquid LQ to the surface of the substrate 201. The liquid LQ may be supplied to one surface on which the electrodes 203 on the substrate 201 are formed. The liquid LQ may flow into the space between the substrate 201 and the first sub substrate 205. The liquid LQ may spread in the region between the substrate 201 and the first sub substrate 205 because of capillarity.

The device may apply a high voltage to the electrodes 203. The device may apply a high voltage to the electrodes 203 and may supply liquid (for example, water) to the substrate 201 on which the electrodes 203 are located, to induce electrospray. When the liquid is supplied to the substrate 201 and a high voltage is applied to the electrodes 203, charged droplets are generated by the electric field formed by the electrodes 203 (specifically, the ends of the electrodes 203). When the liquid is supplied to the substrate 201 and a high voltage is applied to the electrodes 203, charged droplets are generated at the exposed portion (the portion not covered by the sub substrate) of the electrodes 203.

The liquid discharge module 200 may be connected to an air pump, and may obtain air supplied through the air pump. The air supplied through the air pump may be supplied into the space (for example, an air flow path) formed between the first sub substrate 205 and the second sub substrate 207. The air may be introduced to one side of the first sub substrate 205 and the second sub substrate 207, and may be discharged to the other side of the first sub substrate 205 and the second sub substrate 207. The air may be discharged in a direction in which the electrodes 203 are exposed.

The first sub substrate 205 and the second sub substrate 207 may be connected to the air pump and may release the air through the space formed between the first sub substrate 205 and the second sub substrate 207, thus performing the function of the particle dispersion unit which will be described later. The device may release the air to the region in which the electrodes 203 are exposed, through the space between the first sub substrate 205 and the second sub substrate 207. The device may release the air through the space between the first sub substrate 205 and the second sub substrate 207, and may thus provide non-electric force to a charged substance. The device may release the air through the space between the first sub substrate 205 and the second sub substrate 207, may provide an external force in a direction away from the electrodes 203 to a charged substance, and may thus reduce the density of space charge near the electrodes 203. In other words, the device may release the air and may reduce the charge density of space charge near the electrodes 203 so that the efficiency of generating charged droplets by the electrodes 203 is increased.

Figure 13:
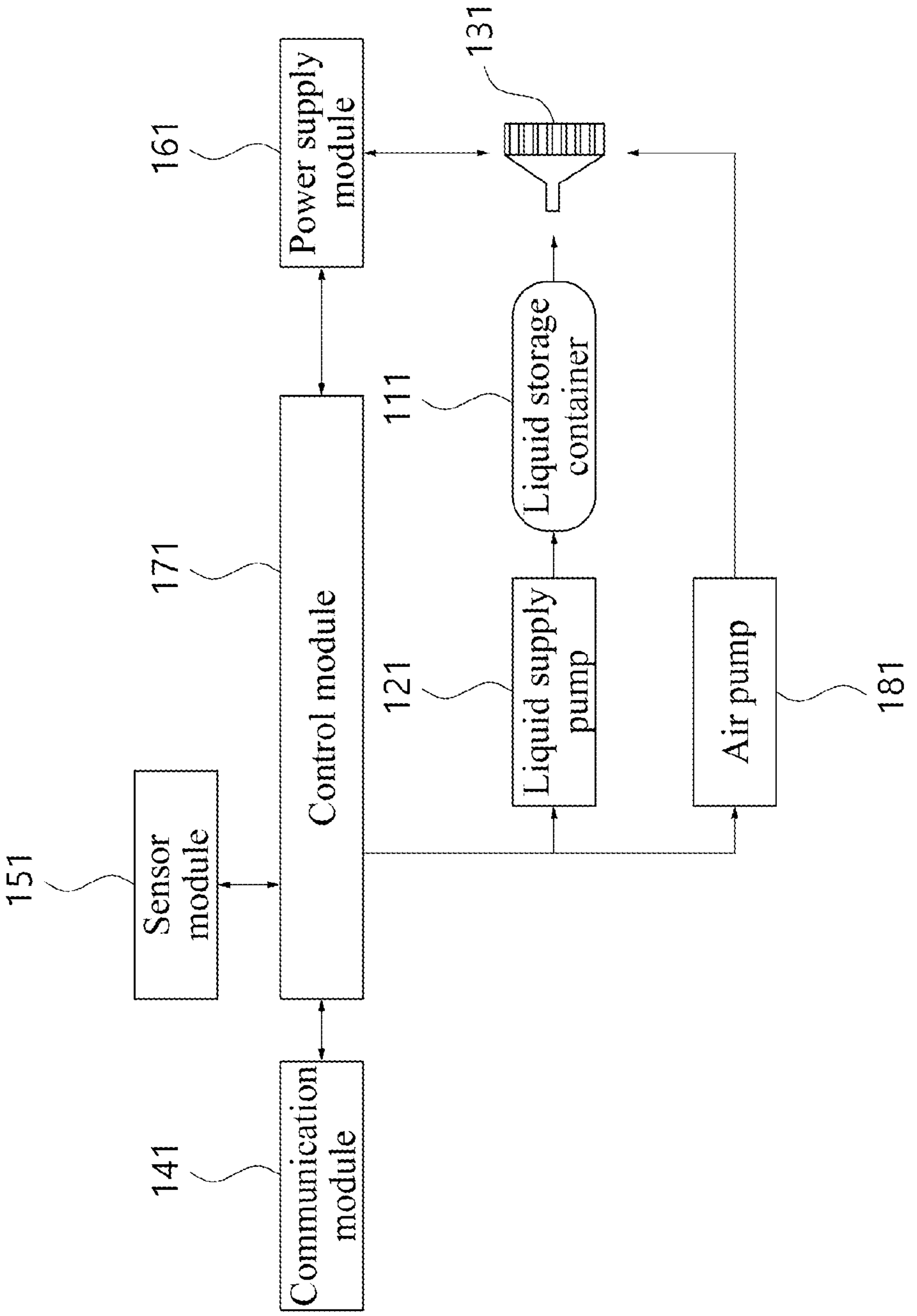
FIG. 13 is a conceptual diagram illustrating a device according to an embodiment.

FIG. 13 is a conceptual diagram illustrating a device according to an embodiment.

Referring to FIG. 13, the device according to the embodiment may include a control module 171, a power supply 161, a sensor module 151, a communication module 141, a liquid supply pump 121, an air pump 181, a liquid storage container 111, and a nozzle array 131.

The control module 171 may receive power from the power supply module 161. The control module 171 may control the power supply module 161. The control module 171 may be connected to the sensor module 151 or the communication module 141 or both. The control module 171 may control the liquid supply pump 121 and the air pump 181. The control module 171 may control the liquid supply pump 121 to supply the liquid stored in the liquid storage container to the nozzle array 131. The control module 171 may control the air pump 181 to supply gas to the nozzle array 131.

The power supply module 161 may supply power to the control module 171. The power supply module 161 may supply power to the nozzle array 131. The power supply module 161 may apply a high voltage to the individual nozzles included in the nozzle array 131.

The liquid supply pump 121 may provide the liquid stored in the liquid storage container 111 to the nozzle array 131. The air pump 181 may release gas through an air nozzle formed in the nozzle array 131.

In the meantime, although not shown in the figure described above, the liquid discharge unit or the nozzle array may further include a protective cover for safety. During the fine-particle concentration reduction operation of the device, since a high voltage is applied to the liquid discharge unit or the nozzles included in the nozzle array, the device for reducing the fine particle concentration may further include a protective cover for covering the top of the nozzles so as to prevent situations such as short circuit or inflow of foreign matter.

2.2.2 Embodiments

2.2.2.1 First Embodiment

According to an embodiment of the present disclosure, there may be provided a device for managing a fine particle concentration of a target region by supplying charges to the target region, the device including: a container configured to store liquid, at least one nozzle configured to output the liquid, a pump configured to supply the liquid from the container to the at least one nozzle, a power supply configured to supply power to the device, and a controller configured to supply the charges to the target region through the at least one nozzle by using the power supply. Herein, to the device, the details of the device described in the present disclosure may be applied.

The device may supply electric charges to the target region. The controller may supply the charges to the target region by applying a voltage to the at least one nozzle using the power supply.

The device may supply negative charges to the target region. The controller may apply a negative voltage to the at least one nozzle by using the power supply. For example, the controller may supply negative charges to the target region by using the power supply, and the controller may release negatively charged droplets through the at least one nozzle by applying a negative voltage to the at least one nozzle using the power supply.

The controller may apply a voltage equal to or higher than a first reference value to the at least one nozzle by using the power supply. The first reference value may be a threshold value that is determined to enable a sufficient current to be released to the target region through the liquid provided to the nozzle.

The controller may apply, to the at least one nozzle by using the power supply, power equal to or greater than the first reference value determined considering a predetermined effective radius value. The predetermined effective radius may be a distance to a point at which the fine particle concentration decreases by a reference ratio within a reference time period. In other words, the device may operate according to the predetermined effective radius. The effective radius may be determined considering the operating time of the device, a target reduction ratio for the fine particle concentration, the voltage applied to the nozzle, or the current output through the nozzle or all.

For example, when the effective radius is a first radius, the device outputs a first current during the reference time period such that the fine particle concentration at a distance of the first radius from the device decreases by the reference ratio within the reference time period. When the effective radius is a second radius greater than the first radius, the device outputs a second current higher than the first current during the reference time period such that the fine particle concentration at a distance of the second radius from the device decreases by the reference ratio within the reference time period.

In addition, for example, when the effective radius is a first radius, the device outputs a first current during a first time period such that the fine particle concentration at a distance of the first radius from the device decreases by the reference ratio. When the effective radius is a second radius greater than the first radius, the device outputs the first current during a second time period longer than the first time period such that the fine particle concentration at a distance of the second radius from the device decreases by the reference ratio.

The controller may apply, to the at least one nozzle by using the power supply, a voltage equal to or higher than the first reference value determined to output a current ranging from 100 μA to 10 mA through the at least one nozzle.

The controller may apply a voltage equal to or less than a second reference value to the at least one nozzle by using the power supply. The second reference value may be determined to prevent discharge of charges from the nozzle. The second reference value may be determined to prevent direct discharge, for example, corona discharge, from occurring from the nozzle. The second reference value may be determined such that the amount of current directly discharged from the nozzle does not exceed the amount of current output through the liquid released from the nozzle.

In the case in which the device includes multiple nozzles, the controller may apply a voltage equal to or higher than the first reference value to the multiple nozzles simultaneously. Alternatively, the controller may apply multiple voltage values selected within a range exceeding the first reference value to the multiple nozzles individually.

The device may form space charge. The controller may supply the charges to the target region by applying a voltage to the at least one nozzle using the power supply, and may form space charge in the target region. The controller may form, by using the power supply, the space charge that forms an electric field in the target region.

The device may form negative space charge in the target region. The controller may form negative space charge in the target region by supplying negative charges to the target region through the at least one nozzle using the power supply.

The device may charge the fine particles in the target region. The fine particles in the target region may be charged with the same polarity as the supplied charges by the supplied charges. When the device outputs negative charges, the fine particles in the target region are charged with the negative charges.

The device may provide electric force to the fine particles. The device may charge the fine particles in the target region, and may provide electric force to the charged fine particles. The controller may supply the charges to the target region by applying a voltage to the at least one nozzle using the power supply, and may provide electric force in a direction away from the device, to the fine particles in the target region charged by the supplied charges.

The electric force provided to the charged fine particles may be provided by the electric field formed by the charges supplied to at least a part of the target region. The device may form negative space charge in the target region, and the electric force provided to the fine particles may be provided by the electric field caused by at least a part of the negative space charge.

The controller may provide electric power to the fine particles by providing the electric force in a predetermined direction to the fine particles. The controller may provide electric force including a component directed to a ground, to the fine particles in the target region by using the power supply. For example, the controller may maintain, by supplying a charged substance to the target region for more than a predetermined time period, the space charge for more than the predetermined time period such that the charged fine particles are removed by receiving the electric force and moving in a ground direction.

The electric force provided to the fine particles may include a first direction component perpendicular to the ground. The electric force provided to the fine particles may include a first direction component directed to the ground. The electric force provided to the fine particles may include a second direction component parallel to the ground. The electric force provided to the fine particles may include a second direction component parallel to the ground and in a direction away from the device.

2.2.2.2 Second Embodiment

According to another embodiment of the present disclosure, there may be provided a device for managing a fine particle concentration of a target region by supplying charges to the target region, the device including: a container configured to store liquid, at least one nozzle configured to output the liquid, a pump configured to supply the liquid from the container to the at least one nozzle, a power supply configured to supply power to the device, a controller configured to supply a charged substance to the target region through the at least one nozzle by using the power supply, and a particle dispersion unit configured to provide non-electric force to the charged substance.

To the device, the details of the device described throughout the present disclosure may be selectively applied.

The controller may output charged droplets through the at least one nozzle by apply a voltage equal to or higher than a first reference value to the at least one nozzle using the power supply.

The controller may form space charge in the target region by supplying a charged substance through the at least one nozzle using the power supply. The controller may supply the charges to the target region by applying a voltage to the at least one nozzle and outputting the charged liquid through the at least one nozzle using the power supply, and may form space charge in the target region.

The particle dispersion unit may be configured to provide non-electric force by spraying an electrically neutral substance to a charged substance. To the particle dispersion unit, the details of the particle dispersion unit or the gas spray unit described in the present disclosure may be applied.

The particle dispersion unit may include at least one air nozzle for spraying gas, and may spray gas in a direction away from the nozzle to the charged substance.

The at least one nozzle may include one end from which the charged droplets are released. The one end from which the droplets are released may mean an end at which a discharge hole through which the liquid in the nozzle is output is located.

Herein, the controller may provide, by using the particle dispersion unit, non-electric force in a direction away from the one end to the charged substance in the vicinity of the one end such that the density of space charge in the vicinity of the one end is at least partially reduced. The vicinity of the one end may mean a region within a predetermined distance from the end of the nozzle. The vicinity of the one end may mean a region in which space charge enabling electric force of a meaningful size to act on the liquid positioned in the nozzle is distributed. The vicinity of the one end may mean a region within 10 cm from the end of the nozzle.

The controller may manage the density of the space charge near the one end not to make it exceed a threshold value so that the electric force made to act on the liquid positioned in the one end by the formed space charge near the one end of the nozzle is reduced. The controller may provide non-electric force including a component directed away from the one end of the nozzle, to a charged substance distributed near the one end of the nozzle such that a required voltage applied to the nozzle to output a reference current through the nozzle does not exceed a reference voltage.

For example, as the device releases a current, the density of space charge near the discharge hole of the nozzle may increase. When the density of space charge near the discharge hole increases, the current output through the nozzle when the voltage applied to the nozzle is constant (that is, when constant voltage control is performed) is reduced by the electric force made to affect the liquid in the nozzle by the space charge. Alternatively, when constant current control is performed to make the current output through the nozzle constant, the voltage applied to the nozzle increases. When a voltage equal to or higher than a predetermined level is applied to the nozzle, a problem such as direct discharge occurring through the nozzle may be caused. To minimize such a problem, the device applies non-electric force by spraying gas toward the nozzle end, thereby reducing the electric force made to act on the liquid in the nozzle end by the space charge.

2.3 Operation of Device

According to the present disclosure, there is provided a method for reducing a fine particle concentration by using a device, or a method for controlling a device for reducing a fine particle concentration. Hereinafter, the method for controlling the device, the method for reducing a fine particle concentration, and a method for effectively operating the device to reduce a fine particle concentration will be described with reference to some embodiments.

In the flowcharts shown in relation to the following embodiments, the order of shown steps is not absolute, and the positions of the steps may be changed according to an aspect.

2.3.1 General: Method for Reducing Fine Particle Concentration

The device 100 may perform a method for reducing a fine particle concentration in the air. The device or the control unit of the device may perform the method for reducing the fine particle concentration in the air in the target region, by using the units.

Figure 14:
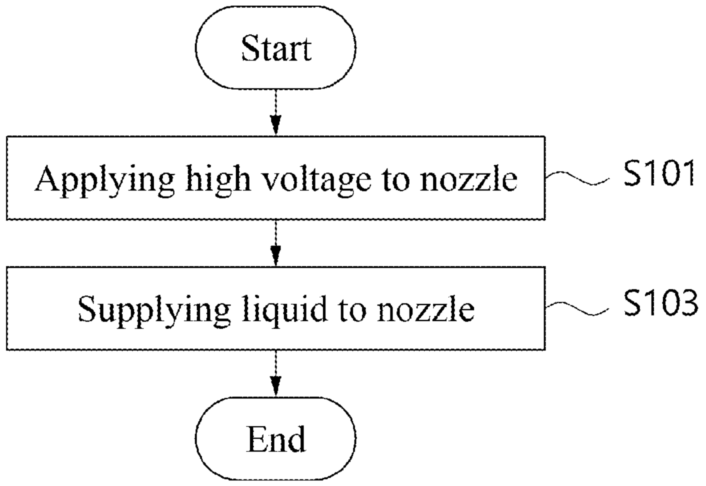
FIG. 14 is a flowchart illustrating an embodiment of a method for reducing a fine particle concentration in the air.

FIG. 14 is a flowchart illustrating an embodiment of a method for reducing a fine particle concentration in the air.

Referring to FIG. 14, the method for reducing the fine particle concentration in the air may include: applying a high voltage to a nozzle at step S101 and supplying liquid to the nozzle at step S103.

The method for reducing the fine particle concentration in the air may be performed by the device described in the present disclosure. For example, the method for reducing the fine particle concentration in the air may be performed by the device including the power supply unit, the liquid storage unit, the liquid supply unit, the liquid discharge unit, and the control unit.

The applying of the high voltage to the nozzle at step S101 may include applying a voltage equal to or higher than a predetermined value to the nozzle. For example, the applying of the high voltage to the nozzle at step S101 may include applying, by the control unit using the power supply unit, a voltage sufficient to make electrospray occur at the nozzle. The applying of the high voltage to the nozzle at step S101 may include applying a voltage equal to or less than a predetermined value to the nozzle. For example, the applying of the high voltage to the nozzle at step S101 may include applying, by the control unit using the power supply unit, a voltage in a range in which discharge (for example, direct discharge such as corona discharge) from the nozzle does not occur.

The applying of the high voltage to the nozzle at step S101 may include applying, by the control unit using the power supply unit, the high voltage to the nozzle such that charged droplets are released from the nozzle. The applying of the high voltage to the nozzle at step S101 may include applying, by the control unit using the power supply unit, the high voltage to the nozzle such that electrospray occurs at the nozzle. The applying of the high voltage to the nozzle at step S101 may include applying, by the control unit using the power supply unit, the high voltage to the nozzle such that droplets having negative charges are released from the nozzle and the negative charges are at least partially transferred to the fine particles in the air. The applying of the high voltage to the nozzle at step S101 may include applying, by the control unit using the power supply unit, the high voltage to the nozzle such that the fine particles in the air are charged by at least partially obtaining negative charges from charged droplets. The applying of the high voltage to the nozzle at step S101 may include applying, by the control unit using the power supply unit, the high voltage to the nozzle such that charged fine particles are pushed out by the electric field formed by the negative charges released from the device.

For example, the applying of the high voltage to the nozzle at step S101 may include applying, by the control module through the power supply, the high voltage equal to or higher than a reference value to multiple nozzles included in a nozzle array such that charged droplets are released from the multiple nozzles.

The supplying of the liquid to the nozzle at step S103 may include supplying the liquid having conductivity. The supplying of the liquid to the nozzle at step S103 may include providing, by the control unit through the liquid supply unit, the liquid stored in the liquid storage unit to the liquid discharge unit at a predetermined flow rate. The supplying of the liquid to the nozzle at step S103 may include providing, by the control unit through the liquid supply unit, the liquid stored in the liquid storage unit to the liquid discharge unit such that the liquid of a fixed volume per unit time is released from the nozzle.

For example, the supplying of the liquid to the nozzle at step S103 may include supplying, by the control module through the pump, the liquid stored in the liquid storage container to the nozzle array at a predetermined flow rate.

The device may further include the gas spray unit. Herein, the method for reducing the fine particle concentration in the air may further include releasing gas. The releasing of the gas may include ejecting, by the control unit through the gas spray unit, the gas to the region in which droplets are discharged. The releasing of the gas may include ejecting, by the control unit through the gas spray unit, the gas to the region in which droplets are ejected. The releasing of the gas may include ejecting, by the control unit through the gas spray unit, the gas in a first direction so as to provide a travel path for the ejected droplets. The first direction may be a direction away from the location at which the droplets occur. The releasing of the gas may include releasing, by the control unit through the gas spray unit, the gas to the region in which droplets are ejected such that evaporation or fission or both of the ejected droplets are accelerated.

The device may further include the heating unit. Herein, the method for reducing the fine particle concentration in the air may further include heating the liquid. The heating of the liquid may include heating the nozzle by the control unit through the heating unit. The heating of the liquid may include heating, by the control unit through the heating unit, the nozzle from which the liquid is released, to a predetermined temperature or higher. The heating of the liquid may include heating, by the control unit through the heating unit, the nozzle from which the liquid is released, to a predetermined temperature or higher. The heating of the liquid may include heating, by the control unit through the heating unit, the nozzle from which the liquid is released such that evaporation and/or fission of the ejected droplets are accelerated. The heating of the liquid may include heating, by the control unit through the heating unit, the storage container in which the liquid is stored, or the space in which the liquid is ejected.

The device may further include the heating unit and the gas spray unit. Herein, the method for reducing the fine particle concentration in the air may further include releasing the heated gas. The releasing of the heated gas may include heating, by the control unit through the heating unit, a gas spray nozzle (for example, an air nozzle) from which the gas is released, and releasing the gas heated to a reference temperature or higher through the gas spray unit.

In the meantime, the applying of the high voltage to the nozzle at step S101 and the supplying of the liquid to the nozzle at step S103 may be changed in the order. However, in order to secure the stability of the voltage applied to the nozzle or the stability of the current output through the nozzle, the device may provide the liquid to the nozzle after applying the voltage to the nozzle.

Figure 15:
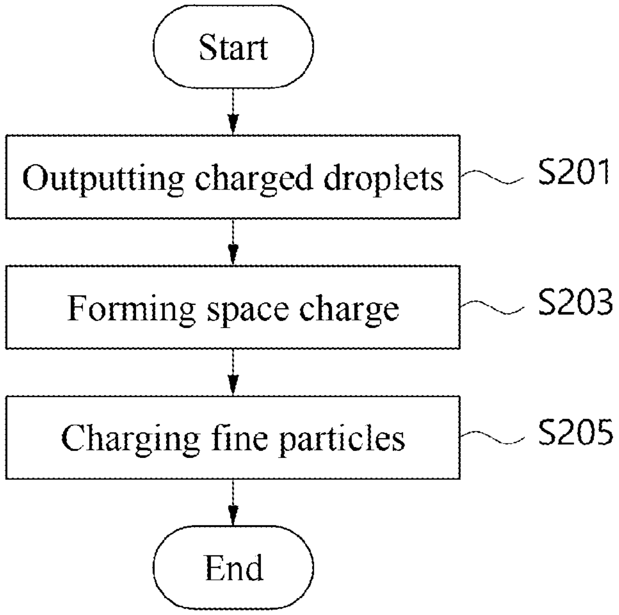
FIG. 15 is a flowchart illustrating an embodiment of a method for reducing a fine particle concentration in the air.

FIG. 15 is a flowchart illustrating an embodiment of a method for reducing a fine particle concentration in the air.

According to an embodiment, the method for reducing the fine particle concentration may include: outputting charged droplets at step S201, forming space charge at step S203, and charging fine particles in the air at step S205.

The method for reducing the fine particle concentration may be performed by the device described in the present disclosure. For example, the method for reducing the fine particle concentration in the air may be performed by the device including the power supply unit, the liquid storage unit, the liquid supply unit, the liquid discharge unit, and the control unit.

The outputting of the charged droplets at step S201 may include providing, by the control unit through the liquid supply unit, the liquid stored in the liquid storage unit to the liquid discharge unit, and outputting the charged droplets by applying a high voltage to the liquid discharge unit through the power supply unit. The outputting of the charged droplets at step S201 may include applying, by the control unit, a high voltage to the nozzle such that a predetermined amount of current (the amount of charge per hour) is released from the nozzle. For example, the control unit may output a current equal to or higher than 0.1 mA through the nozzle or nozzle array. For example, the control unit may apply a high voltage to the nozzle or nozzle array such that 4.16*10^18 charges are released per second (that is, a current of 0.67 mA is output) through the nozzle or nozzle array.

The forming of the space charge at step S203 may include forming, by the control unit through the liquid discharge unit, a space charge distribution in the target region by releasing charged droplets. The forming of the space charge at step S203 may include forming, by the control unit, the space charge distribution in the target region by releasing negatively charged droplets continuously for more than a predetermined time period. The forming of the space charge at step S203 may include forming, by the control unit through the liquid discharge unit, the space charge distribution by releasing charged droplets such that the electric field is formed in the target region.

The charging of the fine particles in the air at step S205 may include at least partially charging, by the control unit through the liquid discharge unit, the fine particles in the target region by releasing charged droplets. The charging of the fine particles in the air at step S205 may include releasing, by the control unit, negatively charged droplets continuously for more than a predetermined time period and charging the fine particles floating in the air in the target region with at least some negative charges. For example, when the concentration of fine particles (for example, ultra-fine dust of PM 2.5 or less) in the target region is 35 $\mu g/m^3$, the device may output charged droplets for one hour or more.

The method for reducing the fine particle concentration may further include assisting the formation (or maintenance) of the space charge. The assisting of the formation of the space charge may further include assisting the formation of the space charge by the control unit such that charges included in the charged droplets are sufficiently dispersed to form the sufficient density of the space charge in the target region.

The assisting of the formation of the space charge may include assisting, by the control unit using the gas spray unit or the heating unit, the formation of the space charge by the droplets released from the liquid discharge unit. The assisting of the formation of the space charge may further include ejecting, by the control unit through the gas spray unit, gas to the region in which droplets are released. The assisting of the formation of the space charge may further include ejecting, by the control unit through the gas spray unit or the heating unit or both, heated gas to the region in which droplets are released. The assisting of the formation of the space charge may further include heating, by the control unit through the heating unit, the nozzle from which the liquid is sprayed.

Although not shown in FIG. 15, the method for reducing the fine particle concentration may further include: reducing the fine particle concentration of the target region and/or removing the fine particles in the target region. The method for reducing the fine particle concentration may include maintaining the space charge formed in the target region. The device's operation of removing the fine particles in the target region or of reducing the fine particle concentration of the target region may be performed using the space charge formed by the device or using the electric field formed by the space charge.

The method for reducing the fine particle concentration may include providing electric force to charged fine particles while maintaining the state in which the space charge is formed, by the device. The method for reducing the fine particle concentration may include forming the space charge by the device, maintaining the state in which the space charge is formed, and providing electric force to charged fine particles in a direction away from the device (for example, a direction away from the discharge hole through which a charged substance from the device is released), thereby reducing the fine particle concentration of the target region. The method for reducing the fine particle concentration may include providing electric force to the charged fine particles in the target region by maintaining the space charge by the device, and making the fine particles move toward the ground or structure on the basis of at least a part of the electric force by the device and adhere to the ground or structure, thereby at least partially removing the fine particles in the target region.

According to an embodiment, the method for reducing the fine particle concentration may include applying power to the nozzle considering the characteristics of the target region. For example, considering the size, radius (for example, a radius of a target region in a hemispherical shape with the device in the center), width or height of the target region, the control unit may control a voltage value applied to the liquid discharge unit through the power supply unit or a current value output from the liquid discharge unit through the power supply unit. As a specific example, when the target region has a first radius, the control unit performs control such that the current value output from the liquid discharge unit through the power supply unit becomes a first current value. When the target region has a second radius greater than the first radius, the control unit performs control such that the current value output from the liquid discharge unit through the power supply unit becomes a second current value.

Figure 16A:
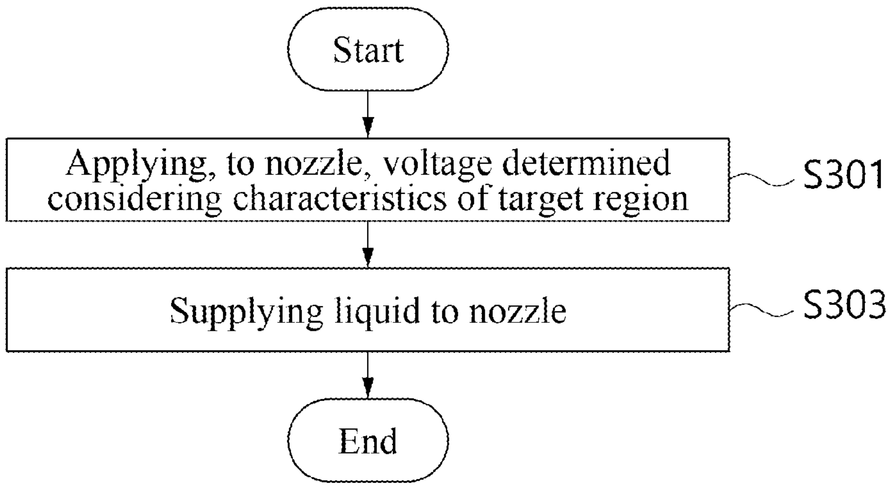
FIGS. 16A and 16B are diagrams illustrating a method for reducing a fine particle concentration according to another embodiment.
Figure 16B:
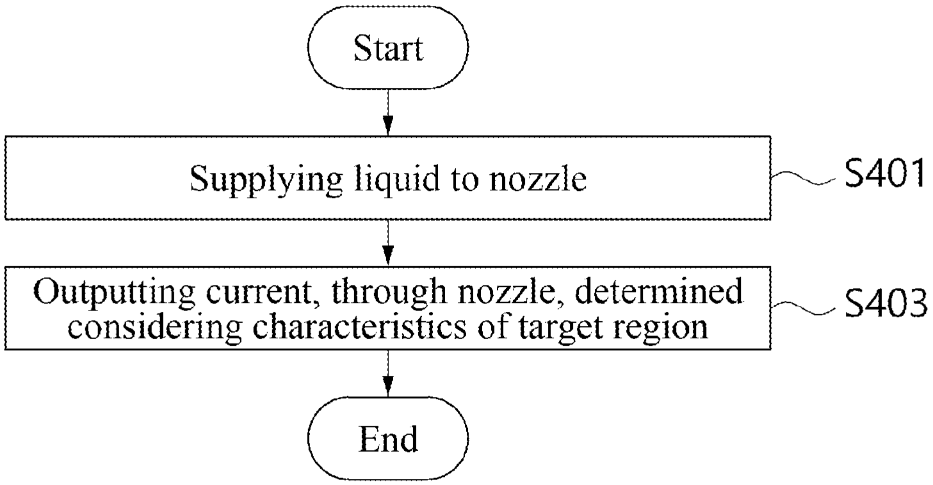

FIGS. 16A and 16B are flowcharts illustrating an embodiment of a method for reducing a fine particle concentration in the air. The method for reducing the fine particle concentration in the air may be performed by the device described in the present disclosure, for example, the device including the power supply unit, the liquid storage unit, the liquid supply unit, the liquid discharge unit, and the control unit.

According to an embodiment, there is provided a method for reducing a fine particle concentration of a predetermined target region. According to an embodiment, the method for reducing the fine particle concentration may include: applying, to a nozzle, a voltage determined considering characteristics of a target region at step S301 and supplying liquid to the nozzle at step S303.

The supplying of the liquid to the nozzle at step S303 may be realized similarly to that in the embodiment described above in relation to FIG. 15.

The applying of a high voltage to the nozzle considering the characteristics of the target region at step S301 may include applying a voltage to the nozzle considering the size of the target region. The voltage applied to the nozzle may be determined on the basis of the radius of the target region determined with the location of the device in the center. The voltage applied to the nozzle may be determined on the basis of the radius of the target region of the device and the time taken to reduce the fine particles to a reference concentration. The voltage applied to the nozzle may be determined according to the radius of the target region of the device, and/or according to a reference current determined on the basis of the radius of the target region and the time taken to reduce the fine particles to a reference concentration.

For example, the radius (or effective radius) R of the target region may have a positive correlation with the output power. The radius R of the target region may be determined in proportion to the log value of the output power. (The current output through the nozzle or the voltage applied to the nozzle may be determined according to the output power. The output power may be expressed as the product of the voltage applied to the nozzle and the current output through the nozzle.) The radius R of the target region may have a positive correlation with the time T during which the device operates. In other words, As a specific example, when the radius R of the target region is 50 m, the operating time of the device may be determined according to the output of the device. For example, when the radius R of the target region is 50 m and the output of the device is 300 W, the time (that is, the operating time of the device) taken for the fine particle concentration at a radius of 50 m from the device to be reduced by 50% may be determined to be 2 hours and 30 minutes. Alternatively, when the radius R of the target region is 50 m and the output of the device is 1 kW, the time taken for the fine particle concentration at a radius of 50 m from the device to be reduced by 50% may be determined to be 1 hour and 30 minutes. When the radius R of the target region is 50 m and the output of the device is 10 KW, the time taken for the fine particle concentration at a radius of 50 m from the device to be reduced by 50% may be determined to be less than 1 hour, for example, 50 minutes.

As another specific example, when the operating time of the device is 2 hours, the effective radius R of the device may be determined according to the output of the device. For example, when the operating time of the device is 2 hours and the output of the device is 300 W, the radius R (or the distance from the device to the point at which the fine particles concentration is reduced by 50%) of the target region of which the fine particles concentration is to be reduced may be determined to be 50 m or less, for example, about 45 m. When the operating time of the device is 2 hours and the output of the device is 1 kW, the radius R of the target region of which the fine particle concentration is to be reduced may be determined to be 50 m or more, for example, about 52 m. When the operating time of the device is 2 hours and the output of the device is 10 KW, the radius R of the target region of which the fine particle concentration is to be reduced may be determined to be 60 m or more, for example, about 65 m.

When the target region is predetermined as a region having a radius R from the device, the voltage applied to the nozzle may be a value determined according to the radius. When the radius of the target region is changed, the voltage applied to the nozzle may be changed. For example, a first voltage applied to the nozzle to reduce the fine particle concentration by a first ratio during a first time period in a first target region having a first radius may be lower than a second voltage for reducing the fine particle concentration by the first ratio during the first time period in a second target region having a second radius greater than the first radius.

FIG. 16B is a diagram illustrating a method for reducing a fine particle concentration according to another embodiment. According to an embodiment, the method for reducing the fine particle concentration may include: supplying liquid to a nozzle at step S401 and outputting a current through the nozzle, the current being determined considering characteristics of a target region at step S403.

The supplying of the liquid to the nozzle at step S401 may be realized similarly to that described above. Before supplying the liquid to the nozzle, a voltage of a predetermined level may be applied to the nozzle in advance. Alternatively, before supplying the liquid to the nozzle, providing non-electric force to a nozzle end portion may be performed.

The outputting of the current through the nozzle considering the characteristics of the predetermined target region at step S403 may include outputting, by the control unit, a nozzle current (the amount of charge released per hour from the nozzle) determined on the basis of a preset radius R of the target region. The nozzle current may be determined as a current value that needs to be output from the device during a reference time period such that the fine particle concentration in the target region having the radius R is reduced by a reference ratio within the reference time period through the nozzle (or nozzle array) of the device.

When the device outputs a constant current continuously to reduce the fine particle concentration in the target region by the reference ratio during the reference time period, the different nozzle currents may be determined according to the radius of the target region. For example, a first current for reducing the fine particle concentration by a first ratio during a first time period in a first target region having a first radius may be lower than a second current for reducing the fine particle concentration by the first ratio during the first time period in a second target region having a second radius greater than the first radius.

A reference current may be the average current output from the nozzle during the reference time period. In other words, the device does not necessarily output a constant current value continuously, and may output a fluctuating current while maintaining an average current value in a reference current range.

In other words, the voltage V applied to the nozzle or the current I output through the nozzle may be determined considering the number of nozzles (when the device includes a nozzle array), the radius R (or a size or volume parameter corresponding thereto) of the target region, a target reduction ratio for the fine dust concentration, and/or the reference time period T.

The applying of the voltage to the nozzle considering the characteristics of the target region at step S301 or the outputting of the current considering the characteristics of the target region at step S403 may include applying the voltage to the nozzle or outputting the current considering the fine particle concentration of the target region, the temperature of the target region, or the humidity of the target region.

For example, the control unit may apply, to the nozzle, the voltage determined in proportion to the fine particle concentration of the target region, or may output, through the nozzle, the current determined using a positive correlation with the fine particle concentration of the target region. In addition, for example, the control unit may apply, to the nozzle, the voltage determined in proportion to the humidity of the target region, or may output, through the nozzle, the current determined in proportion to the humidity of the target region.

Figure 17:
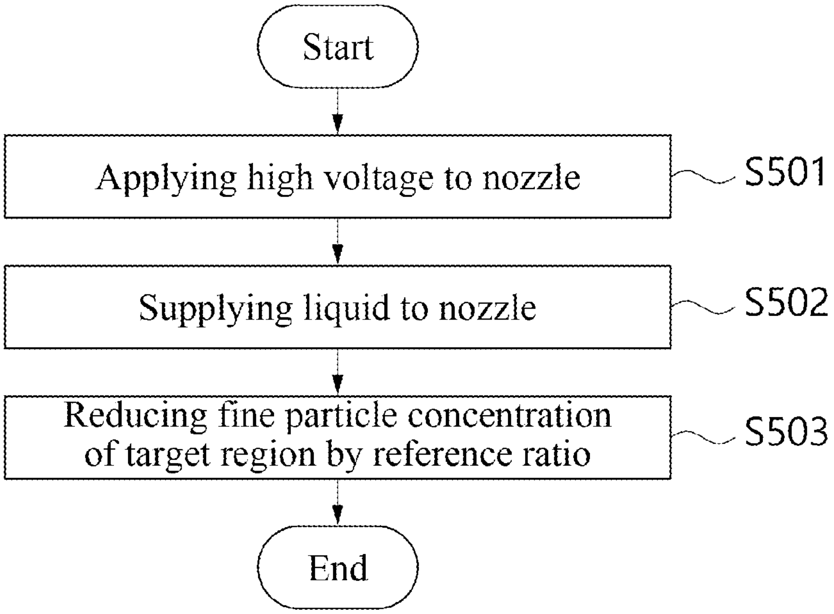
FIG. 17 is a diagram illustrating a method for controlling a learning device according to an embodiment of the present disclosure.

FIG. 17 is a flowchart illustrating an embodiment of a method for reducing a fine particle concentration in the air. The method for reducing the fine particle concentration in the air may be performed by the device described in the present disclosure, for example, the device including the power supply unit, the liquid storage unit, the liquid supply unit, the liquid discharge unit, and the control unit.

Referring to FIG. 17, the method for reducing the fine particle concentration according to the embodiment may include: applying a high voltage to a nozzle at step S501, supplying liquid to the nozzle at step S502, and reducing the fine particle concentration of a target region by a reference ratio at step S503.

The reducing of the fine particle concentration by the reference ratio at step S503 may include releasing, by the control unit, charged droplets continuously or repeatedly such that the fine particle concentration of the target region is decreased from a first concentration to a second concentration reduced by the reference ratio from the first concentration. The reducing of the fine particle concentration by the reference ratio at step S503 may include releasing, by the control unit, charged droplets continuously or repeatedly such that the fine particle concentration of the target region is decreased to a reference concentration reduced by the reference ratio from the initial concentration.

The reducing of the fine particle concentration of the target region by the reference ratio at step S503 may include applying, by the control unit, a voltage to the nozzle such that the fine particle concentration of the target region is reduced by the reference ratio. The voltage applied to the nozzle may be determined such that the fine particle concentration of the target region is reduced by the reference ratio when a predetermined reference time period has elapsed from the time point at which the device started.

The reducing of the fine particle concentration of the target region by the reference ratio at step S503 may include, by the control unit, obtaining the fine particle concentration of the target region using the sensor unit and maintaining the high voltage applied to the nozzle when the fine particle concentration of the target region is not reduced by the reference ratio.

The fine particle concentration of the target region may mean an average fine particle concentration in the target region. The fine particle concentration of the target region may mean a fine particle concentration sampled at a particular point in the target region.

Figure 18:
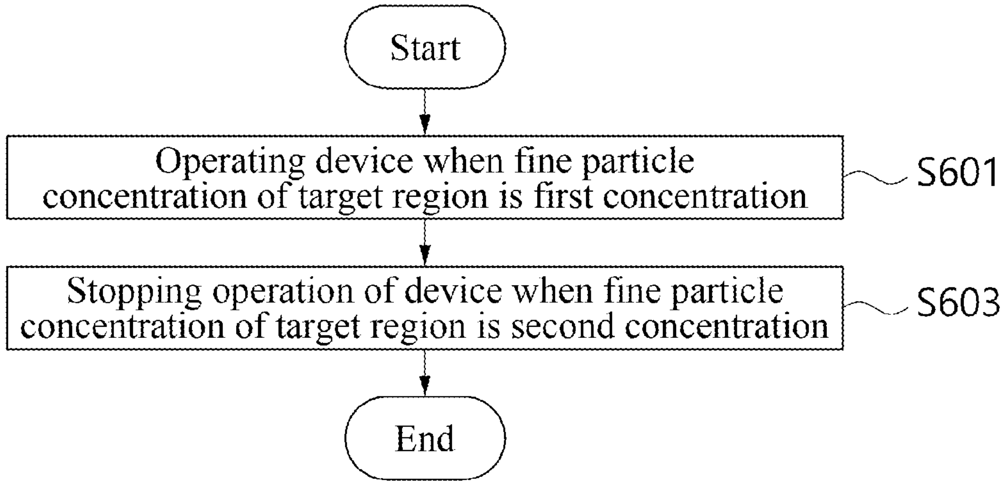
FIG. 18 is a flowchart illustrating a method for reducing a fine particle concentration according to an embodiment.

FIG. 18 is a flowchart illustrating a method for reducing a fine particle concentration according to an embodiment.

Referring to FIG. 18, the method for reducing the fine particle concentration may include: operating the device when the fine particle concentration of a target region is a first concentration at step S601, and stopping the operation of the device when the fine particle concentration of the target region is a second concentration at step S603.

The operating of the device when the fine particle concentration of the target region is the first concentration at step S601 may include obtaining the fine particle concentration of the target region. The operating of the device when the fine particle concentration of the target region is the first concentration at step S601 may include determining whether the fine particle concentration is equal to or greater than the first concentration. The operating of the device when the fine particle concentration of the target region is the first concentration at step S601 may include obtaining the fine particle concentration of the target region, and starting a fine particle management operation of the device when the fine particle concentration is equal to or greater than the first concentration.

The stopping of the operation of the device when the fine particle concentration of the target region is the second concentration at step S603 may include obtaining the fine particle concentration of the target region while maintaining the operation of the device. The stopping of the operation of the device when the fine particle concentration of the target region is the second concentration at step S603 may include determining whether the fine particle concentration is equal to or less than the second concentration. The stopping of the operation of the device when the fine particle concentration of the target region is the second concentration at step S603 may include stopping the fine particle management operation of the device when the fine particle concentration is equal to or less than the second concentration. The second concentration may be a value reduced by a predetermined ratio or value from the first concentration.

Figure 19:
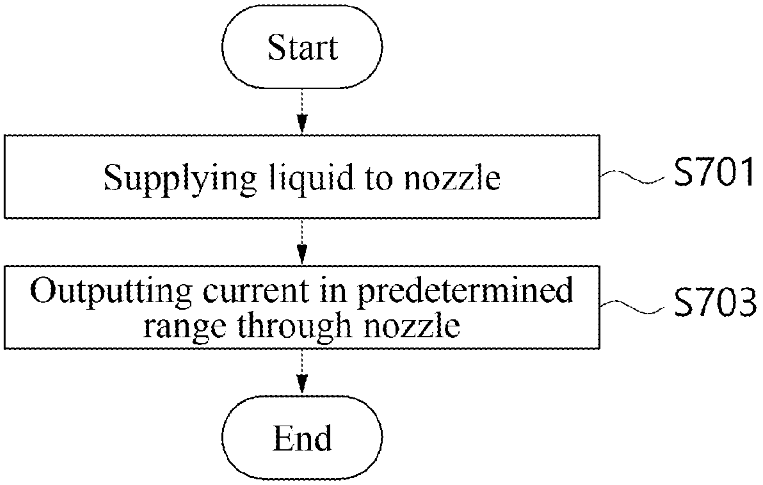
FIG. 19 is a flowchart illustrating a method for reducing a fine particle concentration according to an embodiment.

FIG. 19 is a flowchart illustrating an embodiment of a method for reducing a fine particle concentration in the air. According to an embodiment, the method for reducing the fine particle concentration may include: supplying liquid to a nozzle at step S701, and outputting a current in a predetermined range through the nozzle at step S703.

The method for reducing the fine particle concentration in the air may be performed by the device described in the present disclosure, for example, the device including the power supply unit, the liquid storage unit, the liquid supply unit, the liquid discharge unit, and the control unit.

The supplying of the liquid to the nozzle at step S701 may be realized similarly to that described above. Before supplying the liquid to the nozzle, a voltage of a predetermined level may be applied to the nozzle in advance. Alternatively, before supplying the liquid to the nozzle, providing non-electric force to a nozzle end portion may be performed.

The outputting of the current in the predetermined range through the nozzle at step S703 may include outputting a reference current through the nozzle by the control unit using the liquid supply unit and/or the power supply unit. The reference current may be a value in a reference range. The reference range may be determined considering the size of the target region, or the time at which the current is output. In the case in which the device includes a nozzle array, the current applied to the individual nozzles may be determined considering the number of the nozzles included in the nozzle array.

For example, a predetermined range of the current may be between several tens of μA and several hundreds of mA. For example, the predetermined range of the current may be a range of 100 μA to 10 mA. The predetermined range of the current may be a range of 500 μA to 2 mA. In the case in which the device includes a nozzle array, the control unit may control the power supply such that the current output through charged droplets from the nozzle array is in the predetermined range.

As a specific example, in the case in which the device includes a single nozzle, the predetermined range of the current may be determined to be a range of 1 μA to 1 mA. Alternatively, in the case in which the device includes a nozzle array, the predetermined range of the current may be determined to be a range of 10 μA to 10 mA.

2.3.2 Device Management Operation

According to an embodiment, there may be provided a method for managing a device for performing a method for reducing a fine particle concentration in the air.

The device for reducing the fine particle concentration in the air described in the present disclosure may perform a method for managing a state of the device or the fine-particle concentration reduction operation of the device. The method for managing the device described below may be performed by the device described in the present disclosure, for example, the device including the power supply unit, the liquid storage unit, the liquid supply unit, the liquid discharge unit, and the control unit.

The method for managing the device may be performed using the device having: a fine particle reduction mode in which space charge is formed in a target region by releasing charged droplets, and a nozzle cleaning mode in which a nozzle is cleaned.

According to an embodiment, in the fine particle reduction mode, the device may output charged droplets at a low flow rate to form an electric field in the target region. In the nozzle cleaning mode, the device may clean the inner surface of the nozzle by outputting droplets at a flow rate higher than that in the fine particle reduction mode.

The device described in the present disclosure may include a nozzle, and may release charged droplets from the nozzle by applying a high voltage to the nozzle. Herein, because of the high voltage applied to the nozzle, a particular component included in the liquid may adhere to the inner surface of the nozzle. For example, when a negative (−) voltage is applied to the nozzle, a positive (+) ion component may adhere to the inner surface of the nozzle. In order to remove such a substance adhering to the inner surface of the nozzle, a method for managing the nozzle may be provided.

Figure 20:
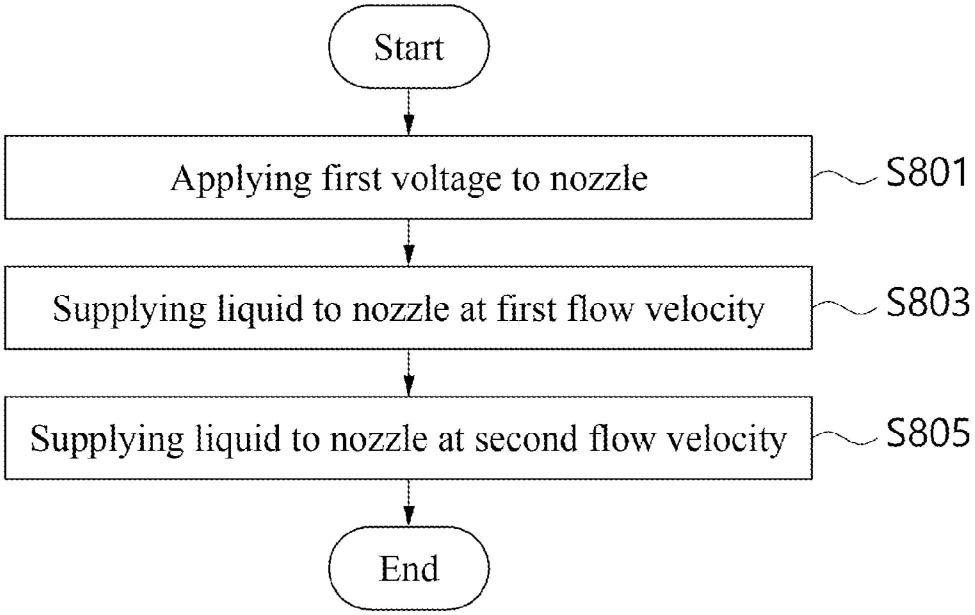
FIG. 20 is a flowchart illustrating an embodiment of a method for managing a device for reducing a fine particle concentration in the air.

FIG. 20 is a flowchart illustrating an embodiment of a method for managing a device for reducing a fine particle concentration in the air.

Referring to FIG. 20, the method for managing the device may include: applying a first voltage to a nozzle at step S801, supplying liquid to the nozzle at a first flow velocity at step S803, and supplying liquid to the nozzle at a second flow velocity higher than the first flow velocity at step S805.

The applying of the first voltage to the nozzle at step S801 may include providing, by the control unit through the power supply, the first voltage to the nozzle according to a fine particle reduction mode. The applying of the first voltage to the nozzle at step S801 may include applying, by the control unit, a voltage sufficient to generate charged droplets at the nozzle. The first voltage may be a voltage for causing electrospray to occur in the discharge hole of the nozzle. The applying of the first voltage to the nozzle may be realized similarly to the embodiments of applying a voltage to a nozzle described in relation to the method for reducing the fine particle concentration.

The supplying of the liquid to the nozzle at the first flow velocity at step S803 may include supplying, by the control unit through the power supply, the liquid to the nozzle at the first flow velocity according to the fine particle reduction mode. For example, the supplying of the liquid to the nozzle at the first flow velocity may include supplying, by the control unit through the power supply, the liquid to the nozzle at a flow velocity of several μL to several mL per minute.

The supplying of the liquid to the nozzle at the second flow velocity higher than the first flow velocity at step S803 may include supplying, by the control unit through the liquid supply unit or the pump, the liquid to the nozzle at the second flow velocity according to a nozzle cleaning mode. The supplying of the liquid to the nozzle at the second flow velocity higher than the first flow velocity may include supplying, by the control unit through the liquid supply unit or the pump, the liquid to the nozzle at the second flow velocity to remove foreign matter deposited at or adhering to the nozzle. For example, the supplying of the liquid at the second flow velocity may include supplying, by the control unit through the liquid supply unit or the pump, the liquid at a flow velocity of several tens of mL or more per hour.

In the meantime, the supplying of the liquid to the nozzle at the first flow velocity at step S803 may include supplying the liquid to the nozzle at a first flow rate, and supplying the liquid to the nozzle at a second flow rate higher than the first flow rate.

The nozzle cleaning mode may be entered when the current value output from the device is equal to or lower than a predetermined value, or when the amount of liquid released per unit time from the device is equal to or less than a predetermined amount.

In the fine particle reduction mode, the device may output charged droplets to form an electric field in the target region. In the nozzle cleaning mode, the device may clean the inner surface of the nozzle by outputting a smaller current at a flow velocity higher than that in the fine particle reduction mode (or a flow rate higher than that in the fine particle reduction mode).

The method for managing the device may further include applying a second voltage lower than the first voltage to the nozzle. The method for managing the device may further include stopping the applying of the voltage to the nozzle.

The supplying of the liquid at the second flow velocity higher than the first flow velocity may include supplying, by the control unit through the liquid supply unit and the power supply, the liquid to the nozzle at the second flow velocity higher than the first flow velocity while the second voltage lower than the first voltage is applied to the nozzle. The supplying of the liquid at the second flow velocity higher than the first flow velocity may include stopping, by the control unit, the applying of the power to the nozzle, and supplying the liquid at the second flow velocity higher than the first flow velocity.

In the meantime, the device may manage the nozzle while maintaining the formation of the electric field or space charge in the target region. In other words, while operating in the nozzle cleaning mode, the device may apply a voltage to the nozzle such that a sufficient current is output through the nozzle. The method for managing the nozzle may include increasing only the flow velocity of the liquid supplied to the nozzle while maintaining the current (or the amount of charge output per hour) output from the device, thereby managing the nozzle while performing the fine particle reduction function of the device.

According to another embodiment, the device may include a nozzle cleaning mode in which the inner surface of the nozzle is cleaned by outputting gas through the nozzle from which droplets are output.

The device described in the present disclosure may include an air pump for outputting gas. Depending on a case, the air pump may be connected to the air nozzle from which gas is output or to the nozzle from which the liquid is released. The device may provide gas to the nozzle from which the liquid is released, through the air pump so as to clean the inner surface of the nozzle through which the liquid passes.

The method for managing the device may include: applying a first voltage to the nozzle, providing a first liquid to the nozzle at a first flow velocity (or a second flow rate), and providing a second liquid to the nozzle at a second flow velocity (or a second flow rate). The second flow velocity may be higher than the first flow velocity (or the second flow rate is higher than the first flow rate).

The applying of the first voltage to the nozzle may be realized similarly to that in the above-described embodiment.

The providing of the first liquid to the nozzle at the first flow velocity may include supplying a liquid substance to the nozzle at the first flow velocity. Supplying the liquid substance to the nozzle while the first voltage is applied to the nozzle may be included. The providing of the first liquid to the nozzle at the first flow velocity may be realized similarly to the supplying of the liquid to the nozzle at the first flow velocity described above.

The providing of the second liquid to the nozzle at the second flow velocity may include providing gas to the nozzle. The providing of the second liquid to the nozzle at the second flow velocity may include supplying, by the control unit through the liquid supply unit or the pump, gas to the nozzle at the second flow velocity according to the nozzle cleaning mode. The providing of the second liquid to the nozzle at the second flow velocity may further include providing the second liquid to the nozzle while the first voltage is applied to the nozzle.

For example, the method for managing the device may further include applying a second voltage lower than the first voltage to the nozzle. The method for managing the device may further include stopping the applying of the voltage to the nozzle. Herein, the providing of the second liquid to the nozzle at the second flow velocity may further include providing the second liquid to the nozzle while the second voltage lower than the first voltage is applied to the nozzle. The providing of the second liquid to the nozzle at the second flow velocity may further include providing the second liquid to the nozzle while a voltage is not applied to the nozzle.

Although the method for removing foreign matter at the nozzle by increasing the flow velocity and the method for cleaning the nozzle by using air have been described above, the present disclosure is not limited thereto. For example, in the nozzle cleaning mode, the control unit may clean or manage the nozzle by heating the nozzle, by changing the property of the liquid supplied to the nozzle, or may changing the property of the voltage applied to the nozzle.

The method for managing the device may include obtaining state information or operation state information of the device, and transferring the same to a management device. The device may be generally located at a long distance from the management device (or management server). Accordingly, in order for a user or manager to recognize whether the internal state of the device or the fine particle reduction operation state of the device is a normal state, information needs to be transferred to the management device.

The management device may be realized as an external control device or an external control server. The management device may obtain and store state information of the device over time for management.

Figure 21:
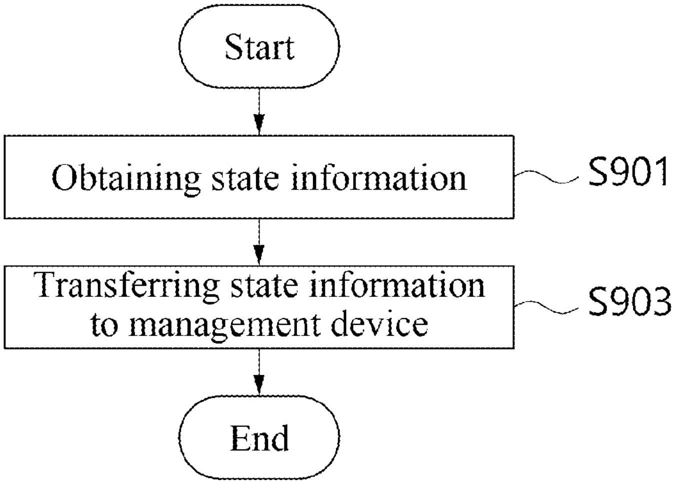
FIG. 21 is a flowchart illustrating an embodiment of a method for managing a device for reducing a fine particle concentration in the air.

FIG. 21 is a flowchart illustrating an embodiment of a method for managing a device for reducing a fine particle concentration in the air. The method for managing the device may be performed by the device including the sensor unit and the communication unit.

Referring to FIG. 21, the method for managing the device may include: obtaining state information by the device at step S901, and transferring the state information to the management device at step S903.

The obtaining of the state information by the device at step S901 may include obtaining, by the control unit through a sensing unit, the state information of the units constituting the device. The state information may include information on whether the modules constituting the device operate normally, or on whether the fine particle reduction operation is performed normally.

The transferring of the state information to the management device by the device at step S903 may include transferring, by the control unit through the communication unit, the obtained state information to the external management device. The transferring of the state information to the management device may include generating, by the control unit, user guidance on the basis of the obtained state information, and outputting the generated guidance to the management device.

Instead of outputting the state information to the external management device, the device may output the state information through the output unit provided in the device.

2.3.3 Charge Density Management Operation

As the device forms the space charge by releasing charges continuously, the density of the space charge near the nozzle of the device may increase. When the density of the space charge near the nozzle increases, the droplets subjected to electrospray through the nozzle are reduced in response to applying the same voltage to the nozzle. Alternatively, when the density of the space charge near the nozzle increases, the voltage applied to output the same current through the nozzle increases. In this case, there may be a problem that the space charge does not sufficiently cover the target region, or that the efficiency of the device decreases, or that discharge occurs from the nozzle.

Regarding the problem, there is provided a method for managing the density of the space charge near the nozzle, the voltage applied to the nozzle, or the amount of current released from the nozzle.

The device for reducing the fine particle concentration in the air described in the present disclosure may perform the operation of managing the density of the space charge near the nozzle. The method described below may be performed by the device described in the present disclosure, for example, the device including the power supply unit, the liquid storage unit, the liquid supply unit, the liquid discharge unit, and the control unit.

According to an embodiment, the method for managing the density of the space charge near the nozzle may include managing the charge density near the discharge hole of the nozzle such that the voltage applied to the nozzle to output a current equal to or higher than a reference value does not exceed a threshold value.

Figure 22:
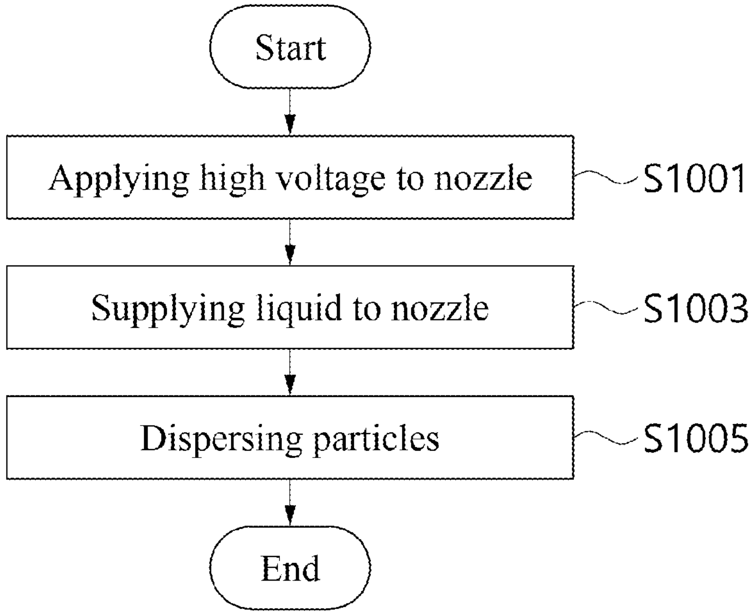
FIG. 22 is a flowchart illustrating an embodiment of a method for managing a density of space charge in the air near a nozzle.

FIG. 22 is a flowchart illustrating an embodiment of a method for managing a density of space charge in the air near a nozzle. The method for managing the voltage may be performed by the device including the particle dispersion unit (or gas spray unit).

Referring to FIG. 22, the method for managing the density of the space charge near the nozzle may include: applying a high voltage to the nozzle at step S1001, supplying liquid to the nozzle at step S1003, and dispersing particles at step S1005. The applying of the high voltage to the nozzle at step S1001 and the supplying of the liquid to the nozzle at step S1001 may be realized similarly to those in the above-described embodiments.

The dispersing of the particles at step S1005 may include dispersing, by the control unit using the particle dispersion unit, charged particles by applying non-electric force. The charged particles may include the droplets released from the nozzle, children droplets generated from fission of droplets, or charges generated from droplets. The dispersing of the particles may include dispersing, by the control unit using the particle dispersion unit, the charged particles by applying non-electric force in a direction away from the discharge hole of the nozzle. The dispersing of the particles may include applying, by the control unit using the particle dispersion unit, non-electric force near the discharge hole such that the charge density near the discharge hole of the nozzle is reduced. The non-electric force may mean physical force that does not have an electrical or magnetic influence on the charges released by the device. Near the discharge hole, the non-electric force made to act on the charged substance by the particle dispersion unit may be greater than the electric force acting on the charged substance. In other words, repulsive force by the space charge and physical force by the particle dispersion unit may act on the charged substance positioned near the discharge hole. Herein, near the discharge hole, the magnitude of the physical force acting on the charged substance by the particle dispersion unit may be greater than that of the repulsive force acting on the charged substance by the space charge.

The dispersing of the particles at step S1005 may include spraying, by the control unit using the gas spray unit, gas toward the discharge hole of the nozzle through which droplets are discharged. The dispersing of the particles at step S1005 may include spraying, by the control unit using the gas spray unit, gas in a direction away from the discharge hole of the nozzle. The dispersing of the particles may include spraying gas by the control unit using an air nozzle that is placed in a direction parallel to the nozzle from which droplets are released.

2.3.4 Time Series Control Operation

According to an embodiment, in a method for managing a fine particle concentration, when the device operates for more than a predetermined time period, a method for performing different controls over time may be provided to manage the fine particle concentration effectively. The following method may be performed by the device described in the present disclosure, for example, the device including the liquid discharge unit, the liquid supply unit, the power supply unit, and the control unit, and ejecting charged fine droplets.

The device described in the present disclosure may form the space charge in the target region by releasing charged droplets, and may charge the fine particles in target region to make the charged fine particles pushed out under the influence of the space charge or the electric field caused by the space charge. The operations or effects of the device may be achieved sequentially over time. In other words, the device may operate differently over time. The device may be controlled differently over time.

Figure 23A:
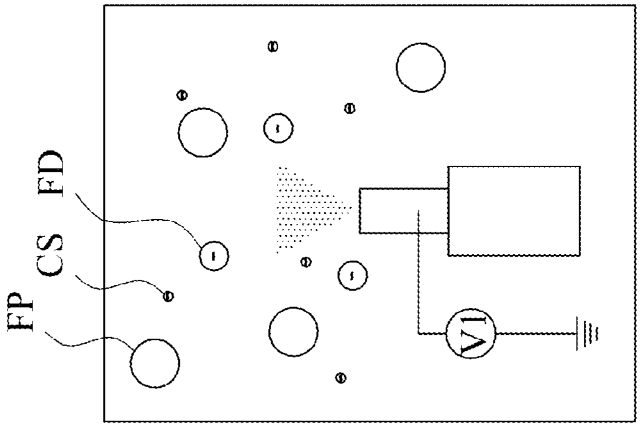
FIGS. 23A through 23C are diagrams illustrating a method for controlling a device over time.
Figure 23B:
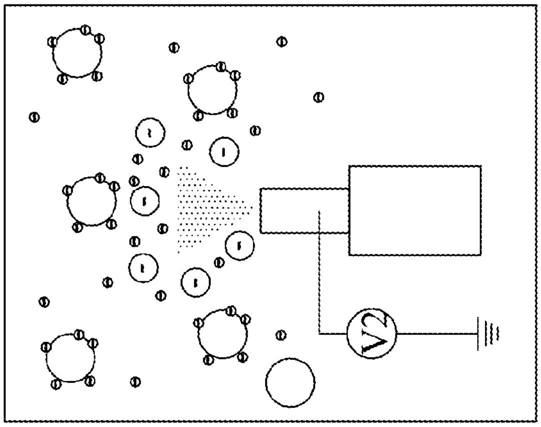
Figure 23C:
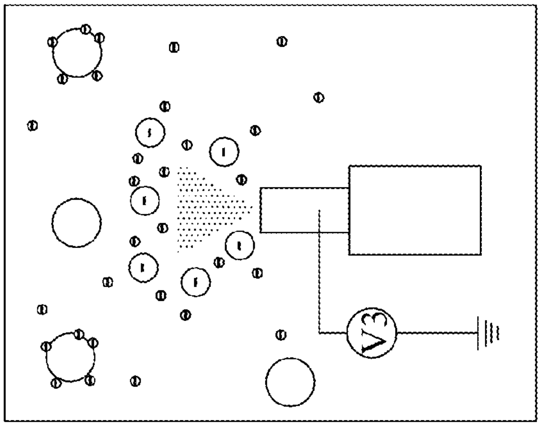

FIGS. 23A through 23C are diagrams illustrating a method for controlling a device over time.

FIG. 23A simply shows the device and its surroundings at a time point immediately after starting the operation of the device or at a time point at which a short time has passed after starting the operation of the device.

Referring to FIG. 23A, the device may generate negatively charged fine droplets FDs by applying a first voltage V1 to a nozzle. The device may supply a charged substance CS to the target region in which the fine particles FPs are distributed.

Referring to FIG. 23A, near the time point of operating the device, the total amount of charge released from the device is small, so the density of the space charge near the device or in the target region may be formed very low.

FIG. 23B simply shows the device and its surroundings at a time point at which the device has been operated for a predetermined time period, for example, at a time point at which several seconds have passed after operating the device.

Referring to FIG. 23B, the device may generate negatively charged fine droplets FDs by applying a second voltage V2 to a nozzle.

Referring to FIG. 23B, after operating the device, when a predetermined time period or more has passed, the space charge may be formed near the device and in the target region by the charges released from the device. Herein, the distribution of the density of the space charge may be maintained by the charges released from the device. The formed space charge may have a high density near the device, and the density may decrease as it goes away from the device. In addition, after operating the device, when a predetermined time period or more has passed, the fine particles of the target region is at least partially charged. The fine particles may be charged by colliding with the charged substance (droplets, children droplets, or a charge transfer substance).

FIG. 23C simply shows the device and its surroundings at a time point at which the device has been sufficiently operated, for example, at a time point at which several tens of minutes have passed after operating the device.

Referring to FIG. 23C, the device may generate negatively charged fine droplets FDs by applying a third voltage V3 to a nozzle.

Referring to FIG. 23C, as the device supplies charges for a sufficient time period, the space charge formed near the device may be maintained, and the fine particles in the target region may be pushed out under the influence of the maintained space charge.

Hereinafter, a method for managing a fine particle concentration will be described with reference to FIGS. 23A to 23C.

Figure 24:
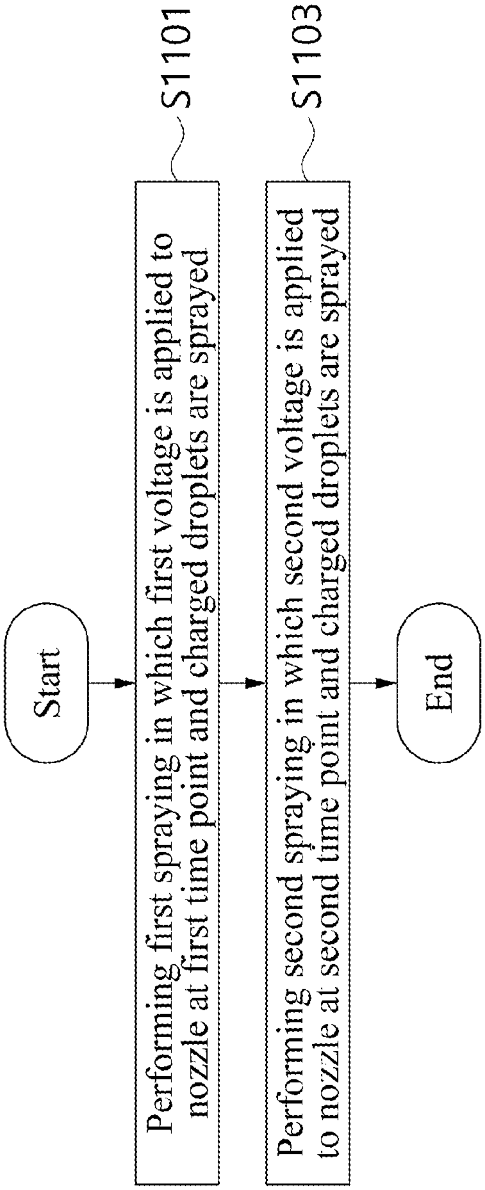
FIG. 24 is a diagram illustrating an embodiment of a voltage applied to a nozzle of a device and a current output from the nozzle, at a first time point t1 and a second time point t2.

FIG. 24 is a diagram illustrating a method for managing a fine particle concentration according to an embodiment. Referring to FIG. 24, the method for managing the fine particle concentration may include: performing a first spraying in which a first voltage is applied to a nozzle at a first time point and charged droplets are sprayed at step S1101, and performing a second spraying in which a second voltage is applied to the nozzle at a second time point and charged droplets are sprayed at step S1103.

The device and its surroundings at the first time point may be in the state described with reference to FIG. 23A. The device and it surroundings at the second time point may be in the state described with reference to FIG. 23B.

The performing of the first spraying in which the first voltage is applied to the nozzle at the first time point and the charged droplets are sprayed at step S1101 may include applying, by the control unit using the power supply unit, a high voltage to the nozzle such that electrospray occurs at the nozzle end. The performing of the first spraying in which the first voltage is applied to the nozzle at the first time point and the charged droplets are sprayed at step S1101 may include applying, by the control unit using the power supply, the first voltage to the nozzle such that the amount of charge released per unit from the nozzle (that is, nozzle current) becomes equal to or higher than a first current. The performing of the first spraying at step S1101 may include spraying the charged droplets such that the amount of charge released per hour from the nozzle becomes a first charge amount.

The performing of the second spraying in which the second voltage is applied to the nozzle at the second time point and the charged droplets are sprayed at step S1103 may include applying, by the control unit using the power supply unit, the second voltage lower than the first voltage to the nozzle at the second time point later than the first time point.

The performing of the second spraying in which the second voltage is applied to the nozzle at the second time point and the charged droplets are sprayed at step S1103 may include applying, by the control unit using the power supply unit, the second voltage higher than the first voltage to the nozzle at the second time point later than the first time point. The performing of the second spraying may include applying the second voltage higher than the first voltage to the nozzle such that the current output through the nozzle at the second time point is not lower than the first current that is the current output through the nozzle at the first time point.

The performing of the second spraying in which the second voltage is applied to the nozzle at the second time point and the charged droplets are sprayed at step S1103 may include applying the second voltage to the nozzle such that at the second time point later than the first time point, the electric potential due to the space charge formed on the basis of at least some of the charges released by the device near the discharge hole for droplets is overcame and the charged droplets are sprayed. The second voltage may be higher than the first voltage so that the amount of charge released per hour from the nozzle (that is, nozzle current) is the same at first time point and the second time point.

The performing of the second spraying in which the second voltage is applied to the nozzle at the second time point and the charged droplets are sprayed at step S1103 may include performing, by the control unit using the power supply unit, the second spraying such that at the second time point later than the first time point, a second current lower than the first current output from the nozzle at the first time point is output.

The performing of the second spraying in which the second voltage is applied to the nozzle at the second time point and the charged droplets are sprayed at step S1103 may include performing, by the control unit using the liquid discharge unit, the second spraying such that at the second time point later than the first time point, the droplets generated by the second spraying move faster than the droplets generated by the first spraying.

According to an embodiment, the method for managing the fine particle concentration may include: performing a first spraying in which a first voltage is applied to a nozzle and charged droplets are sprayed in a first time period, and performing a second spraying in which a second voltage is applied to the nozzle and the charged droplets are sprayed in a second time period later than the first time period.

The performing of the first spraying in the first time period may include releasing a first charge amount. The performing of the first spraying in the first time period may include releasing the charged droplets such that the average charge amount released per unit time through the nozzle during the first time period becomes the first charge amount.

The performing of the second spraying in the second time period may include releasing a second charge amount larger than the first charge amount. The performing of the second spraying in the second time period may include releasing the charged droplets such that the average release charge amount released per unit time through the nozzle during the first time period becomes the second charge amount larger than the first charge amount that is the average release charge amount during the first time period.

Figure 25A:
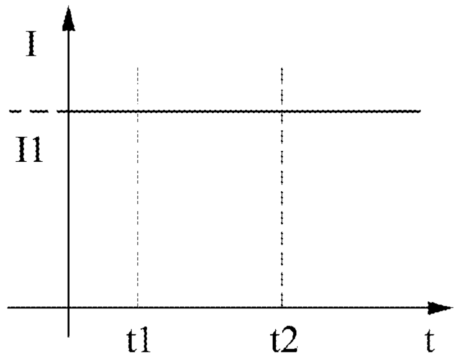
FIGS. 25A and 25B are diagrams illustrating an embodiment of a voltage applied to a nozzle of a device and a current output from the nozzle, at a first time point t1 and a second time point t2.
Figure 25B:
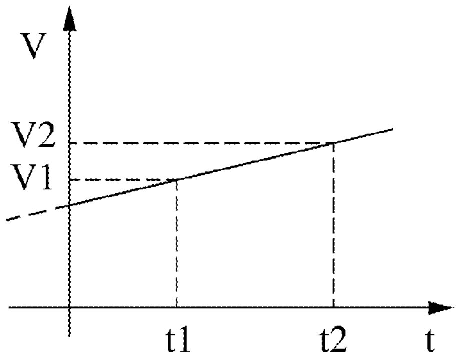

FIGS. 25A and 25B are diagrams illustrating an embodiment of a voltage applied to a nozzle of a device and a current output from the nozzle, at a first time point t1 and a second time point t2.

Referring to FIGS. 25A and 25B, a method for controlling the device may include: releasing a first current I1 through a nozzle at a first time point and a second time point, applying a first voltage V1 to the nozzle at the first time point; and applying a second voltage V2 to the nozzle at the second time point.

The method for controlling the device may include increasing the voltage applied to the nozzle at the second time point to make the voltage higher than that at the first time point so as to constantly maintain the current output through the nozzle at the first time point and the second time point. The method for controlling the device may include applying a higher voltage to the nozzle at the second time point than that at the first time point so as to overcome the problem that the amount of charge released from the device decreases as the charge density near the nozzle increases, and to output a constant current.

Figure 26A:
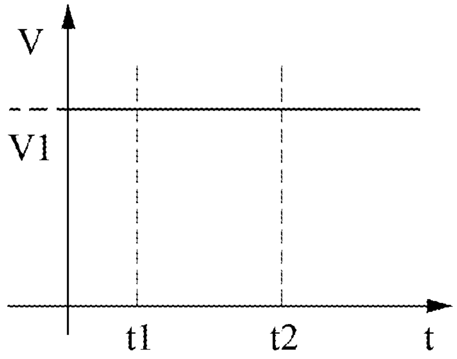
FIGS. 26A and 26B are diagrams illustrating a method for managing a fine particle concentration in the air.
Figure 26B:
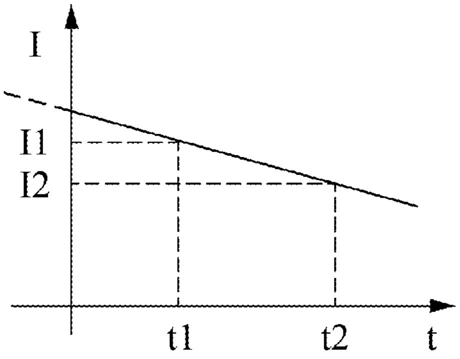

FIGS. 26A and 26B are diagrams illustrating an embodiment of a voltage applied to a nozzle of a device and a current output from the nozzle, at a first time point t1 and a second time point t2.

Referring to FIGS. 26A and 26B, a method for controlling the device may include: applying a first voltage V1 to a nozzle at a first and a second time point, releasing a first current I1 through the nozzle at the first time point, and releasing a second current I2 through the nozzle at the second time point.

The method for controlling the device may include outputting a lower current at the second time point than that at the first time point so as to constantly maintain the voltage applied to the nozzle at the first time point and the second time point. The method for controlling the device may include performing management such that the voltage applied to the nozzle does not exceed a reference value, but maintaining the voltage value such that the amount of current output through the device is maximized.

2.3.5 Feedback Control Operation

According to an embodiment, a method for controlling a device for managing a fine particle concentration in the air may include performing feedback control based on information obtained during operation, for example, performing feedback control for changing a control state by using the obtained information. The method for controlling the device described below may be performed by the device described in the present disclosure, for example, the device including the control unit, the liquid storage unit, the liquid supply unit, the liquid discharge unit, the power supply unit, the sensor unit, and the gas spray unit.

Figure 27:
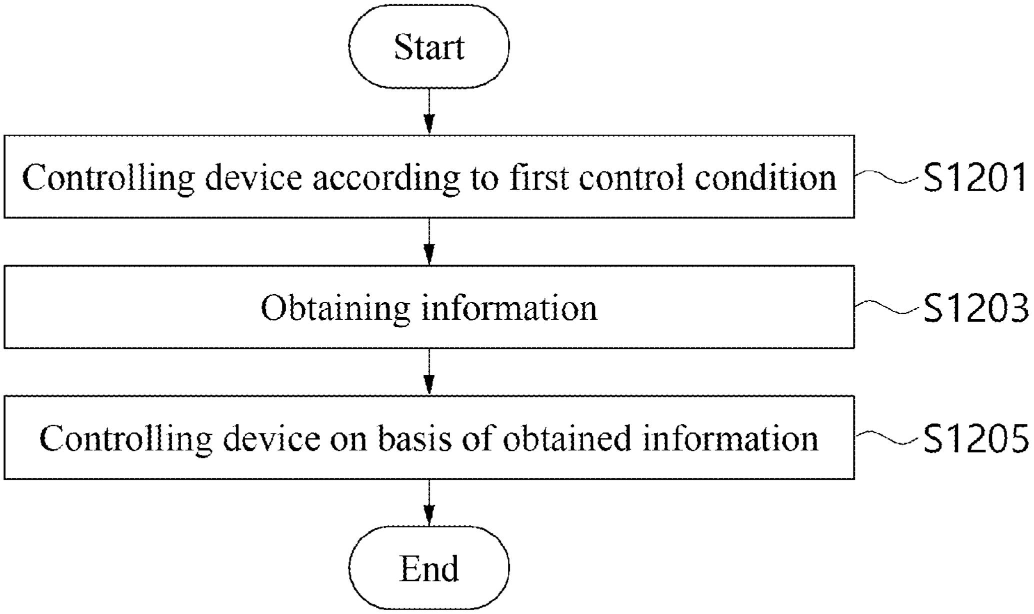
FIG. 27 is a diagram illustrating a system for reducing fine particles according to an embodiment of the present disclosure.

FIG. 27 is a diagram illustrating a method for managing a fine particle concentration in the air. Referring to FIG. 27, the method for managing the fine particle concentration in the air may include: controlling the device according to a first control condition at step S1201, obtaining information at step S1203, and controlling the device according to a second control condition at step S1205.

The controlling of the device according to the first control condition at step S1201 may include applying, by the control unit, a first voltage to a nozzle of the device. The controlling of the device according to the first control condition at step S1201 may include outputting, by the control unit, a first current through the nozzle of the device. The controlling of the device according to the first control condition at step S1201 may include spraying, by the control unit through the gas spray unit, gas at a first speed. The controlling of the device according to the first control condition at step S1201 may include releasing, by the control unit through the liquid supply unit, liquid at a first flow velocity.

The obtaining of the information at step S1203 may include obtaining, by the control unit using the sensor unit, state information of the units constituting the device. For example, the obtaining of the information at step S1203 may include obtaining the temperature of the nozzle, the voltage applied to the nozzle, the amount of the liquid stored in the liquid storage container, the temperature of the liquid, or the power supplied to the device.

The obtaining of the information at step S1203 may include obtaining, by the control unit using the sensor unit, operation information related to the operation on the device. For example, the obtaining of the information at step S1203 may include obtaining the current released from the nozzle, the charge density near the discharge hole of the nozzle, the intensity of the electric field in the target region, the charge density of the target region, or the fine particle concentration of the target region.

The obtaining of the information at step S1203 may include obtaining, by the control unit, environmental information on an environment of a particular region. For example, the obtaining of the information at step S1203 may include obtaining the temperature, humidity, wind velocity, air current, weather or the atmospheric pressure of the target region.

The obtaining of the information at step S1203 may include obtaining, by the control unit using the communication unit, information from an external device. For example, the obtaining of the information at step S1203 may include obtaining, by the control unit using the communication unit, environmental information from an external sensor device, or an external server.

The controlling of the device on the basis of the obtained information at step S1205 may include controlling, by the control unit, the device on the basis of the obtained information.

The controlling of the device on the basis of the obtained information at step S1205 may include notifying, by the control unit, an external device considering the obtained state information or operation information. The control unit may transfer state information or operation information to an external server or an external control device through the communication unit. When the obtained state information or operation information is out of a normal range, the control unit transfers the state information to an external device.

For example, the control unit may obtain state information indicating that the liquid stored in the liquid storage unit is equal to or less than a predetermined amount, and may output a notification indicating that the stored liquid is insufficient, to an external device. Alternatively, when power is not appropriately supplied to the device, when the voltage applied to the nozzle is out of an appropriate range, or when the current output from the nozzle is out of an appropriate range, the control unit outputs a notification indicating the state of the device, to an external device.

The controlling of the device on the basis of the obtained information at step S1205 may include changing, by the control unit, the operation state according to the second condition considering the obtained operation information. When the obtained operation information is different from estimated operation information, the control unit controls the device according to the second control condition different from the first condition.

For example, the controlling of the device according to the second condition may include increasing, by the control unit, the voltage applied to the nozzle to make the voltage higher than the voltage according to the first control condition when the current value output from the nozzle is lower than an estimated value. The controlling of the device according to the second condition may include increasing, by the control unit, the current output through the nozzle to make the current higher than the current according to the first control condition when the charge density of the target region is lower than an estimated charge density.

The control unit may transmit operation information to an external control device, and may control the device according to a second control command generated on the basis of the operation information. For example, the control unit transfers the obtained nozzle current value to the external control device. The external control device compares the obtained nozzle current value to an estimated nozzle current value, and generates the second control command. The device obtains the second control command from the external control device, and operates according to the second control command.

The controlling of the device on the basis of the obtained information at step S1205 may include controlling, by the control unit, the device according to the second control condition considering obtained environmental information. The control unit may control the device according to the second control condition that is determined considering the obtained environmental information and is different from the first control condition.

For example, the control unit may control the device by changing the control condition, such as the flow rate of the liquid supplied to the nozzle, the voltage applied to the nozzle, or the amount of gas released per hour, considering the humidity of the target region. The controlling of the device according to the second control condition by the control unit when the humidity of the target region is equal to or higher than a reference value may include decreasing, by the control unit, the flow rate of the liquid supplied to the nozzle to make the flow rate lower than that in the first control condition, increasing the voltage applied to the nozzle to make the voltage higher than that in the first condition, or increasing the amount of gas released per hour to make the amount larger than that in the first condition.

As a specific example, the control unit may control the power supply unit according to environmental information. For example, the control unit may control the power supply unit considering temperature information, humidity information, or the fine particle concentration of the target region. As a specific example, when the fine particle concentration of the target region is a first value, the control unit controls the power supply unit such that a first current is output through the liquid discharge unit. When the fine particle concentration of the target region is a second value higher than the first value, the control unit controls the power supply unit such that a second current higher than the first current is output through the liquid discharge unit.

In the meantime, in the case in which the device includes the output unit, the controlling of the device may further include outputting, by the control unit through the output unit, the obtained state information. The outputting of the information may include outputting, by the control unit through a display screen or a speaker, state information, operation information, or environmental information of the device in the form of visual information or audio information.

In the meantime, the obtaining of the information at step S1203 may include: obtaining first information at a first time point, and obtaining second information at a second time point. Herein, the controlling of the device according to the second control condition at step S1205 may include controlling, by the control unit, the device according to the second control condition that is determined by comparing the first information obtained at the first time point with the second information obtained at the second time point.

For example, the obtaining of the information at step S1203 may include: obtaining a first value that is the density of the space charge of the target region at the first time point, and obtaining a second value that is the density of the space charge of the target region at the second time point. Herein, when the second value is lower than the first value, the controlling of the device according to the control condition at step S1205 may include applying, by the control unit to the nozzle, a second voltage higher than a first voltage applied to the nozzle according to the first control condition.

The method for controlling the device may include performing history control on the basis of obtained information. When a measurement value over time is sufficiently secured, history control is possible. The control unit may perform history control using time-series change of the measurement value obtained through the sensor unit or the communication unit.

For example, the control unit may obtain external humidity information over time through the sensor unit or the communication unit. The control unit may perform history control using humidity information over time and control information over time. For example, the control unit may obtain a relationship between a predetermined humidity change pattern and a control operation (for example, a control command obtained from the user or external control device) on the basis of accumulated hourly humidity information and the control information over time. The control unit may perform the control operation according to the measured humidity value, on the basis of the relationship between the humidity change pattern and the control operation.

2.3.6 Embodiments

2.3.6.1 Third Embodiment

According to an embodiment of the present disclosure, as a method for managing a fine particle concentration of a target region by using a charge supply device, there may be provided a method for managing a fine particle concentration of a target region by using a device including: a liquid storage unit (for example, a container) configured to store liquid, a liquid discharge unit (for example, at least one nozzle) configured to output the liquid, a liquid supply unit (for example, a pump) configured to supply the liquids from the container to the at least one nozzle, a power supply configured to supply power, and a control unit (for example, a controller of the device) configured to supply charges to the target region through the at least one nozzle by using the power supply. The following method may be performed by various devices described in the present disclosure.

Figure 39:
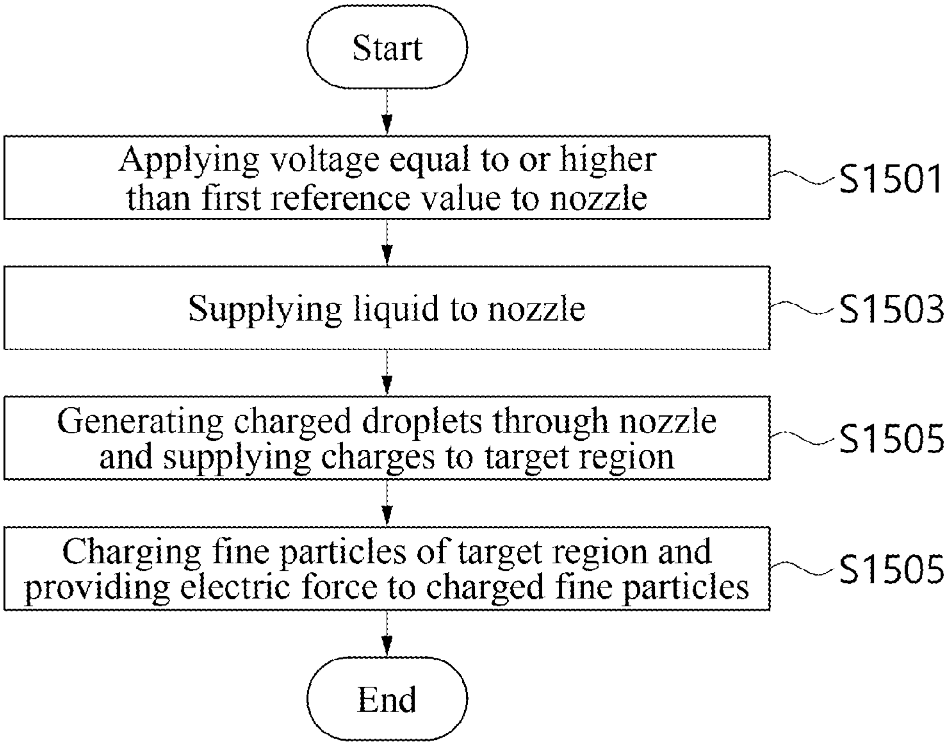
FIG. 39 is a diagram illustrating an embodiment of a method for reducing a fine particle concentration.

FIG. 39 is a diagram illustrating an embodiment of a method for reducing a fine particle concentration. Referring to FIG. 39, the method according to the embodiment may include: applying a voltage equal to or higher than a first reference value to a nozzle at step S1501, supplying liquid to the nozzle at step S1503, generating charged droplets through the nozzle and supplying charges to a target region at step S1505, and charging fine particles of the target region and providing electric force to the charged fine particles at step S1507.

FIG. 39 shows that the steps are performed sequentially as a reference, but this is only for convenience of description, and the order of the steps may be changed.

The applying of the voltage equal to higher than the first reference value to the nozzle at step S1501 may include applying, by the controller using the power supply, the voltage equal to or higher than the first reference value to at least one nozzle. The controller may apply a negative voltage to the at least one nozzle by using the power supply. Regarding the applying of the voltage to the at least one nozzle by the controller using the power supply, the details described in the first embodiment and throughout the present disclosure may be similarly applied.

The supplying of the liquid to the nozzle at step S1503 may include supplying, by the controller using the pump, the liquid to the at least one nozzle. The supplying of the liquid to the at least one nozzle may be performed after the voltage is applied to the at least one nozzle. For example, the method for controlling the device may include supplying the liquid after applying the voltage to the nozzle so as to improve the stability of the current output through the at least one nozzle and the stability of the voltage applied to the nozzle.

The generating of the charged droplets through the nozzle and the supplying of the charges to the target region at step S1505 may include generating, by the controller using the power supply and the pump, the charged droplets through the at least one nozzle and supplying the charges to the target region. Regarding the supplying of the charges to the target region, the details described in the first embodiment above and throughout the present disclosure may be similarly applied.

The generating of the charged droplets through the nozzle and the supplying of the charges to the target region at step S1505 may include applying, by the controller using the power supply, the voltage to the at least one nozzle, generating the charged droplets by releasing the liquid through the at least one nozzle, and supplying the charges to the target region through the charged droplets.

The generating of the charged droplets through the nozzle and the supplying of the charges to the target region at step S1505 may include supplying, by the controller using the power supply, the charges to the target region, and forming the space charge having the same polarity as the charges supplied to the target region.

The controller may form negative space charge in the target region by supplying negative charges to the target region through the at least one nozzle using the power supply.

The charging of the fine particles of the target region and providing the electric force to the charged fine particles at step S1507 may include charging, by the controller, the fine particles of the target region by forming the space charge in the target region, and providing the electric force at least partially including a component directed away from the device, to the fine particles charged with the same polarity as the supplied charges because of the charges supplied to the target region.

The providing of the electric force to the fine particles by the controller may include forming the electric field between the ground and the device in the target region by forming the space charge in the target region, and providing the electric force to the fine particles through the formed electric field.

The electric force provided to the fine particles may be provided by the electric field caused by at least a part of the negative space charge.

Regarding the providing of the electric force to the charged fine particles, the details described in the first embodiment above and throughout the present disclosure may be similarly applied.

For example, the controller may provide electric force including a component directed to the ground, to the fine particles in the target region by using the power supply. The controller may provide electric power to the fine particles by providing the electric force in a predetermined direction to the fine particles. The electric force provided to the fine particles may include a first direction component perpendicular to the ground or a second direction component parallel to the ground or both.

According to an embodiment, the method for reducing the fine particle concentration may further include maintaining, by the controller, the space charge for more than a predetermined time period by supplying a charged substance to the target region for more than the predetermined time period such that the charged fine particles are removed by receiving the electric force and moving in a ground direction.

The maintaining of the space charge for more than the predetermined time period may include supplying, by the controller using the power supply, the charges to the target region by generating the charged droplets continuously or repeatedly through the at least one nozzle.

The time period for which the space charge is maintained may be determined on the basis of the target region of the device or the effective radius of the device. For example, the time period for which the space charge is maintained may be determined on the basis of the current output from the device and the effective radius of the device.

As a specific example, when the effective radius of the device is a first radius and the current output from the device is a first current, the space charge may be maintained during a first time period. Herein, when the effective radius of the device is a second radius smaller than the first radius and the current output from the device is the first current, the space charge may be maintained during a second time period shorter than the first time period.

As another specific example, when the effective radius of the device is a first radius and the current output from the device is a first current, the space charge may be maintained during a first time period. Herein, when the effective radius of the device is a second radius and the current output from the device is a second current lower than the first current, the space charge may be maintained during a second time period longer than the first time period.

2.3.6.2 Fourth Embodiment

According to an embodiment of the present disclosure, as a method for managing a fine particle concentration of a target region by using a charge supply device, there may be provided a method for managing a fine particle concentration of a target region by using a device including: a container configured to store liquid, at least one nozzle configured to output the liquid, a pump configured to supply the liquid from the container to the at least one nozzle, a power supply configured to supply power, a controller configured to supply a charged substance to the target region through the at least one nozzle by using the power supply, and a particle dispersion unit configured to provide non-electric force to the charged substance.

The method described below may be performed by a device according to various embodiments described in the present disclosure. To the following method, the details according to various embodiments described in the present disclosure may be applied.

Figure 40:
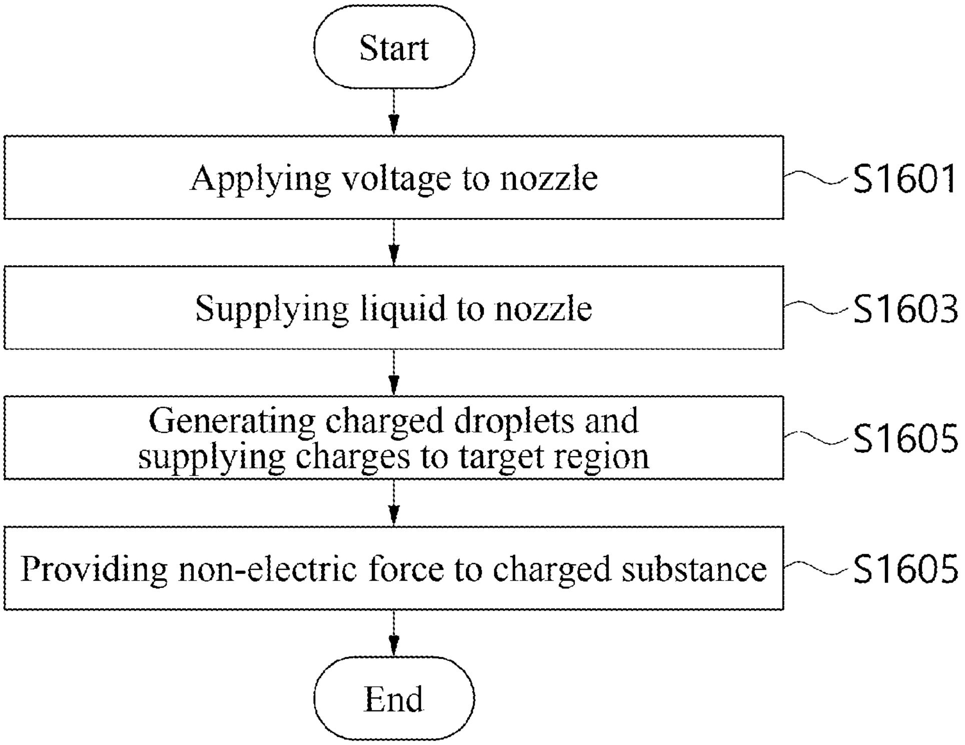
FIG. 40 is a diagram illustrating an embodiment of a method for reducing a fine particle concentration.

FIG. 40 is a diagram illustrating an embodiment of a method for reducing a fine particle concentration. Referring to FIG. 40, the method according to the embodiment may include: applying a voltage to a nozzle at step S1601, supplying liquid to the nozzle at step S1603, generating charged droplets and supplying charges to a target region at step S1605, and providing non-electric force to a charged substance at step S1607.

In FIG. 40, for convenience of description, the steps are listed sequentially, but this does not limit the present disclosure, and the order of the steps may be changed.

The applying of the voltage to the nozzle S1601 may include applying, by the controller using the power supply, the voltage to at least one nozzle. The controller may apply the voltage equal to or higher than a first reference value to the at least one nozzle by using the power supply, and may provide electric force in a direction away from the device, to the fine particles in the target region charged by the supplied charges.

The electric force provided to the fine particles may be provided by the electric field formed by the charges supplied to at least a part of the target region. The fine particles in the target region may be charged with the same polarity as the supplied charges by the supplied charges.

The supplying of the liquid to the nozzle at step S1603 may include supplying, by the controller using the pump, the liquid to the at least one nozzle.

The generating of the charged droplets and the supplying of the charges to the target region at step S1605 may include generating, by the controller using the power supply and the pump, the charged droplets through the at least one nozzle, and supplying the charges to the target region through the charged droplets. The supplying of the charges to the target region by the controller may include forming, by the controller, space charge that forms an electric field in the target region, by supplying the charges to the target region.

To the applying of the voltage to the nozzle at step S1601, the supplying of the liquid to the nozzle at step S1603, and the generating of the charged droplets and the supplying of the charges to the target region at step S1605, the details described in the first to the third embodiment and throughout the present disclosure may be selectively applied.

The providing of the non-electric force to the charged substance at step S1607 may include providing, by the controller using the particle dispersion unit, the non-electric force in a direction away from the one end of the nozzle, to the charged substance positioned near the one end of the nozzle at which droplets are generated. To the providing of the non-electric force to the charged substance at step S1607, the details described in the second embodiment and throughout the present disclosure may be selectively applied.

The applying of the non-electric force to the charged substance at step S1607 may further include providing the non-electric force to the charged substance by spraying an electrically neutral substance. The particle dispersion unit may include an air nozzle for spraying an electrically neutral gas, and the providing of the non-electric force to the charged substance at step S1607 may include providing, by the controller using the air nozzle, physical force including a component directed away from the nozzle, to the charged substance.

The providing of the non-electric force by the controller may further include providing, by the controller, the non-electric force including a component directed away from the one end, to the charged substance so as to reduce the distribution density of the space charge near the one end. The providing of the non-electric force by the controller may include providing, by the controller, the non-electric force to the charged substance near the one end so as to reduce the electric force made to act on the liquid at the nozzle end by the space charge near the one end.

2.3.6.3 Fifth Embodiment

According to an embodiment of the present disclosure, as a method for managing a fine particle concentration by using a device for supplying charges to a target region, there may be provided a method for managing a fine particle concentration by using a device including: a container configured to store liquid; at least one nozzle configured to output liquid, a pump configured to supply the liquid from the container to the at least one nozzle, a power supply configured to supply power, and a controller configured to apply a voltage to the at least one nozzle using the power supply, output the charged liquid through the at least one nozzle to supply the charges to the target region, and provide first electric force in a direction away from the device, to fine particles in the target region charged by the supplied charges.

The method described below may be performed by a device according to various embodiments described in the present disclosure. To the following method, the details according to various embodiments described in the present disclosure may be applied.

Figure 41:
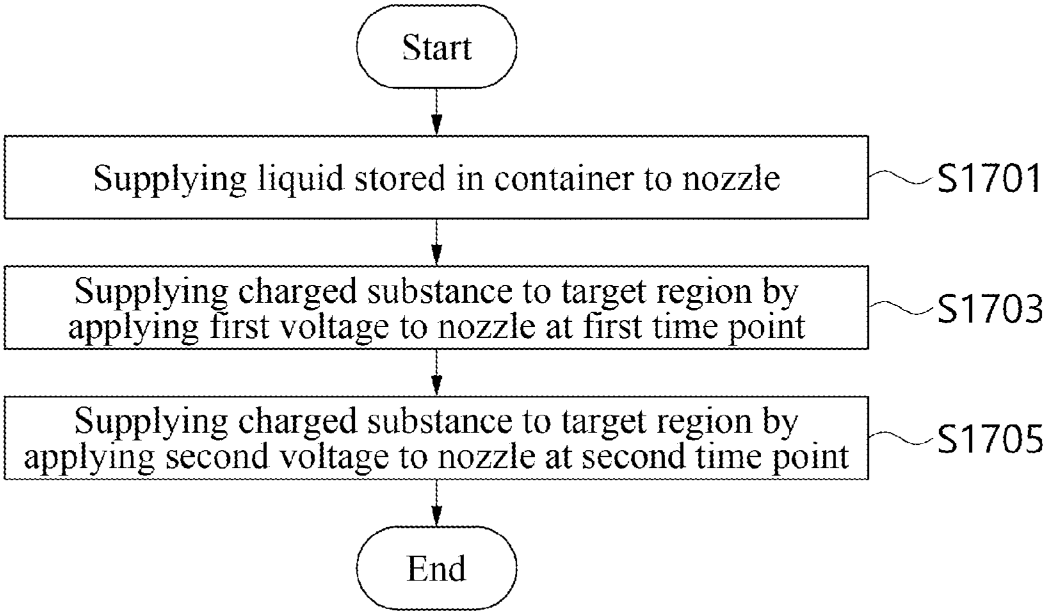
FIG. 41 is a diagram illustrating an embodiment of a method for managing a fine particle concentration.

FIG. 41 is a diagram illustrating an embodiment of a method for managing a fine particle concentration. Referring to FIG. 41, the method according to the embodiment may include: supplying liquid stored in a container to a nozzle at step S1701, supplying a charged substance to a target region by applying a first voltage to the nozzle at a first time point at step S1703, and supplying the charged substance to the target region by applying a second voltage to the nozzle at a second time point at step S1705.

The supplying of the liquid stored in the container to the nozzle at step S1701 may include supplying, by the controller using the pump, the liquid stored in the container to the at least one nozzle.

The supplying of the charged substance to the target region by applying the first voltage to the nozzle at the first time point at step S1703 may include supplying the charged substance to the target region through the at least one nozzle by applying the first voltage to the at least one nozzle using the power supply at the first time point.

The supplying of the charged substance to the target region at the first time point by the controller may further include forming, by the controller using the power supply, space charge in the target region by supplying the charged substance to the target region.

The formed space charge forms an electric field in the target region so that first electric force is provided to the fine particles in the target region.

The controller may release negatively charged droplets through the at least one nozzle by applying a negative voltage to the at least one nozzle using the power supply. The controller may form negative space charge in the target region by applying the negative voltage to the at least one nozzle using the power supply.

The supplying of the charged substance to the target region by applying the second voltage to the nozzle at the second time point at step S1705 may include supplying, by the controller, the charged substance to the target region through the at least one nozzle by applying the second voltage to the at least one nozzle at the second time point later than the first time point.

The supplying of the charged substance to the target region at the second time point by the controller may include maintaining, by the controller, the space charge formed by applying the second voltage to the at least one nozzle and by supplying the charged substance to the target region, considering second electric force made to act on the liquid in the at least one nozzle by the formed space charge.

The first voltage and the second voltage may be determined to be higher than a first reference voltage that is determined such that the current equal to or higher than a first current is released through the at least one nozzle, and to be lower than a second reference voltage that is determined such that the amount of charge directly discharged from the at least one nozzle does not exceed the amount of charge output through the liquid.

According to an embodiment, the applying of the first voltage to the at least one nozzle at the first time point by the controller may include applying the first voltage to the at least one nozzle such that the first current is released through the at least one nozzle at the first time point.

In the above embodiment, the applying of the second voltage to the at least one nozzle at the second time point by the controller may include applying the second voltage higher than the first voltage to the at least one nozzle by the controller such that the second electric force acting on the liquid is cancelled at the second time point and the second current not lower than the first current is released through the at least one nozzle.

The first current may be determined according to an effective radius of the device. The effective radius may be a distance from the device, at a point at which the fine particle concentration decreases by a reference ratio or less when the controller releases the charged substance with the first current through the at least one nozzle during a reference time period. In other words, the first current may be determined as a current value to be output in order to reduce the fine particle concentration by the reference ratio within the predetermined effective radius when the device outputs a constant current during the reference time period.

According to an embodiment, the applying of the first voltage to the at least one nozzle at the first time point by the controller may include applying the first voltage to the at least one nozzle such that the first current is released through the at least one nozzle at the first time point.

In the above embodiment, the applying of the second voltage to the at least one nozzle at the second time point by the controller may include applying the first voltage equal to the first voltage to the at least one nozzle by the controller such that corresponding to the second electric force acting on the liquid at the second time point, the second current lower than the first current is released through the at least one nozzle.

According to an embodiment of the present disclosure, there may be provided a device for managing a fine particle concentration.

For example, as a device for managing a fine particle concentration by using a device for supplying charges to a region, there may be provided a device including: a container configured to store liquid, at least one nozzle configured to output liquid, a pump configured to supply the liquid from the container to the at least one nozzle, a power supply configured to supply power, and a controller configured to apply a voltage to the at least one nozzle using the power supply, output the charged liquid through the at least one nozzle to supply the charges to the target region, and provide first electric force in a direction away from the device, to fine particles in the target region charged by the supplied charges.

The controller may supply the liquid stored in the container to the at least one nozzle using the pump.

The controller may supply a charged substance to the target region through the at least one nozzle by applying a first voltage to the at least one nozzle using the power supply at a first time point.

The controller may supply the charged substance to the target region through the at least one nozzle by applying a second voltage to the at least one nozzle at a second time point later than the first time point.

The supplying of the charged substance to the target region at the first time point by the controller may further include forming, by the controller using the power supply, space charge in the target region by supplying the charged substance to the target region. The supplying of the charged substance to the target region at the second time point by the controller may include maintaining, by the controller, the space charge formed by applying the second voltage to the at least one nozzle and by supplying the charged substance to the target region, considering second electric force made to act on the liquid in the at least one nozzle by the formed space charge.

The formed space charge forms an electric field in the target region so that first electric force is provided to the fine particles in the target region.

2.3.6.4 Sixth Embodiment

According to an embodiment of the present disclosure, as a method for managing a fine particle concentration by using a device for supplying charges to a target region, there may be provided a method for managing a fine particle concentration by using a device including: a container configured to store liquid, at least one nozzle configured to output liquid, a pump configured to supply the liquid from the container to the at least one nozzle, a power supply configured to supply power, and a controller configured to apply a voltage to the at least one nozzle using the power supply, output the charged liquid through the at least one nozzle to supply the charges to the target region, and provide first electric force in a direction away from the device, to fine particles in the target region charged by the supplied charges.

The method described below may be performed by a device according to various embodiments described in the present disclosure. To the following method, the details according to various embodiments described in the present disclosure may be applied.

According to the embodiment, the method for managing the fine particle concentration may include: outputting a first current to the target region through the nozzle, and outputting a second current higher than the first current to the target region through the nozzle.

Herein, the outputting of the first current may include outputting the first current at a first time point, and the outputting of the second current may include outputting the second current at a second time point later than the first time point. Alternatively, the outputting of the first current may include outputting the first current in a first time period, and the outputting of the second current may include outputting the second current in a second time period later than the first time period. Hereinafter, the method including outputting the first current and/or the second current in a predetermined time period or time point will be described with reference to some embodiments.

Figure 42:
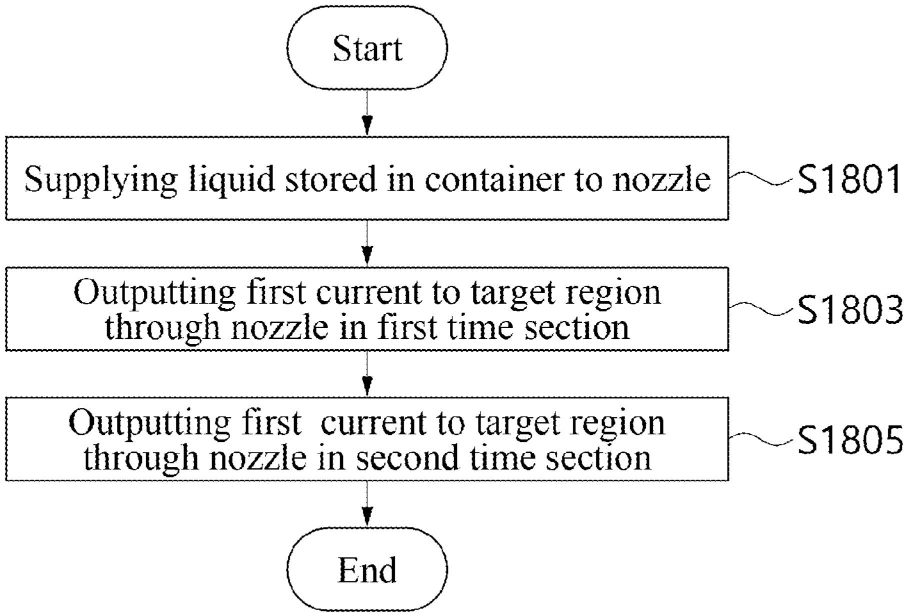
FIG. 42 is a diagram illustrating an embodiment of a method for managing a fine particle concentration.

FIG. 42 is a diagram illustrating an embodiment of a method for managing a fine particle concentration. Referring to FIG. 42, the method according to the embodiment may include: supplying liquid stored in a container to a nozzle at step S1801, outputting a first current to a target region through the nozzle in a first time period at step S1803, and outputting a second current to the target region through the nozzle in a second time period at step S1805.

The supplying of the liquid stored in the container to the nozzle at step S1801 may include supplying, by the controller using the pump, the liquid stored in the container to the at least one nozzle. Before supplying the liquid to the nozzle, a voltage of a predetermined level may be applied to the nozzle in advance. Alternatively, before supplying the liquid to the nozzle, providing non-electric force to a nozzle end portion may be performed.

The outputting of the first current to the target region through the nozzle in the first time period at step S1803 may include outputting, by the controller using the power supply, the first current through at least one nozzle in the first time period.

The outputting of the first current to the target region through the nozzle in the first time period at step S1803 may include outputting a first charge amount per unit time in the first time period. The outputting of the first current to the target region through the nozzle in the first time period at step S1803 may include forming, by the controller using the power supply, space charge in the target region by supplying a charged substance through the at least one nozzle.

The formed space charge forms an electric field in the target region so that first electric force is provided to the fine particles in the target region.

The outputting of the first current to the target region through the nozzle in the second time period at step S1805 may include outputting, by the controller using the power supply, the second current per unit time through the at least one nozzle in the second time period later than the first time period.

The releasing of the second current in the second time period may include maintaining the space charge in the target region by outputting the second current different from the first current, considering the electric force made by the formed space charge to act on the liquid supplied to the at least one nozzle.

According to an embodiment, the outputting of the first current through the at least one nozzle in the first time period by the controller may further include outputting, by the controller, the first current higher than a first reference current from the at least one nozzle by applying a first voltage to the at least one nozzle.

In the above embodiment, the outputting of the second current through the at least one nozzle in the second time period by the controller may further include outputting, by the controller, the second current higher than the first reference current through the at least one nozzle such that the amount of charge directly discharged from the at least one nozzle does not exceed the amount of charge output through the liquid.

According to an embodiment, the outputting of the first current through the at least one nozzle in the first time period by the controller may include outputting, by the controller, the first current through the at least one nozzle such that the first voltage is applied to the at least one nozzle in the first time period.

In the above embodiment, the outputting of the second current through the at least one nozzle in the second time period by the controller may further include applying, by the controller, a second voltage higher than the first voltage to the at least one nozzle in the second time period such that second electric force acting on the liquid is cancelled and the second current not lower than the first current is output.

The first current may be determined according to an effective radius of the device. The effective radius may be a distance from the device, at a point at which the fine particle concentration decreases by a reference ratio or less when the controller releases the charged substance with the first current through the at least one nozzle during a reference time period.

According to an embodiment, the outputting of the first current through the at least one nozzle in the first time period by the controller may include releasing the first current through the at least one nozzle in the first time period by applying the first voltage to the at least one nozzle.

In the above embodiment, the outputting of the second current through the at least one nozzle in the second time period by the controller may include outputting, by the controller, the second current lower than the first current through the at least one nozzle in the second time period by applying the first voltage to the at least one nozzle, corresponding to the second electric force acting on the liquid.

The controller may release negatively charged droplets through the at least one nozzle by applying a negative voltage to the at least one nozzle. The controller may release negative charges through the at least one nozzle by applying the negative voltage to the at least one nozzle. The controller may form negative space charge in the target region by applying the negative voltage to the at least one nozzle.

According to an embodiment of the present disclosure, there may be provided a device for managing a fine particle concentration by using a device for supplying charges to a target region.

The device may include: a container configured to store liquid, at least one nozzle configured to output the liquid, a pump configured to supply the liquid from the container to the at least one nozzle;

A power supply configured to supply power, and a controller configured to apply a voltage to the at least one nozzle using the power supply, output the charged liquid through the at least one nozzle to supply the charges to the target region, and provide first electric force in a direction away from the device, to fine particles in the target region charged by the supplied charges.

The controller may supply the liquid stored in the container to the at least one nozzle by using the pump, may output a first current through the at least one nozzle in a first time period by using the power supply, and may output a second current per unit time through the at least one nozzle in a second time period later than the first time period by using the power supply.

The outputting of the first charge amount per unit time in the first time period by the controller may include forming, by the controller using the power supply, space charge in the target region by supplying a charged substance through the at least one nozzle.

The releasing of the second current in the second time period by the controller may include maintaining the space charge in the target region by outputting the second current different from the first current, considering the electric force made by the formed space charge to act on the liquid supplied to the at least one nozzle.

The formed space charge forms an electric field in the target region so that first electric force is provided to the fine particles in the target region.

Outputting a particular current in a particular time period may mean outputting a particular average current during the particular time period as well as outputting a current of a particular value constantly during the particular time period. The time period described in the present disclosure may mean a sufficiently short time period. For example, the first or second time period may be the minimum time required to measure the output current in the first or second time period.

The method for managing the fine particle concentration described in the sixth embodiment may be applied on the basis of a time point rather than a time period.

For example, the method according to an embodiment may include: supplying liquid stored in a container to a nozzle, outputting a first current to a target region through the nozzle at a first time point, and outputting the first current to the target region through the nozzle at a second time point.

The supplying of the liquid stored in the container to the nozzle may be realized similarly to that described above.

The outputting of the first current to the target region through the nozzle at the first time point may be realized similarly to the outputting of the first current to the target region through the nozzle in the first time period at step S1803. The outputting of the first current to the target region through the nozzle at the first time point may further include outputting the first current through the nozzle by applying a first voltage to the nozzle at the first time point.

The outputting of the first current to the target region through the nozzle at the second time point may be realized similarly to the outputting of the second current to the target region through the nozzle at the second time period at step S1805. The outputting of the second current to the target region through the nozzle at the second time point may further include outputting the first current through the nozzle by applying a second voltage to the nozzle at the second time point later than the first time point.

The first current output at the first time point and/or the second current output at the second time point may be higher than a first reference current or lower than the first reference current. For example, the first current and/or the second current may be determined to be equal to or higher than a lower limit value, that is, the first reference current, determined considering the target region and the operating time of the device. In addition, for example, the first current and/or the second current may be determined to be equal to or lower than an upper limit value, that is, a second reference current, for preventing direct discharge through the nozzle. The first voltage applied to the nozzle to output the first current and/or the second voltage applied to the nozzle to output the second current may be determined according to the above-described upper limit value and/or lower limit value.

In the above embodiment, outputting a current at a particular time point may mean outputting an instantaneous current at the particular time point. The value of the current output at a particular time point may be obtained through the current value measured near the nozzle of the device at the particular time point.

2.3.6.5 Seventh Embodiment

According to an embodiment of the present disclosure, as a method for managing a fine particle concentration by using a device for supplying charges to a target region, there may be provided a method for managing a fine particle concentration by using a device including: a container configured to store liquid, at least one nozzle configured to output liquid, a pump configured to supply the liquid from the container to the at least one nozzle, a power supply configured to supply power, and a controller configured to apply a voltage to the at least one nozzle using the power supply, output the charged liquid through the at least one nozzle to supply the charges to the target region, and provide first electric force in a direction away from the device, to fine particles in the target region charged by the supplied charges.

The method described below may be performed by a device according to various embodiments described in the present disclosure. To the following method, the details according to various embodiments described in the present disclosure may be applied.

Figure 43:
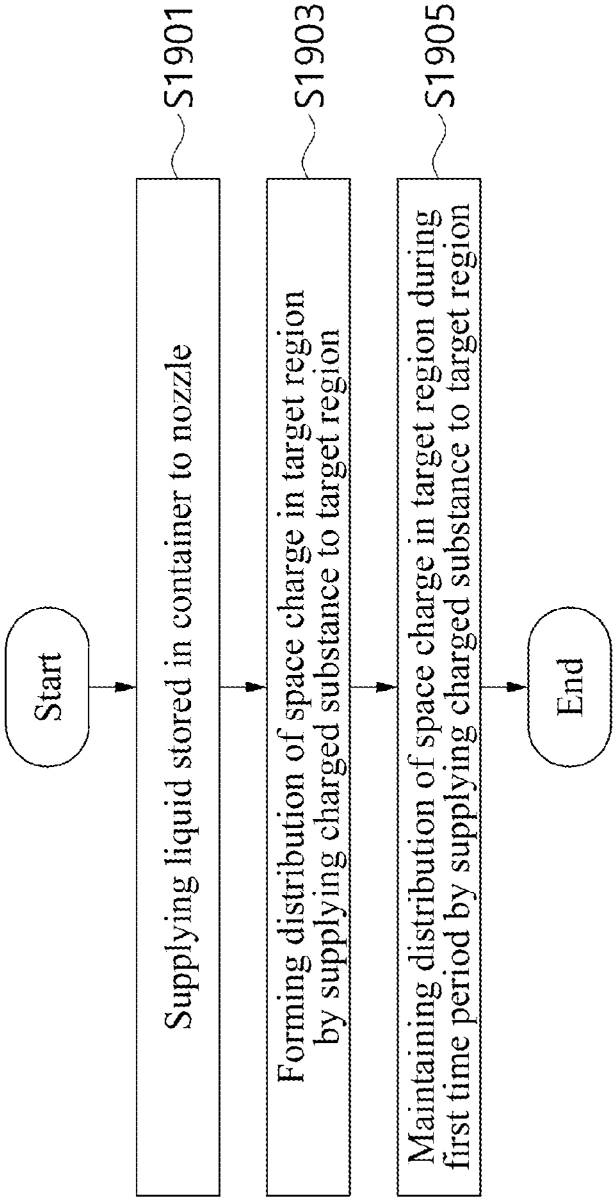
FIG. 43 is a diagram illustrating an embodiment of a method for managing a fine particle concentration.

FIG. 43 is a diagram illustrating an embodiment of a method for managing a fine particle concentration. Referring to FIG. 43, the method according to the embodiment may include: supplying liquid stored in a container to a nozzle at step S1901, forming a distribution of space charge in a target region by supplying a charged substance to the target region at step S1903, and maintaining the distribution of the space charge in the target region during a first time period by supplying the charged substance to the target region at step S1905.

The supplying of the liquid stored in the container to the nozzle at step S1901 may include supplying, by the controller using the pump, the liquid stored in the container to the at least one nozzle. To the supplying of the liquid stored in the container to the nozzle at step S1901, the details of the above-described embodiments may be similarly applied.

The forming of the distribution of the space charge in the target region by supplying the charged substance to the target region at step S1903 may include forming, by the controller using the power supply, the distribution of the space charge in the target region by applying a voltage to the at least one nozzle and by supplying the charged substance to the target region through the at least one nozzle.

The controller may supply negative charges to the target region through the at least one nozzle by applying a negative voltage to the at least one nozzle, and may form the space charge including the negative charges in the target region.

The maintaining of the distribution of the space charge in the target region during the first time period by supplying the charged substance to the target region at step S1905 may include maintaining, by the controller using the power supply, the distribution of the space charge in the target region during the first time period by applying a voltage to the at least one nozzle and by supplying the charged substance to the target region through the at least one nozzle.

The supplying of the charged substance to the target region at a second time point by the controller may include maintaining, by the controller, the space charge formed by applying a second voltage to the at least one nozzle and by supplying the charged substance to the target region, considering second electric force made to act on the liquid in the at least one nozzle by the formed space charge.

The formed space charge forms an electric field in the target region so that first electric force is provided to the fine particles in the target region. The first electric force may mean electric force that the space charge formed by the device provides to the charged fine particles in the target region. The first electric force may act on the fine particles in a direction away from the device.

According to an embodiment, the forming of the distribution of the space charge in the target region may include forming, by the controller using the power supply, the space charge in the target region by applying a first voltage to the at least one nozzle and by outputting the charged droplets through the at least one nozzle.

In the above embodiment, the maintaining of the distribution of the space charge in the target region by the controller may include maintaining, by the controller using the power supply, the space charge in the target region by applying the second voltage higher than the first voltage to the at least one nozzle and by outputting the charged droplets through the at least one nozzle, considering the second electric force made to act on the liquid in the at least one nozzle by the formed space charge.

The second electric force may mean electric force that the space charge formed in the target region by the device, in particular, the space charge near the nozzle of the device, provides to liquid (liquid before separated from the nozzle) in the nozzle or a charged component in the liquid. For example, when the device supplies negative charges to the target region, negative space charge is formed in the target region. Herein, the second electric force may be repulsive force made to act on a negatively charged substance in the nozzle by the negative space charge formed in the target region.

According to an embodiment, the forming of the distribution of the space charge in the target region by the controller may include forming, by the controller using the power supply, the space charge in the target region by outputting the first current through the at least one nozzle, In the above embodiment, the maintaining of the distribution of the space charge in the target region by the controller may include forming, by the controller using the power supply, the space charge in the target region by outputting the first current lower than the first current through the at least one nozzle, corresponding to the second electric force made to act on the liquid in the at least one nozzle by the formed space charge.

The first time period may be determined according to an effective radius of the device. The effective radius may be a distance from the device, at a point at which the fine particle concentration decreases by a reference ratio or less when the controller releases the charged substance with the first current through the at least one nozzle during a reference time period.

According to an embodiment of the present disclosure, there may be provided a device for managing a fine particle concentration by using a device for supplying charges to a target region, the device including: a container configured to store liquid, at least one nozzle configured to output the liquid, a pump configured to supply the liquid from the container to the at least one nozzle, a power supply configured to supply power, and a controller configured to apply a voltage to the at least one nozzle by using the power supply, supply charges to the target region through the at least one nozzle, and provide first electric force in a direction away from the device, to fine particles in the target region charged by the supplied charges.

The controller may supply the liquid stored in the container to the at least one nozzle by using the pump, may supply a charged substance to the target region through the at least one nozzle by applying a voltage to the at least one nozzle by using the power supply, and may form a distribution of space charge in the target region.

The controller may apply a voltage to the at least one nozzle, may supply a charged substance to the target region through the at least one nozzle, and may maintain a distribution of the space charge in the target region during a first time period.

According to the present disclosure, there are provided a method and a device for reducing a fine particle concentration in a target region belonging to various environments. In this case, the device for reducing the fine particle concentration may operate in cooperation with other devices (for example, a device for reducing a fine particle concentration, a control device, and other functional devices).

2.3.7 Experimental Examples

Figure 45:
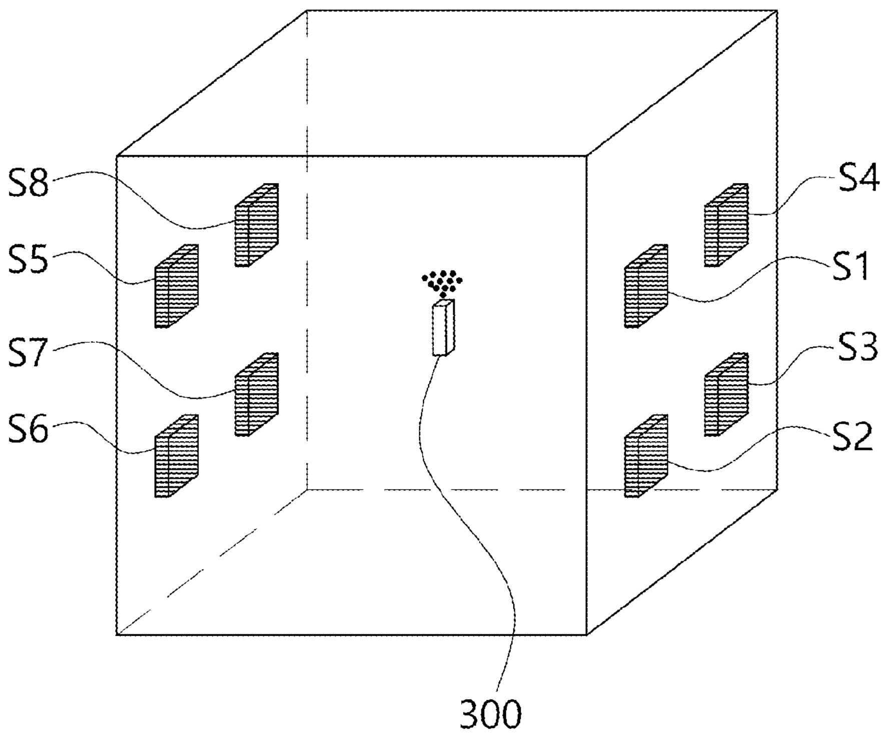
FIG. 45 is a diagram illustrating a fine-particle concentration reduction experiment using a device according to an embodiment of the present disclosure.

FIG. 45 is a diagram illustrating a fine-particle concentration reduction experiment using a device according to an embodiment of the present disclosure.

Referring to FIG. 45, a fine particle reduction function of the device according to the embodiment may be tested through the following: a test chamber of which the length, width, and height are 150 cm each, a nozzle 300 that is located in the center of the test chamber and generating a charged substance by receiving a high voltage applied to the nozzle 300, and sensors S1 to S8 that are attached at the sidewalls of the chamber and obtain a concentration (number concentration) of fine particles.

Referring to FIG. 45, in the experimental example according to the embodiment, the nozzle 300 may be at a central region in the chamber. A first to a fourth sensor S1 to S4 are located any one of the inner surfaces of the chamber, and a fifth to an eighth sensor S5 to S8 are located at the inner surface facing the inner surface at which the first to the fourth sensor S1 to S4 are located among the inner surfaces of the chamber. Fine particles are generating through a smoke generator in the test chamber designed as shown in FIG. 45, and a fine particle concentration detected over time is obtained by each of the sensors according to an experimental condition inside the chamber, thereby checking the fine particle reduction function of the device.

As an experimental example, with no voltage applied to the nozzle after generating fine particles in the chamber, a change in the fine particle concentration detected by each of the sensors over time may be observed.

FIGS. 46A to 46D are diagrams illustrating an experimental example with changes in fine particle concentrations. FIGS. 46A to 46D show a number concentration of fine particles obtained by the first to the fourth sensor S1 to S4 when a voltage was not applied to the nozzle 300. In each graph of FIGS. 46A to 46D, the x-axis denotes time and its unit is second (sec), and the y-axis denotes a number concentration of fine particles and its unit is number/cm$^3$.

Figure 46A:
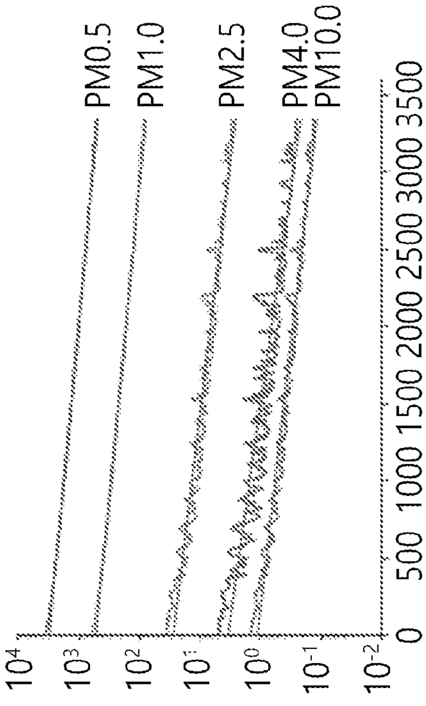
FIGS. 46A through 46D are diagrams illustrating an experiment with changes in fine particle concentrations.
Figure 46B:
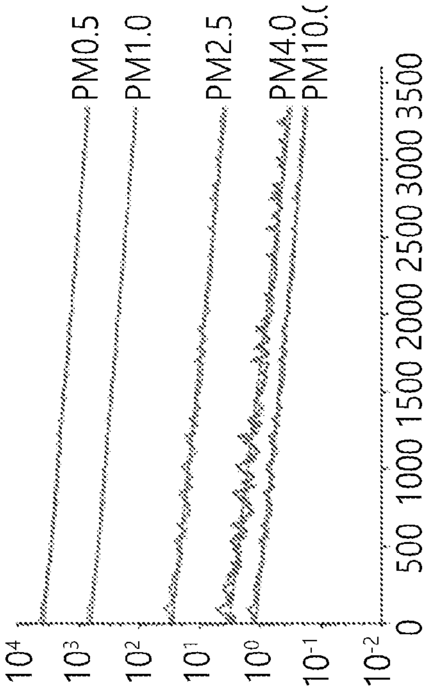
Figure 46C:
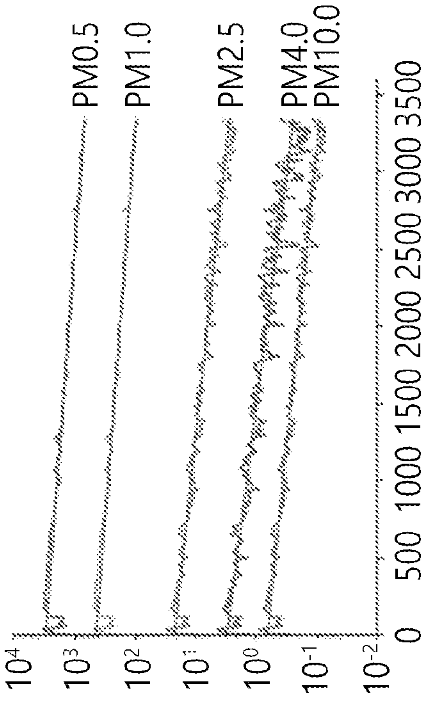
Figure 46D:
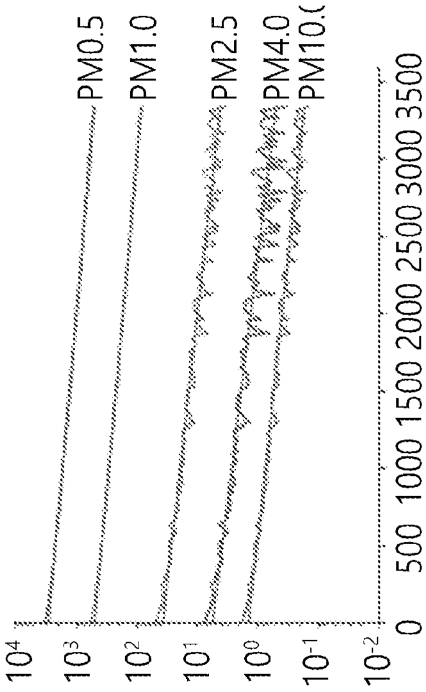

FIG. 46A shows a number concentration of fine particles obtained over time by the first sensor S1, with respect to each size (PM0.5, PM1.0, PM2.5, PM4.0, and PM10.0) of the fine particles. FIG. 46B shows a number concentration of fine particles obtained over time by the second sensor S2, with respect to each size of the fine particles. FIG. 46C shows a number concentration of fine particles obtained over time by the third sensor S3, with respect to each size of the fine particles. FIG. 46D shows a number concentration of fine particles obtained over time by the fourth sensor S4, with respect to each size of the fine particles.

Referring to FIGS. 46A to 46D, it was found that the concentrations of fine particles of all sizes were reduced over time even when no voltage was applied to the nozzle 300. Referring to FIG. 46, it was found that the concentrations of the fine particles were exponentially reduced over time even when no voltage was applied to the nozzle 300.

Referring to FIGS. 46A to 46D, the fine particle concentration over time when no voltage was applied to the nozzle 300 may be approximated as the following equation.

$$n(t) = n_0 e^{\frac{-t}{T_{off}}}$$

According to the above equation, $T_{off}$ may be obtained as about 1626 sec (about 27.1 min).

As another experimental example, after generating fine particles in the chamber, a high voltage is applied to the nozzle 300 and a change in the fine particle concentration detected by each of the sensors over time may be observed.

Figure 47A:
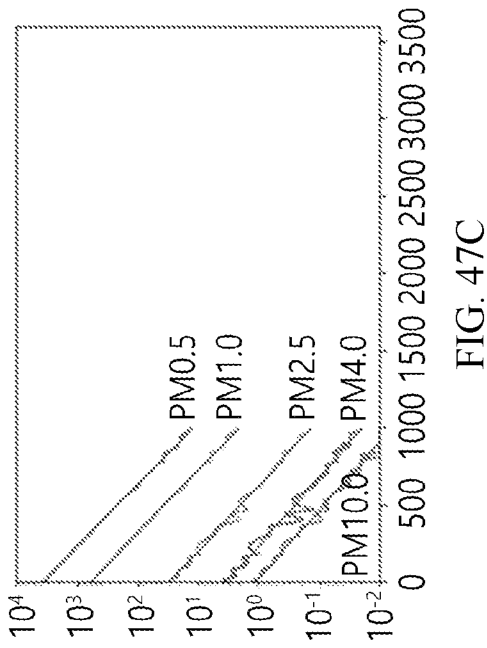
FIGS. 47A through 47D are diagrams illustrating another experiment with changes in fine particle concentrations.
Figure 47B:
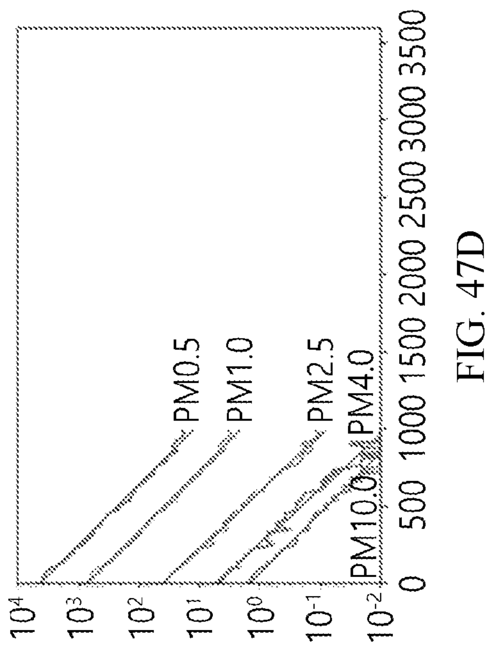
Figure 47C:
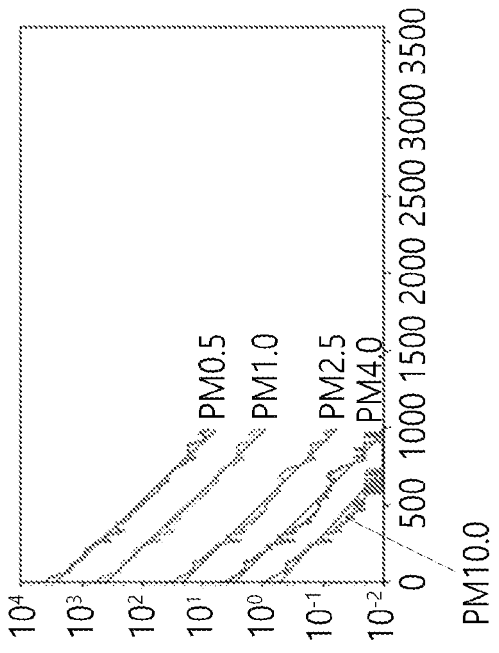
Figure 47D:
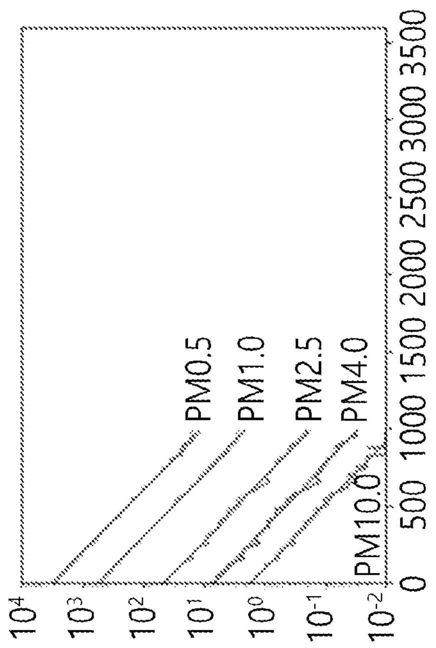

FIGS. 47A to 46D are diagrams illustrating another experimental example with changes in fine particle concentrations. FIGS. 47A to 47D show a number concentration of fine particles obtained by the first to the fourth sensor S1 to S4 when a voltage (for example, 24 kV in the experiment of FIGS. 47A to 47D) was applied to the nozzle 300. In each graph of FIGS. 47A to 47D, the x-axis denotes time and its unit is second (sec), and the y-axis denotes a number concentration of fine particles and its unit is number/cm$^3$.

FIGS. 47A to 47D show a number concentration of fine particles obtained over time by the first to the fourth sensor S1 to S4, respectively, when a voltage was applied to the nozzle 300, with respect to each size (PM0.5, PM1.0, PM2.5, PM4.0, and PM10.0) of the fine particles.

Referring to FIGS. 47A to 47D, it was found that the concentrations of the fine particles of each size were exponentially reduced over time when a voltage was applied to the nozzle 300.

Referring to FIGS. 47A to 47D, the fine particle concentration over time when a voltage was applied to the nozzle 300 may be approximated as the following equation.

$$n(t) = n_0 e^{\frac{-t}{T_{on}}}$$

According to the above equation, $T_{on}$ may be obtained as about 170.4 sec (about 3.17 min).

Based on the experimental results according to FIGS. 46 and 47, it was found that the rate of reduction of the fine particle concentration when a voltage was applied to the nozzle was significantly faster than that when no voltage was applied to the nozzle. Therefore, it was found that the device according to the present disclosure can reduce a fine particle concentration in a space rapidly even with low power.

Comparing the experimental results according to FIGS. 46A to 46D and 47A to 47D, the influence of the electric field on the fine particle concentration as a high voltage is applied to the nozzle may be estimated.

In analyzing the change in the fine particle concentration, various factors affecting the change in the fine particle concentration may be considered. For example, the fine particle concentration measured by each sensor may be changed by the influence of gravity, convection, or diffusion on fine particles.

Herein, as described above with reference to FIG. 46, the fine particle concentration when no voltage is applied to the nozzle 300 may be interpreted as decreasing because of the gravity, convection, or diffusion acting on fine particles. That is, $T_{off}$ may be a time period during which the fine particle concentration is reduced by various influences in the natural world which act on fine particles.

As described above with reference to FIG. 47, in addition to the influence of the gravity, convection, or diffusion acting on fine particles, the fine particle concentration when a voltage is applied to the nozzle 300 may be further affected by the electric force made to act on fine particles by the electric field caused by the voltage applied to the nozzle. That is, $T_{on}$ may be a time period during which the fine particle concentration is reduced by the electric force and various influences in the natural world which act on fine particles.

In the meantime, in analyzing the change in the fine particle concentration, the influence of gravity on fine particles, particularly, of PM 2.5 or less, may be ignored. Specifically, referring to the following equation, for particles of PM 1.0, Tg due to gravity may be calculated at 363 min, and for particles of PM 2.5, Tg due to gravity may be calculated at 64 min. Therefore, in estimating the influence of the electric field on the fine dust concentration, the influence of gravity may be ignored.

$$T_g = \frac{6V}{u_g A}$$

Herein, the influence of the electric field may be obtained as a combined average of Ton and Toff. With 1/Ton=1/$T_E$+1/Toff, $T_E$=Ton×Toff/(Toff−Ton)=3.17 min. is calculated.

Figure 48:
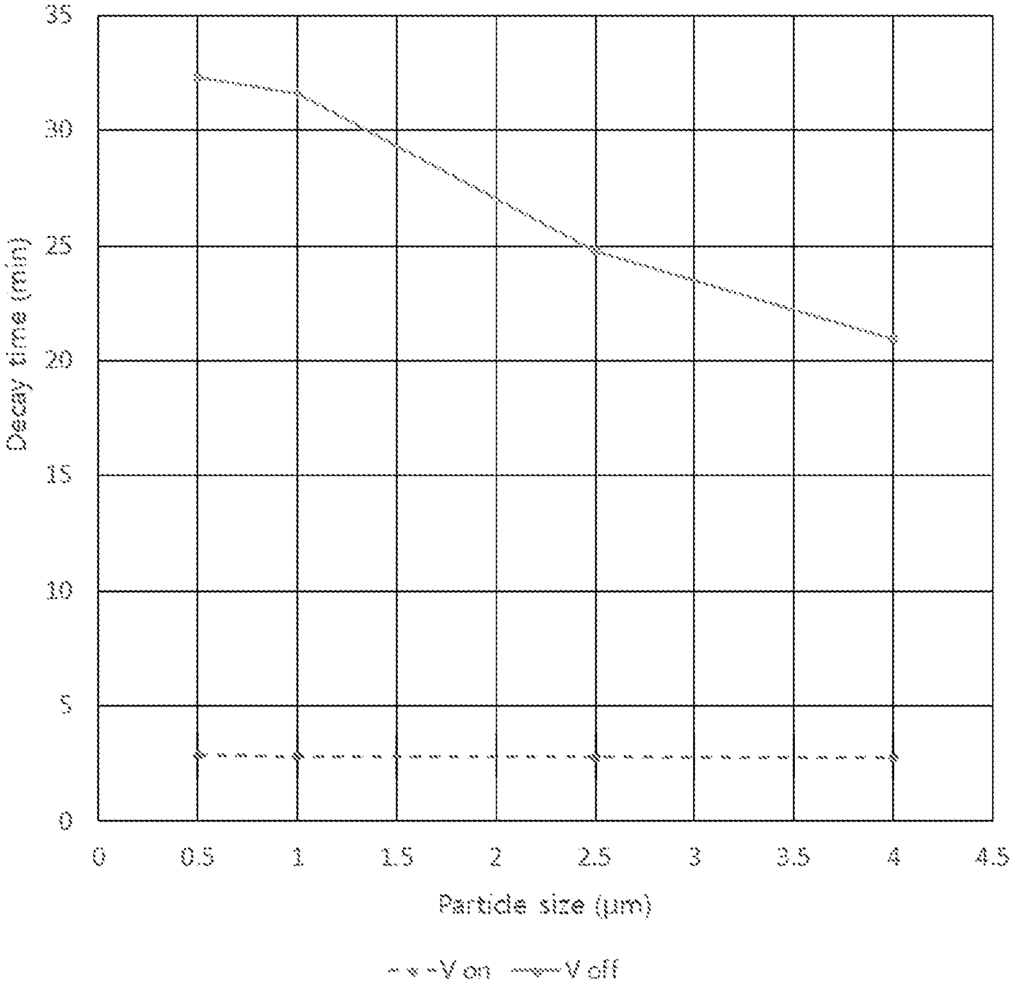
FIG. 48 is a diagram illustrating an experiment with a change in a fine particle concentration for each fine particle size.

FIG. 48 is a diagram illustrating an experimental example with a change in a fine particle concentration for each fine particle size. FIG. 48 shows a decay time for a fine particle concentration for each particle size (PM 0.5, PM 1.0, PM 2.5, and PM 4.0) when a voltage was applied to the nozzle 300 (V_on) and when not voltage was applied to the nozzle 300 (T_off). The decay time for the fine particle concentration may be calculated by obtaining a change in the number concentration over time obtained through each sensor, and by using exponential function fitting of the change in the number concentration over time. The decay time for the fine particle concentration may be calculated at an average value of the decay times obtained from the changes in the number concentrations over time obtained from the respective sensors.

Referring to FIG. 48, it was found that the fine particle decay times when a voltage was applied to the nozzle 300 (V_on) were significantly shorter than the fine particle decay times when no voltage was applied to the nozzle 300 (V_off). Referring to FIG. 48, it was found that the influence of particle sizes on the fine particle decay times when a voltage was applied to the nozzle 300 (V_on) was insignificant. That is, it was found that when a voltage was applied to the nozzle 300 (V_on), the fine particle decay times were shortened by a mechanism independent of fine particle sizes. Referring to FIG. 48, it was found that when no voltage was applied to the nozzle 300 (V_off), the particle sizes affected the fine particle decay times. Referring to FIG. 48, it was found that in general, the larger the particle size, the shorter the particle concentration decay time.

Regarding the influence of the electric field on the fine particles, the movement speed of fine particles by the electric field may be proportional to the intensity of the electric field and may have an inverse proportion or negative correlation with the particle radius r.

Herein, in the case of field charging, n may be proportional to the square of the particle radius r. That is, the influence of field charging on the movement speed of fine particles may have a positive correlation with the particle radius r or may be proportional thereto.

In the case of diffusion charging, n may be proportional to the particle radius r. That is, a movement speed component of the particles by diffusion charging may be determined regardless of the particle radius r.

Referring to the above-described details and FIG. 48, the influence of particle sizes on the particle concentration decay time when a voltage was applied to the nozzle (V_on) was insignificant, so it may be interpreted that the main mechanism for reducing the particle concentration when a voltage was applied to the nozzle (V_on) was the influence of the electric field by the diffusion charging.

In addition, referring to the above-described equations and FIG. 48, the particle concentration decay time when no voltage was applied to the nozzle (V_off) was affected by the particle sizes, so it may be interpreted that the main mechanism for reducing the particle concentration when no voltage was applied to the nozzle (V_off) was the influence of the electric field by the field charging.

In the meantime, in the above embodiments, the values obtained by the fifth to the eighth sensor S5 to S8 did not show meaningful differences from the values obtained by the first to the fourth sensor S1~S4, so results according to the fifth to the eighth sensor S5 to S8 are omitted.

Figure 49:
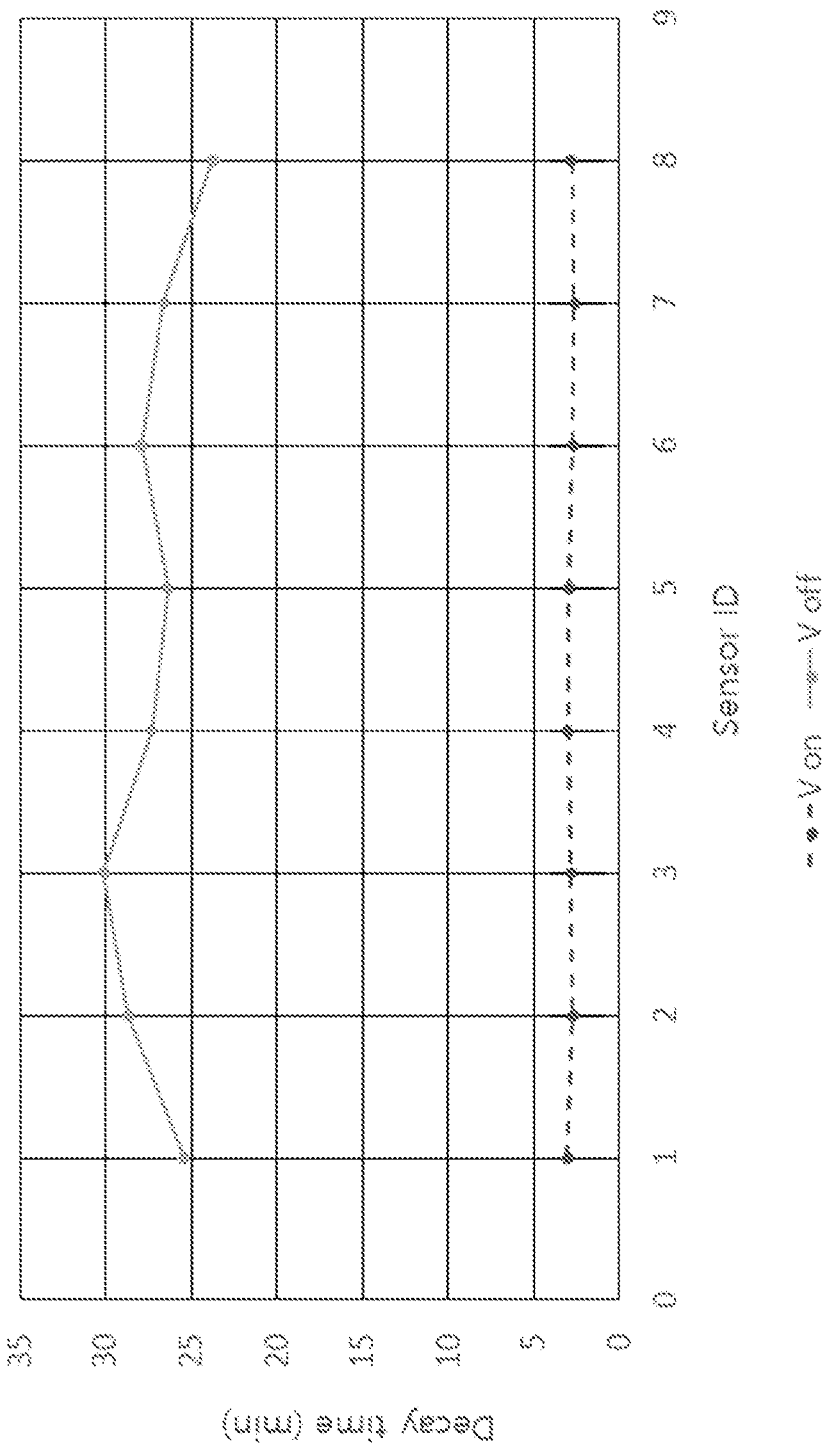
FIG. 49 is a diagram illustrating an experiment with a change in a fine particle concentration depending on a sensor location and voltage applying to a nozzle.

FIG. 49 is a diagram illustrating an experiment with a change in a fine particle concentration depending on a sensor location and voltage applying to a nozzle. FIG. 49 shows the fine particle concentration decay times according to the fine particle concentrations obtained from the respective sensors S1 to S8. The indicator lines in FIG. 49 denote, respectively with respect to the case in which no voltage was applied to the nozzle (V_off) and the case in which a voltage was applied to the nozzle (V_on), the fine particle concentration decay times according to the fine particle concentrations obtained from the respective sensor S1 to S8.

Referring to FIG. 49, it is found that the fine particle concentration decay times according to the fine particle concentrations obtained through the first to the fourth sensor S1 to S4 show a similar aspect to the fine particle concentration decay times according to the fine particle concentrations obtained through the fifth to the eighth sensor S5 to S8. In addition, referring to FIG. 49, it is found that in all the sensors, the fine particle concentration decay times in the case in which a voltage was applied to the nozzle (V_on) were shorter than those in the case in which no voltage was applied to the nozzle (V_off).

2.4 System for Reducing Outdoor Fine Particle Concentration

2.4.1 Outdoor Installation

According to an embodiment of the present disclosure, an operation of reducing a fine particle concentration may be used to reduce the fine particle concentration in outdoor space.

In the present disclosure, the outdoor space may mean a space having substantially the same environmental conditions as the atmosphere. The outdoor space described in the present disclosure may be understood as corresponding to outdoor space if the influence of temperature, humidity, or wind acts in the same manner as that in the atmosphere, even for a space partially surrounded by a structure, such as a wall or ceiling.

The operation of reducing the fine particles concentration described in the present disclosure may be performed by the device installed in the outdoor space. The device installed in the outdoor space may reduce the fine particle concentration in an outdoor target region. For example, the device described in the present disclosure may be installed in apartment complexes, playgrounds, outdoor theaters, schools, industrial complexes, parks, and the like to reduce a fine particle concentration.

2.4.2 Single-Device System

Figure 28:
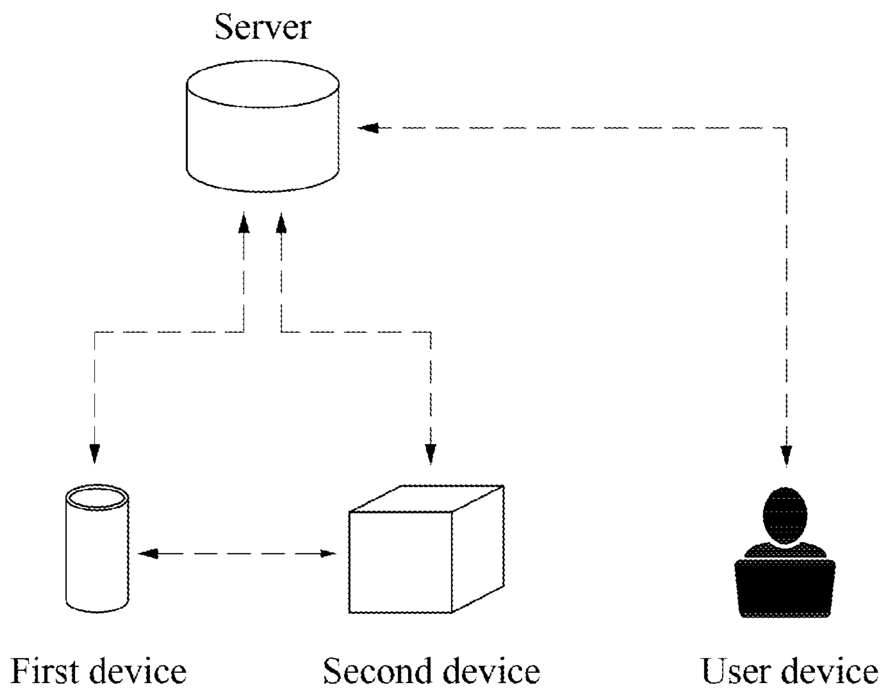
FIG. 28 is a diagram illustrating a system for reducing fine particles according to an embodiment of the present disclosure.

FIG. 28 is a diagram illustrating a system for reducing fine particles according to an embodiment of the present disclosure. Referring to FIG. 28, the system for reducing fine particles according to the embodiment may include a first device, a second device, a server, and a user device.

The first device may be a device for reducing a fine particle concentration described in the present disclosure. The first device may be a device for reducing a fine particle concentration of a target region.

The first device may communicate with the server. The first device may receive a control command from the server and may operate on the basis of the received control information. The first device may receive environmental information from the server. The first device may receive control information determined according to the environmental information from the server, and may operate on the basis of the control information. The first device may transmit device information to the server. The first device may transmit device information to the server. For example, the first device may transmit state information or operation information to the server.

The first device may directly communicate with the second device. The first device may obtain information (for example, environmental information) from the second device, and may operate on the basis of the obtained information.

The first device may have a sensor unit, and may obtain state information, operation information, or environmental information.

The second device may be a device performing a different function from the first device. The second device may be a device installed in a target region of the first device or near the target region. For example, the second device may be a sensor device that obtains environmental information in the target region corresponding to the first device or in the vicinity of the device.

The second device may include a sensor unit, and may obtain environmental information on the target region or the vicinity of the device. For example, the second device may obtain charge density, humidity, temperature, or weather information on the target region. Alternatively, the second device may obtain charge density, humidity, or temperature information on the vicinity of the first device.

The second device may transmit environmental information to the first device, the user device, or the server. The second device may transfer environmental information in response to a request of the first device or server.

The system for reducing the fine particle concentration may include multiple sensor devices (that is, the second device in FIG. 28).

For example, the system for reducing the fine particle concentration may include: a first sensor device located at a first distance from the first device, and a second sensor device located at a second distance from the first device. Alternatively, the system may include: a first sensor device located at a first distance from the ground, and a second sensor device located at a second distance from the ground. The system may include: the first sensor device obtaining first information, and the second sensor device obtaining second information. For example, the first sensor device may obtain a density of space charge or a concentration of fine particles located a first distance from the first device. The second sensor device may obtain a density of space charge or a concentration of fine particles located at a second distance from the first device. According to an embodiment, the first information and the second information may be distinguished from each other. For example, the first sensor device may obtain a charge density or a concentration of fine particles at the ground. The second sensor device may obtain weather information, such as a temperature, humidity, atmospheric pressure, or wind, located at several tens of meters from the ground.

The server may manage the fine-particle concentration reduction operation of the first device. The server may store a program or data, and may communicate with an external device. The server may be a cloud server. The server may communicate with a device not shown in FIG. 27.

The server may store device information.

The server may store first device identification information for identifying the first device. The server may store first location information for identifying the location at which the first device is installed. The server may store first installation environmental information on the installation environment characteristics of the first device. For example, the server may store first installation environmental information indicating whether the location at which the first device is installed is indoor space or outdoor space, or whether the location at which the first device is installed is a housing complex or an industrial complex.

The server may communicate with the first device, the second device, and/or the user device. The server may mediate between the user device and the first device, and/or between the user device and the second device. The server may store the information obtained from the first device or the second device, or may transfer the information to the user device.

For example, the server may obtain state information or operation information of the device from the first device. The server may transfer, to the user device, the state information or operation information obtained from the first device. The server may transfer, to the user device, a guidance message generated on the basis of the state information or operation information received from the first device.

As another example, the server may obtain, from the second device, environmental information on the target region or the vicinity of the first device. The server may transfer the obtained environmental information to the user device. The server may transfer, to the user device, a guidance message generated on the basis of the obtained environmental information.

As another example, the server may obtain, from the user device, control information or a control command for the first device and/or the second device. The server may transfer, to the first device or the second device, the control information or control command obtained from the user device. The server may identify a destination on the basis of the control information or control command obtained from the user device, and may transfer the control information or control command to the identified destination.

As yet another example, the server may obtain state information or operation information from the first device. The server may transfer, to the second device, control information or a control command generated on the basis of the obtained information. The server may obtain environmental information from the second device. The server may transfer, to the first device, control information or a control command generated on the basis of the environmental information.

The server may manage a fine particle concentration of a target region by controlling the system for reducing the fine particle concentration. The server may generate a control command for controlling the device or control information that is the basis of the control command.

The server may store a program, an application, a web application, or a web page (hereinafter, referred to as an application) for managing the fine particle concentration. The server may generate control information or a control command through the application. The server may generate, through the application, control command information or a control command for making the first device perform the fine-particle concentration reduction operation, the device management operation, the charge density management operation, the time series control operation, or the feedback control operation, or all.

The server may generate control information or a control command for controlling the first device or the second device. The server may generate control information or a control command on the basis of information obtained from the first device, the second device, or the user device.

The server may generate, on the basis of information obtained from the first device, control information or a control command for controlling the first device. For example, the server may obtain, from the first device, state information or operation information of the device, and may generate control information or a control command considering the obtained information. For example, the server may obtain state information on the amount of discharged liquid from the nozzle of the device, and may generate a control command for the first device to start the nozzle cleaning mode when the amount of discharged liquid is lower than a reference value.

The server may generate, on the basis of information obtained from the second device, control information or a control command for controlling the first device. For example, the server may obtain a charge density of the target region from the second device, and when the charge density is equal to or lower than a reference value, the server may generate a control command for applying a voltage higher than a default value to the nozzle of the first device.

The server may obtain control information, and may generate a control command on the basis of the control information. For example, the server may obtain first control information for the first device from the user device, and may generate a first control command on the basis of the first control information. The server may obtain control information for a first target region from the user device, and may generate a first control command for controlling the first device corresponding to the first target region. As a specific example, the server may obtain control information including a target fine-particle concentration reduction level of the target region, and may generate, on the basis of the control information, a control command including a control value for controlling the device, for example, a nozzle apply voltage, or a gas release amount.

The server may transfer control information or a control command to the first device or the second device.

For example, the server may transfer control information to the first device so that the first device generates a control command on the basis of the control information and operates according to the control command. Alternatively, the server may transfer control information to the first device so that the first device operates according to a control command.

As another example, the server may transfer control information to the second device so that the second device generates a control command on the basis of the control information and operates according to the control command. Alternatively, the server may transfer control information to the first device so that the second device operates according to a control command. For example, the server may transfer, to the second device, a control command for controlling such that the second device obtains environmental information on the target region.

The server may store obtained information. The server may store information obtained from the first device or the second device, control information generated by the server, a control command generated by the server, control information obtained from the user device, and/or a control command obtained from the user device.

The server may store information obtained from the first device or the second device.

The server may store state information or operation information of the first device obtained from the first device. The server may store environmental information obtained from the second device. The server may store information obtained from the first device or the second device together with the time point at which the information is obtained. For example, the server may store temperature information on the target region obtained from the second device together with the time point at which second information measures the temperature or the time point at which the server obtains the temperature information from the second information.

The server may store control information generated by the server, a control command generated by the server, control information obtained from the user device, or a control command obtained from the user device. For example, the server may store first control information and a first control command for the first device together with information on the first device.

The server may match different types of pieces of information, store and manage the resulting information.

The server may link and store pieces of information obtained from respective devices.

For example, the server may link and store information obtained from the first device and environmental information obtained from a first region. The server may link and store nozzle state information of the first device obtained from the device and charge density information of the target region obtained from the second device.

The server may link and store information obtained from the device and a control command.

For example, the server may link and store information obtained from the first device and a first control command (or first control information) for the first device. As a specific example, the server may link and store first state information obtained from the first device and a first control command generated on the basis of at least a part of the first state information.

As another example, the server may link and store environmental information and a control command obtained from the first device or the second device. The server may link and store first environmental information obtained from the target region in which the first device is located, and a first control command generated on the basis of at least a part of the first environmental information.

The server may provide a control command to the first device by using matched information.

The server may estimate second information based on first information, by using a database in which the first information and the second information are linked and stored. By using a database storing a change pattern of second information over time based on a change pattern of first information over time, the server may estimate a change in the second information over time on the basis of a change in the first information over time. The server may estimate second information by using a logic algorithm or a neural network model.

By using a database in which information obtained from the first device and a control command for the first device (for example, a control command for the first device obtained from the user device) are linked and stored, the server may generate a control command on the basis of the information obtained from the first device.

By using a database in which environmental information obtained from the second device and a control command for the first device (for example, a control command for the first device obtained from the user device) are linked and stored, the server may generate a control command on the basis of the information obtained from the second device.

The server may estimate second information on the basis of first information obtained from the first device or the second device, and may generate a control command according to the second information. For example, the server may estimate, on the basis of environmental information (for example, humidity information) obtained from the first device or the second device, operation information (for example, the amount of output current) of the device, and may generate a control command (for example, a control command for a nozzle voltage) according to the estimated operation information.

In the meantime, FIG. 28 shows as a reference the case in which the server is provided as a separate physical device, but the server may be included in the first device. For example, the first device may include the server, and may perform the above-described operation of the server. In other words, the first device may perform the above-described operation of the server device, such as storing information obtained from the first device and/or the second device, transferring information to the user device by communicating with the user device, obtaining control information from the user device, generating or managing a control command for the operation of the first device, and controlling the operation of the first device.

The user device may obtain a user input, and may manage a fine particle concentration of a target region by communicating with the server or each device of the system for reducing the fine particle concentration.

The user device may run a program, an application, a web application, or a web page (hereinafter, referred to as an application) for managing the fine particle concentration. The user device may provide, through the application, the user with the information obtained from the first device or the second device and may obtain user input information.

The user device may include a display unit and/or an input unit. The user device may provide, through the display unit, the user with the information obtained from the first device, the second device, and/or the server. The user device may obtain information related to the operation of the first device or the second device from the user through the input unit.

The user device may provide a user interface. The user device may obtain a user input through the user interface, and may provide the user with the information obtained from the first device, the second device, or the server.

The user device may communicate with the server device, the first device, and/or the second device. The user device may obtain state information of the device, operation information of the device, or environmental information on the target region by communicating with the first device, the second device, and/or the server.

The user device may generate a control command. The user device may obtain control information, and may generate a control command on the basis of the control information. For example, the user device may obtain, from the user through the user interface, a nozzle output current value for the first device or a radius R value of the target region for the first device, and may generate a control command on the basis of the obtained value, for example, a control command including a nozzle apply voltage.

The user device may transfer the generated control command to the server, the first device, or the second device.

Figure 29:
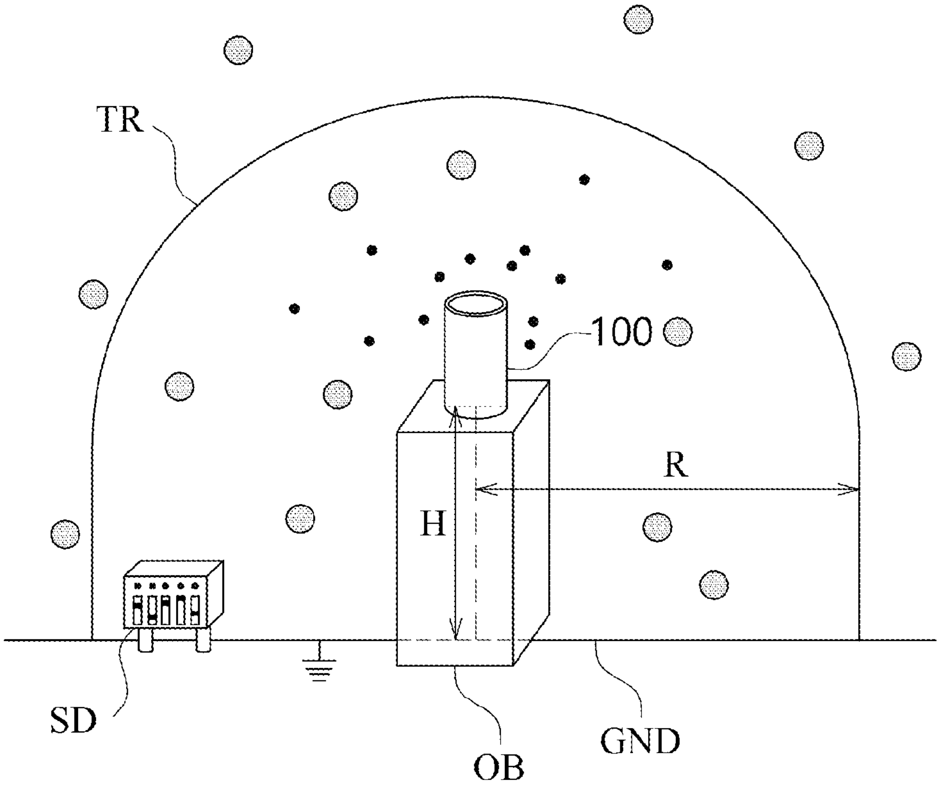
FIG. 29 is a diagram illustrating an operation of a system for reducing a fine particle concentration according to an embodiment of the present disclosure.

FIG. 29 is a diagram illustrating a system for reducing fine particles according to an embodiment of the present disclosure.

Referring to FIG. 29, the system for reducing fine particles, the system for reducing fine particles may include a device 100 for managing a fine particle concentration. The device 100 may form negative space charge near the device by releasing negatively charged droplets.

Referring to FIG. 29, the device 100 may be installed on an object or a structure OB. The installation location of the device may be determined considering the space charge formed by the device 100 and the form of the electric field resulting therefrom. The device 100 may be installed such that the region in which the device forms the space charge covers a region requiring reduction of a fine particle concentration. For example, the device may be installed on the roof of a building or an outdoor structure. In the case in which the device is installed on a structure OB, an insulation material may be used when necessary. An installation method of the device will be described later in more detail in Device Installation Method.

The device 100 may have an effective radius R. The effective radius may mean a radius of a target region TR of the device 100. The effective radius may mean a radius of a region of which a fine particle concentration can be reduced by a reference ratio within a reference time period by the device.

The device may have a target region TR in the shape of a dome. The target region TR may mean a region of which a fine particle concentration can be reduced by a reference ratio within a reference time period by the device. The target region TR may be determined according to the height H of the device from the ground and the effective radius R. The shape of the target region TR of the device may be changed according to the environmental factors. For example, if there is wind in the target region, the target region has a dome shape skewed along the direction of the wind.

The device may be installed at a location spaced apart from the ground by a predetermined distance H. The height H of the device from the ground or the effective radius R may be determined considering the operating efficiency of the device. The device may be installed at a location spaced apart from the ground by a predetermined ratio with respect to the effective radius R. For example, the device may be installed at a location spaced apart from the ground by a height H having a value between ½ and 2 times the effective radius R. For example, the device having an effective radius of 30 m may be installed at a location spaced apart from the ground by 50 m.

Referring to FIG. 29, the system for reducing fine particles according to the embodiment may include a sensor device SD installed in the target region. The sensor device SD may be installed at a location within the target region TR. For example, the sensor device SD may be installed at a location spaced apart by the effective radius R from the point at which the device (or the structure on which the device is installed) is located. As another example, the sensor device SD may be located near the device.

The sensor device may obtain environmental information on the target region TR. For example, the sensor device may obtain environmental information including any one of the following: the temperature, humidity, atmospheric pressure, air current (for example, wind velocity), air quality (for example, a concentration of fine dust), and a density of space charge in the target region. The sensor device may obtain environmental information at the location at which the sensor device is installed. The sensor device may obtain the environmental information, and may transfer the same to the device for reducing the fine particle concentration, the server, or the user device.

In the meantime, the system for reducing fine particles may include multiple sensor devices. For example, the system for reducing fine particles may include: a first sensor device installed at a location spaced apart from the device 100 by a first distance, and obtaining first information; and a second sensor device installed at a location spaced apart from the device 100 by a second distance, and obtaining second information. The first information and the second information may be at least partially distinguished from each other.

The first sensor device may be installed at a location spaced apart from the ground GND by a first distance. The second sensor device may be installed at a location spaced apart from the ground GND by a second distance. Herein, either the first distance or the second distance may be substantially equal to the height H at which the device is installed.

For example, the first sensor device may obtain a density of space charge or a fine particle concentration at a location spaced apart from the device 100 by an effective radius R of the device. The second sensor device may obtain a density of space charge near the device 100. As another example, the first sensor device may obtain a charge density and a fine particle concentration on the ground GND, and the second sensor device may obtain weather information, such as a temperature, humidity, atmospheric pressure, or wind, at a location spaced apart from the ground by several tens of meters (for example, between H and 2H).

The system for reducing fine particles according to the embodiment may include the device for reducing fine particles and the sensor device shown in FIG. 29. In addition, although not shown in FIG. 28, the system for reducing fine particles may further include a server device and a user device, and may operate as described above with reference to FIG. 27.

FIGS. 29 to 32 are diagrams illustrating an operation of a system for reducing a fine particle concentration according to an embodiment of the present disclosure. Referring to FIGS. 29 to 32, the system for reducing the fine particle concentration may reduce the fine particle concentration in the target region TR.

Referring to FIGS. 29 to 32, the system for reducing the fine particle concentration may include a device 100 installed at a predetermined height H from the ground GND, and a sensor device SD. The device 100 may have an effective radius R. The device 100 may be installed at a predetermined height H. The system for reducing the fine particle concentration described with reference to FIGS. 29 to 32 may be configured and operated similarly to the system for reducing the fine particle concentration described with reference to FIG. 28 unless otherwise specifically described.

Figure 30:
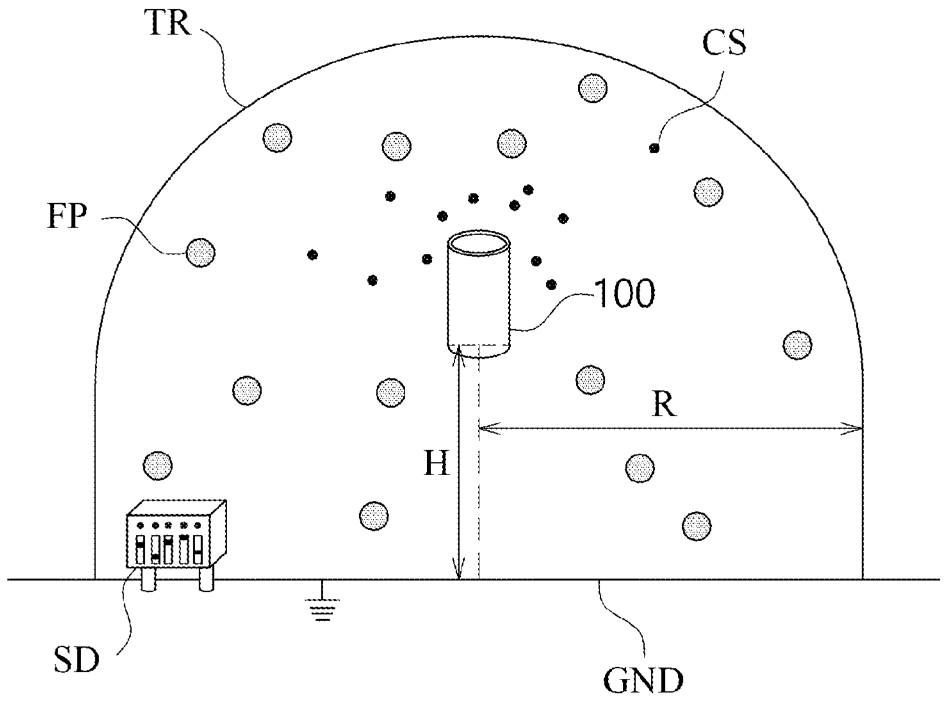
FIG. 30 is a diagram illustrating an operation of a system for reducing a fine particle concentration according to an embodiment of the present disclosure.

Referring to FIG. 30, the device 100 may provide a charged substance CS. For example, the device 100 may release negatively charged droplets. The device 100 may provide a charged substance CS into the atmosphere by releasing negatively charged droplets.

The device 100 may output a current in a predetermined range. The device 100 may operate such that the amount of charge output per hour through the nozzle (or nozzle array) is within a predetermined range. For example, the device 100 may output a current ranging from 100 μA to 10 mA through the nozzle. The device may output a first current.

The device 100 may start to release a charged substance when a concentration of fine particles FPs in the target region TR is a first concentration. The first concentration may be an initial concentration of fine particles FPs.

Referring to FIG. 30, the sensor device SD may obtain environmental information. For example, the sensor device SD may obtain a temperature, humidity, atmospheric pressure, wind velocity, wind direction, a concentration of fine particles, or charge density. The sensor device SD may start to obtain the environmental information in response to that the device 100 starts to operate. According to an embodiment, the sensor device SD may obtain the environmental information and may transfer the same to the server or the device 100.

According to an embodiment, the device 100 may start to operate on the basis of the environmental information obtained from the sensor device SD. For example, when information on a fine particle concentration exceeding a reference value is obtained from the sensor device SD, releasing charged droplets is started.

The device 100 may operate on the basis of the environmental information obtained from the sensor device SD. For example, the device 100 may operate according to a physical quantity, for example, a voltage applied to the nozzle, the flow rate (or flow velocity) of the liquid provided to the nozzle, or the amount of gas released per hour, determined on the basis of the environmental information, for example, a humidity, temperature, atmospheric temperature, atmospheric pressure, or wind velocity, obtained from the sensor device SD. As a specific example, the device 100 applies a voltage higher than a default value to the nozzle when the humidity information obtained from the sensor device SD is higher than a reference value.

Figure 31:
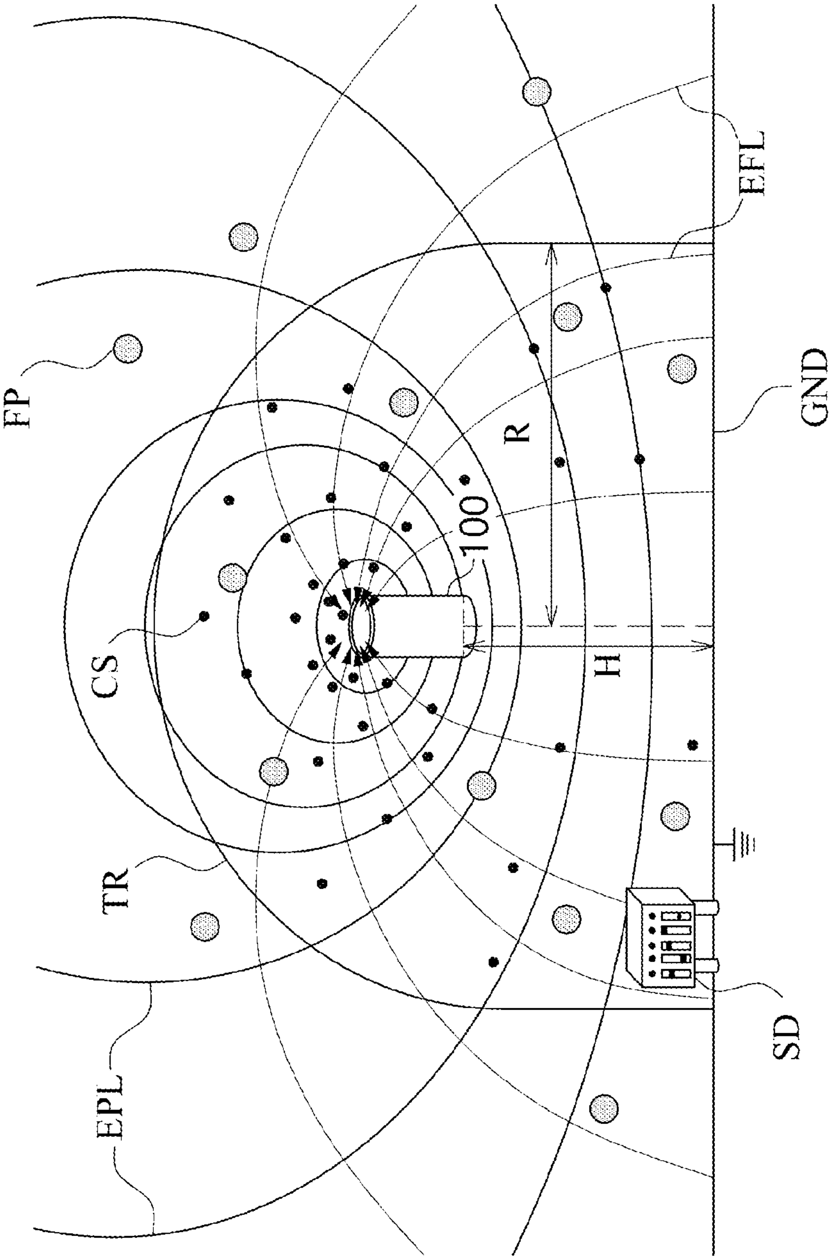
FIG. 31 is a diagram illustrating an operation of a system for reducing a fine particle concentration according to an embodiment of the present disclosure.

Referring to FIG. 31, the system for reducing the fine particle concentration may form space charge in the target region TR.

Referring to FIG. 31, the device 100 may output charged droplets continuously or repeatedly. The device 100 may form space charge in the target region TR by outputting charged droplets continuously or repeatedly. The device 100 may form space charge having the highest charge density near the device (for example, near the discharge hole of the nozzle), and the charge density decreases as it goes away from the device 100.

The formed space charge may form an electric field. According to an example, an equipotential line EPL and an electric force line EFL of an electric field formed by the device 100 may be formed as shown in FIG. 30. Referring to FIG. 30, the electric force line formed by the device 100 may be formed in a direction of the device from the ground.

The device 100 may at least partially charge the fine particles FDs in the target region TR by outputting charged droplets continuously or repeatedly. For example, the fine particles FDs in the target region TR may be negatively charged under the influence of the space charge formed by the device. The charging of the fine particles may be due to charging (field charging) as electrons moving by the electric field collide with the fine particles or due to charging (diffusion charging) by random motion of charges.

The device 100 may supply a sufficient amount of electrons to the target region to charge the fine particles. The device 100 may supply, to the target region, electrons several tens of thousand to several hundreds of thousand times as many as the fine particles in number. The number of electrons supplied by the device may be determined according to the effective radius of the device, and/or supply power.

Herein, a case of 35 $\mu g/m^3$ in ultra-fine dust of PM 2.5 or less will be described as a reference for example. The device 100 may supply, to the target region TR, electrons 100,000 times or more as many as the fine particles in number. In the case of 35 $\mu g/m^3$ in ultra-fine dust of PM 2.5 or less, there are 2.67 pieces of ultra-fine dust per 1 $cm^3$. Herein, when the supply power of the device is 1 kW, 286,000 charged particles are supplied. Among them, the charges adhering to the fine dust may be calculated as 638 in number. 239 electrons adhere to each fine dust particle, so the fine dust is negatively charged. For example, when the device maintains for 1 hour the operation state in which 286,000 charged particles are output per unit time, a fine particle concentration of the target region within a radius of 30 m from the device is reduced by 90% or more. In other words, the device having the effective radius of 30 m may operate with a supply power of 1 kW in an environment of 35 $\mu g/m^3$ in ultra-fine dust of PM 2.5 or less.

The sensor device SD may obtain environmental information according to the operation of the device. For example, the device 100 may obtain a charge density value at one location in a target region according to the operation of the device. The sensor device SD may obtain a change in the charge density value at the location in the target region according to the operation of the device. The sensor device SD may obtain the charge density value of the device, and may transfer the same to the server or the device 100.

The device 100 may change the operation state on the basis of the environmental information obtained from the sensor device SD. For example, when the charge density value measured by the sensor device SD is lower than or higher than an estimated value, the device 100 increases or decreases the output current.

Figure 32:
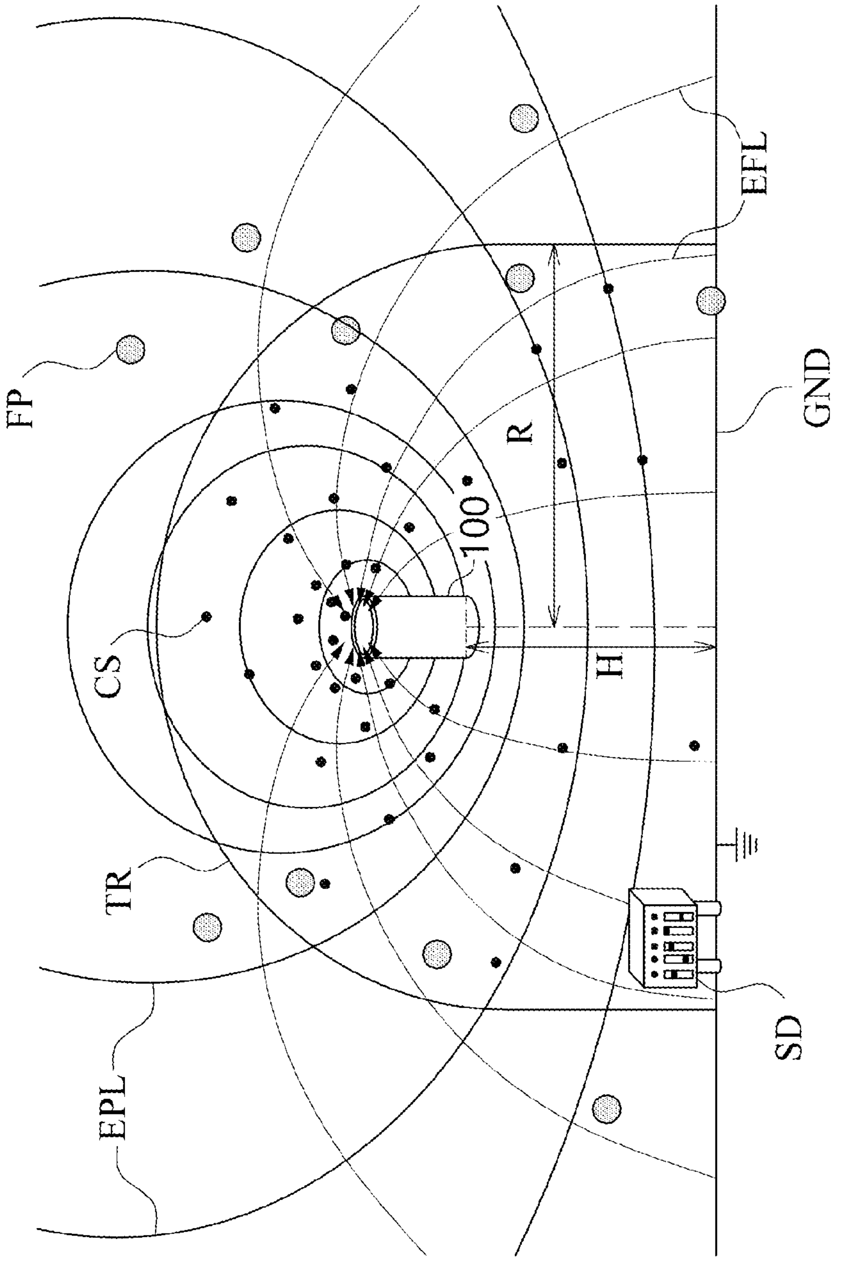
FIG. 32 is a diagram illustrating an operation of a system for reducing a fine particle concentration according to an embodiment of the present disclosure.

Referring to FIG. 32, the system for reducing the fine particle concentration may provide power to the fine particles FPs in the target region TR.

Referring to FIG. 32, the device 100 may maintain the space charge distribution in the target region TR at a predetermined level or higher by releasing charged droplets continuously or repeatedly. The system for reducing the fine particle concentration may form space charge in the target region TR, and may provide electric force to charged fine particles FPs through the space charge, so that the fine particles FPs are moved. The system for reducing the fine particle concentration may form an electric field in the target region TR, and may provide electric force to charged fine particles FPs through the electric field.

The device 100 may at least partially push out the fine particles FPs in the target region TR. The device may maintain the space charge in the target region TR so that the fine particles FPs receive power and move away from the device 100. The device 100 may output charged droplets continuously or repeatedly during the time period sufficient for the fine particles FPs in the target region TR to be pushed out enough under the influence of the space charge, and for the concentration of the fine particles FPs in the target region TR to be reduced to a reference value or lower.

For example, as the space charge and the electric field are maintained by the device 100, the charged fine particles FDs in the target region may receive electric force in a direction away from the device 100. The fine particles FPs may receive a ground-directed component force under the influence of the electric force. The fine particles FPs may move in a direction away from the device under the influence of the electric force. The fine particles FPs may move out of the target region under the influence of the electric force. For example, the fine particles FPs may move in a direction away from a target device along the electric force line EFL of the electric field formed by the device 100. As the fine particles FPs move in a direction away from the device, the fine particle concentration in the target region TR may be reduced.

Referring to FIG. 32, the sensor device SD may obtain environmental information on the target region TR according to the operation of the device. The sensor device SD may obtain a change in the environmental information according to the operation of the device.

The sensor device SD may obtain a charge density in the target region. For example, the sensor device SD may obtain a fine particle concentration of the target region. The sensor device SD may transfer the environmental information or the change in the environmental information to the device 100, the server, or the user device.

The device 100 may change the operation state on the basis of the information obtained from the sensor device SD. The device 100 stops the operation or reduce the output current value when the concentration of the fine particles FPs obtained from the sensor device SD is equal to or lower than a reference value. Alternatively, the device 100 increases the amount of output current when the concentration of the fine particles FPs obtained from the sensor device SD is equal to or higher than a reference value.

Figure 33:
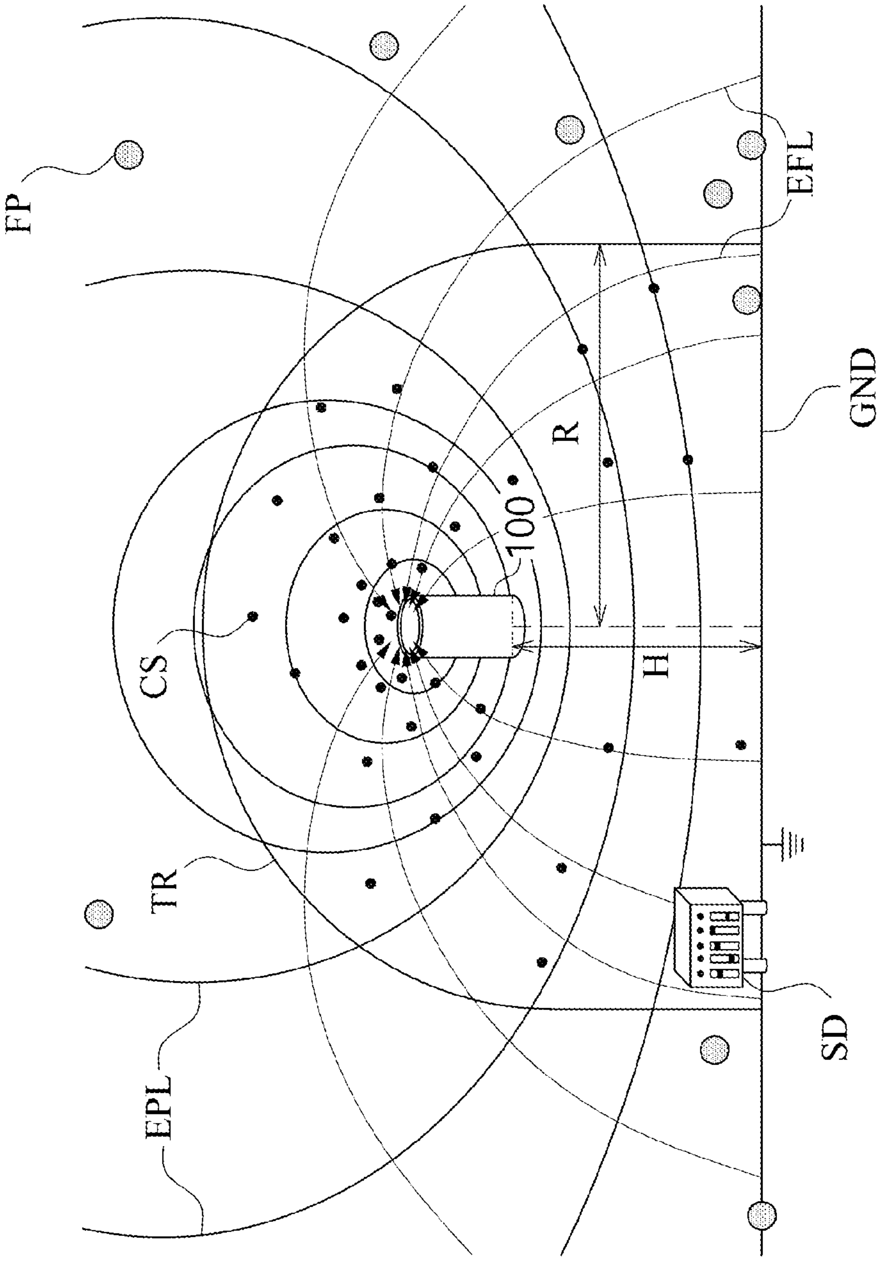
FIG. 33 is a diagram illustrating a system for reducing fine particles according to an embodiment of the present disclosure.

Referring to FIG. 33, the system for reducing the fine particle concentration may remove the fine particles FPs in the target region TR.

Referring to FIG. 33, the device 100 may maintain the state in which the space charge distribution and the electric field are formed in the target region TR, by releasing charged droplets continuously or repeatedly. The device 100 may maintain the state in which the electric field is formed, for a sufficient time period such that the charged particles move in a ground direction, come into contact with the ground, lose charge, and settle.

For example, as the space charge and the electric field formed by the device 100 are maintained, the fine particles FPs in the target region TR may move toward the ground GND under the influence of the electric force. As the space charge and the electric field are maintained for a sufficient time period, the fine particles FDs move along the electric force line EFL, come into contact with the ground GND, and lose charge. As the fine particles FDs adhere to the ground, the concentration of the fine particles FPs in the target region TR may be reduced.

Referring to FIG. 33, the sensor device SD may obtain environmental information, for example, a concentration of fine particles in the target region TR or a change in the concentration of fine particles. Referring to FIG. 32, the sensor device SD may obtain the concentration of fine particles, and may transfer the same to the device 100, the server, or the user device.

The device 100 may change the operation state according to the environmental information obtained from the sensor device SD. For example, the device 100 stops the operation or reduce the output current value when the concentration of the fine particles obtained from the sensor device SD is equal to or lower than a reference value. The device 100 resumes releasing a current or increases the release current when the concentration of the fine particles FPs obtained from the sensor device SD increases from a reference value or lower to the reference value or higher.

2.4.3 Multi-Device System

According to an embodiment, a system for reducing fine particles may include multiple devices for reducing fine particle concentrations.

Figure 34:
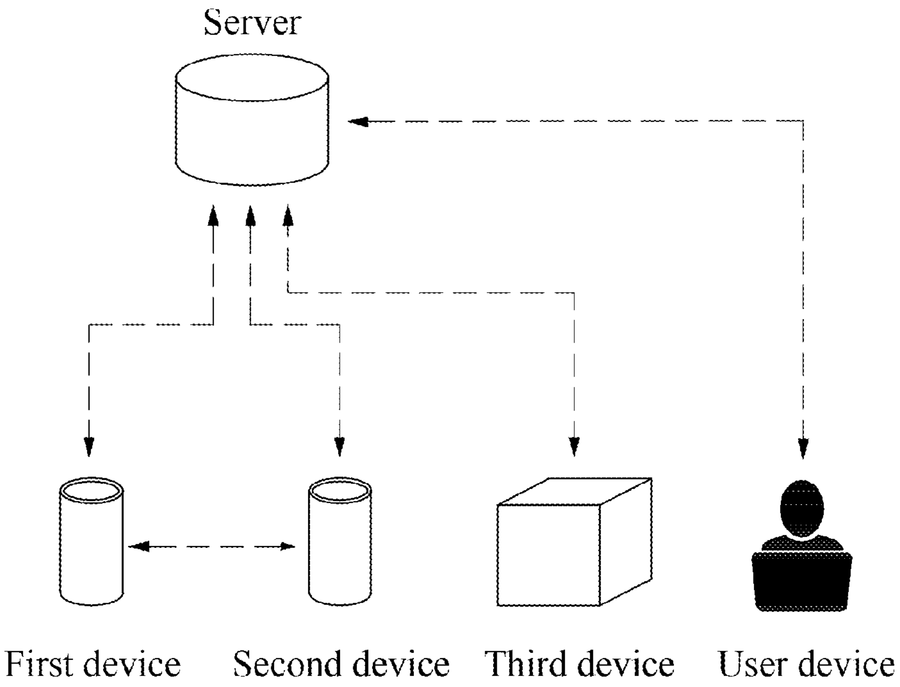
FIG. 34 is a diagram illustrating a system for reducing a fine particle concentration according to an embodiment of the present disclosure.

FIG. 34 is a diagram illustrating a system for reducing fine particles according to an embodiment of the present disclosure.

Referring to FIG. 34, the system for reducing fine particles according to the embodiment may include a first device, a second device, a third device, a server, and a user device. Hereinafter, the first device and the second device may operate similarly to the first device described above with reference to FIG. 28. The user device and the server may also operate similarly to those described above with reference to FIG. 28. The third device may operate similarly to the second device described above with reference to FIG. 28.

The first device and the second device may be devices for reducing a fine particle concentration of a target region described in the present disclosure. The first device may be a device for reducing a fine particle concentration of a first target region. The second device may be a device for reducing a fine particle concentration of a second target region. The first target region and the second target region may be at least partially different from each other. The first device and/or the second device may have respective sensor units, and may obtain state information, operation information, or environmental information.

The third device may be a device having a function at least partially different from that of the first device or the second device. For example, the third device may be a sensor device having one or more sensor units. The third device may be a sensor device that obtains the environmental information and transfers the same to the first device, the second device, the server, and/or the user device.

For example, the third device may be a sensor device that obtains first environmental information on the first target region corresponding to the first device, and/or second environmental information on the second target region corresponding to the second device. The third device may obtain environmental information on the vicinity of the first device and/or the second device. For example, the third device may obtain charge density, humidity, temperature, or weather information on the first target region and/or the second target region. Alternatively, the third device may obtain charge density, humidity, or temperature information on the vicinity of the first device and/or the second device.

The third device may transmit environmental information to the first device, the second device, and/or the server. The third device may transfer environmental information in response to a request of the first device, the second device, and/or the server.

In the meantime, FIG. 34 shows only one third device, but the system for reducing fine particles may include multiple third devices, for example, multiple sensor devices.

For example, the system for reducing the fine particle concentration may include: a first sensor device corresponding to the first target region of the first device, and a second sensor device corresponding to the second target region of the second device. The first sensor device may obtain environmental information on the first target region. The second sensor device may obtain environmental information on the second target region. Each of the sensor devices may be located at a point on its corresponding region, or may be located near the corresponding device.

As another example, the system for reducing the fine particle concentration may include: a first sensor device corresponding to the first device and located at a first distance from the first device, a second sensor device corresponding to the first device and located at a second distance from the first device, a third sensor device corresponding to the second device and located at a third distance from the second device, and a fourth sensor device corresponding to the second device and located at a fourth distance from the second device. The sensor devices corresponding to the respective devices for reducing the fine particle concentration may operate similarly to those described above with reference to FIG. 27.

The server may manage the fine-particle concentration reduction operations of the first device and the second device. The server may store a program or data, and may communicate with an external device. The server may be a cloud server. The server may communicate with a device not shown in FIG. 33.

The server may communicate with the first device, the second device, the third device, and/or the user device. The server may mediate between the user device and the first device, the second device, and/or the third device.

The server may store device information.

The server may store first device identification information for identifying the first device, first location information for identifying the location at which the first device is installed, and/or first installation environmental information on the installation environment characteristics of the first device. For example, the server may store first installation environmental information indicating whether the location at which the first device is installed is indoor space or outdoor space, or whether the location at which the first device is installed is a housing complex or an industrial complex. The server may store second device identification information, second location information, or second installation environmental information of the second device.

The server may store the information obtained from the first device to the third device, or may transfer the information to the user device.

For example, the server may obtain first state information or first operation information from the first device, and may store the same or transfer the same to the user device. For example, the server may obtain the amount of liquid stored in the first device from the device, and may store the same or transfer the same to the user device. The server may store the information obtained from the first device together with identification information of the first device, or may transfer the information obtained from the first device together with the identification information of the first device to the user device. Alternatively, the server may obtain second state information or second operation information from the second device, and may store the same or transfer the same to the user device.

As another example, the server may obtain, from the third device, first environmental information on the first target region or second environmental information on the second target region. Alternatively, the server may obtain, from the third device, first environmental information obtained near the first device or second environmental information obtained near the second target region. The server may store the second environmental information or transfer the same to the user device.

According to an embodiment, in the case in which the system for reducing the fine particle concentration includes the multiple sensor devices, the server may obtain first environmental information from the first sensor device, may obtain second environmental information from the second sensor device, and may store the obtained environmental information or transfer the same to the user device. The server may transfer the first environmental information and identification information of the first device to the user device. The server may obtain the first environmental information from the first sensor device, and may transfer the first environmental information to the first device or the second device.

The server may transfer, to the user device, a guidance message generated on the basis of the obtained environmental information. The server may transfer, to the user device, a guidance message including the obtained environmental information and the identification information of the corresponding device.

The server may control the system including the multiple devices for reducing the fine particle concentrations, thereby managing fine particle concentrations of multiple target regions. The server may generate a control command for controlling the multiple devices or control information that is the basis of the control command, and may transfer the same to each device.

The server may store a program, an application, a web application, or a web page (hereinafter, referred to as an application) for managing the fine particle concentration. The server may generate control information or a control command through the application.

The server may generate a first control command or first control information for controlling the first device. The server may generate the first control information or the first control command on the basis of first state information or first operation information obtained from the first device. For example, the server may obtain a current value output by the first device, and may compare the current value with a reference current to generate the first control command for applying a current value higher or lower than the existing value. The server may generate a second control command or second control information for controlling the second device.

The server may generate, on the basis of first information obtained from the first device, a second control command for controlling the second device. The server may obtain state information of the first device from the first device, and may generate the second control command. For example, the server may obtain an output current value from the first device, and when the current value output from the first device is lower than a reference value, the server generates a second control command for making an output current value of the second device higher than a reference current value, and transfers the second control command to the second device. When the first device fails to generate an appropriate output current because of a failure, a fine particle concentration of a first corresponding region corresponding to the first device is reduced by increasing the output of the second device.

The server may generate, on the basis of environmental information obtained from the third device, a control command for controlling the first device and/or the second device. The server may obtain first environmental information on the first target region from the third device, and may generate a first control command on the basis of the first environmental information.

In the case in which the system for reducing the fine particle concentration includes the multiple sensor devices, the server may generate a first control command on the basis of first environmental information obtained from the first sensor device, and may generate a second control command on the basis of second environmental information obtained from the second sensor device. For example, the server may generate a first control command for the first device to use, as a nozzle current, a first current determined according to a first humidity value obtained from the first sensor device. The server may generate a second control command for the second device to use, as a nozzle current, a second current determined according to a second humidity value that is obtained from the second sensor device and is higher than the first humidity value.

Alternatively, the server may generate a first control command and a second control command considering first environmental information and second environmental information together. For example, using an average value of a humidity value obtained from the first sensor device and a sensor value obtained from the second sensor device as a reference humidity value, the server may generate and transfer a first control command and a second control command for the first device and the second device to apply, to the nozzles, a nozzle voltage determined according to the reference humidity value.

The server may obtain control information, and may generate a control command on the basis of the control information. For example, the server may obtain control information on the first device or the second device from the user device, and may generate a control command for controlling the device, according to the control information. The server may obtain first control information corresponding to the first device from the user device, and may generate a first control command. Alternatively, the server may obtain first control information on the first target region (for example, first control information including the target reduction ratio for the fine particle concentration of the first target region), and may generate a first control command for controlling the first device. Alternatively, the server may obtain control information on a third region including the first target region and the second target region (for example, first control information including a target reduction ratio for a fine particle concentration of a third target region), and may generate a first control command for controlling the first device and a second control command for controlling the second device.

The server may obtain, from the user device, control information or control command on the first device, the second device, and/or the third device. For example, the server may obtain a first control command on the first device from the user device. The server may obtain a second control command on the second device from the user device. The server may transfer the first control command to the first device, and may transfer the second command to the second device. The server may transfer information obtained from the first to the third device to the user device, and in response thereto, may obtain control information or a control command from the user device.

The server may store obtained information. The server may store information obtained from the first device to the third device, control information generated by the server, a control command generated by the server, control information obtained from the user device, or a control command obtained from the user device, or all.

The server may store obtained information together with identification information. The server may store the information obtained from the first device together with the identification information of the first device, and may store the information obtained from the second device together with identification information of the second device. Alternatively, the server may store the information obtained from the first sensor device together with the identification information of the first device, and may store the information obtained from the second sensor device together with the identification information of the second device.

The server may store obtained information together with time information. For example, the server may store first information obtained at a first time point from the first device, together with information on the first time point, and may store information obtained at a second time point from the first device, together with information on the second time point.

The server may match different types of pieces of information, store and manage the resulting information. The server may link and store pieces of information obtained from respective devices.

The server may match and manage environmental information and a control command. For example, the server may match and store first environmental information obtained from the third device (or the first sensor device) and first control information or a first control command generated corresponding to the first environmental information by the user device. The server may match and store second environmental information obtained from the third device (or the second sensor device) and second control information or a second control command generated corresponding to the second environmental information by the user device.

The server may match and manage a control command and information. The server may match and store first state information, first operation information of the first device, or first environmental information of the first target region, and a first control command obtained from the user. The server may match and store second state information, second operation information of the second device, or second environmental information of the second target region, and a second control command obtained from the user.

The server may provide a control command to the first device by using matched information. The server may estimate second information based on first information, by using a database in which the first information and the second information are linked and stored. Unless otherwise noted, the details described with reference to FIG. 27 may be applied.

By using a first database in which information obtained from the first device and a first control command for the first device (for example, a control command for the first device obtained from the user device) are linked and stored, the server may generate a control command on the basis of the information obtained from the first device. By using a second database in which information obtained from the second device and a second control command for the second device (for example, a control command for the second device obtained from the user device) are linked and stored, the server may generate a control command on the basis of the information obtained from the second device.

By using a first database in which environmental information obtained from the third device and a first control command for the first device (for example, a first control command for the first device obtained from the user device) are linked and stored, the server may generate a first control command on the basis of the information obtained from the first device. Alternatively, by using a second database in which environmental information obtained from the third device and a second control command for the second device (for example, a second control command for the second device obtained from the user device) are linked and stored, the server may generate a second control command on the basis of the information obtained from the second device.

The server may estimate second information on the basis of first information obtained from the first device, the second device, or the third device, and may generate a control command according to the second information. For example, the server may estimate, on the basis of environmental information (for example, humidity information) obtained from the first device to the third device, operation information (for example, the amount of output current) of the device, and may generate a control command (for example, a control command for a nozzle voltage) according to the estimated operation information.

The server may use a database in which information obtained from the first device (or information obtained from the first sensor device) and information obtained from the second device (or information obtained from the second sensor device) are integrated. For example, the server may generate a control command for the first device or the second device, by using a database in which a first fine particle concentration obtained from the first device and a first control command obtained from the user device corresponding to the first fine particle concentration are matched and stored, and in which a second fine particle concentration obtained from the second device and a second control command obtained from the user device corresponding to the second fine particle concentration are matched and stored.

In the meantime, FIG. 34 shows as a reference the case in which the server is provided as a separate physical device. However, according to an embodiment, in the case in which the system for reducing the fine particle concentration includes the multiple devices for reducing the fine particle concentrations, any one of the devices for reducing the fine particle concentration may function as a hub device including the server, and another device for reducing the fine particle concentration may function as a peripheral.

For example, referring to FIG. 34, the first device may be a hub fine-particle concentration management device including a server, and the second device may be a peripheral fine-particle concentration management device communicating with the first device. For example, the first device may include the server, and may perform the above-described operation of the server. In other words, the first device may perform the above-described operation of the server device, such as storing information obtained from the first device, the second device, and/or the third device, transferring information to the user device by communicating with the user device, obtaining control information from the user device, generating or managing a control command for the operation of the first device and/or the second device, and controlling the operation of the first device and/or the second device. Herein, the second device may communicate with the first device, may transfer state information as first information, and may obtain a control command from the first device to operate.

The user device may obtain a user input, and may manage fine particle concentrations of multiple target regions by communicating with the server or each device of the system for reducing the fine particle concentration.

The user device may run a program, an application, a web application, or a web page for managing the fine particle concentration. The user device may manage the fine particle concentrations of the first target region and the second target region, individually.

The user device may include a display unit and/or an input unit. The user device may provide, through the display unit, the user with the information obtained from the first device, the second device, the third device, and/or the server. The user device may obtain information related to the operation of the first device, the second device, or the third device from the user through the input unit.

The user device may communicate with the server, the first device, the second device, and/or the third device. The user device may communicate with the server and may obtain first state information of the first device, first operation information of the first device, or first environmental information on the first target region. The user device may obtain information on the first device or the second device, and may transfer a first control command or a second control command generated on the basis of the obtained information to the server device.

The user device may generate a second control command for the second device considering first state information on the first device. For example, the user device may generate a control command for making the voltage applied to the nozzle of the second device or the current output from the second device higher than a default value when the amount of liquid stored in the first device or the output current is equal to or lower than a reference value.

The user device may generate a first control command and/or a second control command considering the locations of the first device and the second device. The user device may generate a first control command and/or a second control command considering the distance between the first device and the second device. For example, the user device may generate a first control command or a second control command (for example, determined such that the amount of output current have a positive correlation with the distance between the devices) for the amount of output current to be determined according to the distance between the devices.

The server or the user device may generate a control command to control the operations of the first device and the second device. The server or the user device may control the first device and the second device in conjunction with each other.

The server or the user device may control the first device and the second device such that the first device and the second device sequentially release charged particles. The server or the user device may control the first device and the second device such that the first device and the second device alternately release charged particles.

The system for reducing the fine particle concentration may include multiple devices installed in outdoor space. Hereinafter, a system for reducing fine particles will be described, the system including multiple devices.

Figure 35:
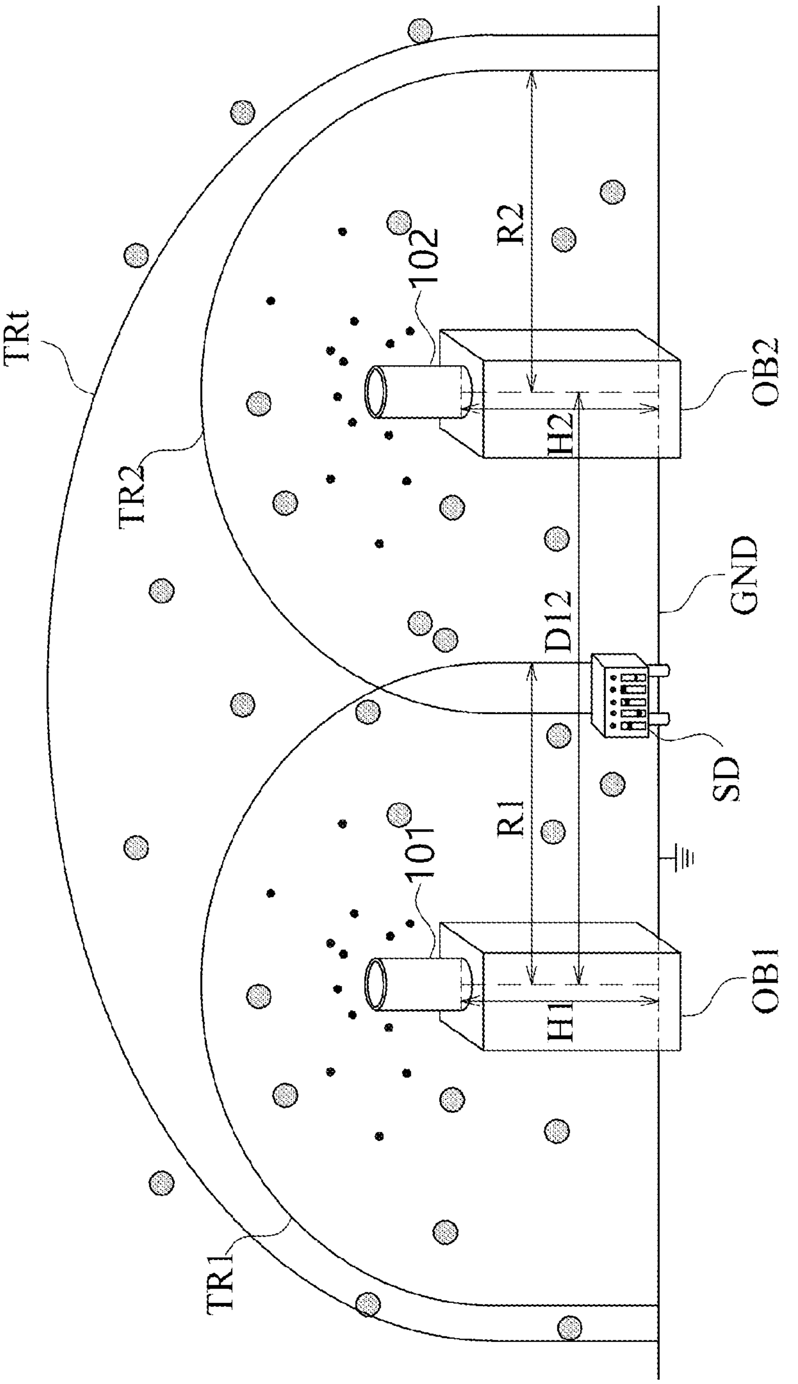
FIG. 35 is a diagram illustrating an embodiment of a system for reducing an indoor fine particle concentration.

FIG. 35 is a diagram illustrating a system for reducing a fine particle concentration according to an embodiment of the present disclosure. Referring to FIG. 35, the system for reducing the fine particle concentration according to the embodiment may use multiple devices so as to manage the fine particle concentration in a system target region (or a total target region TRt).

Referring to FIG. 35, the system for reducing the fine particle concentration according to the embodiment may include a first device 101 and a second device 102 for releasing a charged substance CS. The first device 101 and the second device 102 may form negative space charge near the devices by releasing negatively charged droplets. Referring to FIG. 34, the system for reducing fine particles may include the first device 101 and the second device 101 as two adjacent devices among multiple devices for reducing fine particle concentrations, the devices being located apart from each other.

The first device 101 or the second device 102 may include a sensor unit. According to an embodiment, the first device 101 may include a first sensor unit, and the second device 102 may include a second sensor unit.

The first device 101 and/or the second device 102 may be installed and used similarly to the device 100 described with reference to FIG. 28. The first device 101 and/or the second device 102 may operate similarly to the device 100 described above with reference to FIGS. 29 to 32. Hereinafter, unless otherwise specifically described, the details described above with reference to FIGS. 28 to 32 may be applied.

Referring to FIG. 35, the first device 101 and/or the second device 102 may be installed on predetermined structures. The installation location of the first device 101 and/or the second device 102 may be determined considering the space charge formed by each device, the form of the electric field formed by the space charge, and the surrounding terrain. The installation locations of the first device 101 and the second device 102 may be determined considering the system target region TRt of which the fine particle concentration is to be reduced, an effective radius R1 of the first device 101, and an effective radius R2 of the second device 102.

Referring to FIG. 35, the first device and the second device may be installed at a location spaced apart from the ground by a predetermined distance. The first device may be installed at a location spaced apart from the ground by a first distance H1, and the second device may be installed at a location spaced apart from the ground by a second distance H2. The first distance and the second distance may be the same. Alternatively, the first distance and the second distance may have a predetermined difference according to the surrounding terrain.

The system for reducing the fine particle concentration may manage the fine particle concentration of the system target region TRt by using the first device 101 for reducing the fine particle concentration of the first target region, and the second device 102 for reducing the fine particle concentration of the second target region.

The first device 101 may reduce the fine particle concentration of the first target region TR1. The second device 102 may reduce the fine particle concentration of the second target region TR2. The first device 101 and the second device 102 may reduce the fine particle concentration of the system target region TRt. The system target region TRt may be a target region of which the fine particle concentration is reduced by the system for reducing the fine particle concentration, the system including the multiple devices for reducing the fine particle concentrations.

The first device 101 may be a device having a first effective radius R1. The second device 102 may be a device having a second effective radius R2. The system for reducing the fine particle concentration may have a total effective radius Rt as an effective radius, the system including the first device 101 and the second device 102. The total effective radius Rt may be determined to be smaller than the sum of the first effective radius R1 and the second effective radius R2.

The first device 101 and the second device 102 may be installed spaced apart from each other by a first distance D12. For example, the first distance D12 may be determined to be smaller than the sum of the first effective radius TR1 and the second effective radius TR2. For example, when the first effective radius TR1 and the second effective radius TR2 are 30 m each, the first distance D12 is determined to be 50 m. The first effective region TR1 of the first device 101 and the second effective region TR1 of the second device 102 may at least partially overlap.

The effective radii of the first device 101 and the second device 102 and/or the distance D12 between the first device and the second device may be determined considering the efficiency of the entire system.

According to an embodiment, the power consumed by the first device 101 and the second device 102 may be less than the power consumed by a device for reducing a fine particle concentration, the device using the sum of the first radius R1 and the second radius R2 as a radius. When it is intended to reduce a fine particle concentration of a large region by using a single device, interference by external structures may be severe, and a target region in the shape of a dome is formed with the device in the center, resulting in a useless region in the sky. Therefore, in order to minimize unnecessary power consumption, multiple devices for reducing fine particle concentrations may be appropriately arranged in the system target region TRt.

Referring to FIG. 35, the system for reducing fine particles according to the embodiment may include a sensor device SD installed in the target region. The sensor device SD may be installed at a location within the system target region TRt. For example, the sensor device SD may be installed at a location spaced apart by the first effective radius R1 from the point at which the first device (or the structure on which the device is installed) is located. The sensor device SD may be located near the first device 101. The sensor device SD may be located between the first device 101 and the second device 102. For example, the sensor device SD may be located at an intermediate point between the first device 101 and the second device 102.

The sensor device may obtain environmental information of the system target region TRt, the first target region TR1, or the second target region TR2. For example, the sensor device may obtain environmental information including any one of the following: the temperature, humidity, atmospheric pressure, air current (for example, wind velocity), air quality (for example, a concentration of fine dust), and a density of space charge in the system target region TRt, the first target region TR1, or the second target region TR2. The sensor device may obtain environmental information, and may transfer the same to the first device 101, the second device 102, the server, or the user device.

In the meantime, the system for reducing the fine particle concentration may include multiple sensor devices. For example, the system for reducing fine particles may include: a first sensor device installed at a location spaced apart from the first device 101 by a first distance, and obtaining first information; and a second sensor device installed at a location spaced apart from the first device 101 by a second distance, and obtaining second information. Alternatively, the system for reducing fine particles may include: a first sensor device obtaining environmental information of the first target region TR1 corresponding to the first device 101; and a second sensor device obtaining environmental information of the second target region TR1 corresponding to the second device 102.

The system for reducing the fine particle concentration shown in FIG. 34 may operate similarly to that described with reference to FIGS. 30 to 33. The system for reducing the fine particle concentration may form space charge by supplying a charged substance CS within the system target region TRt. The system for reducing the fine particle concentration may operate the multiple devices for reducing the fine particle concentrations for a sufficient time period such that the fine particles FPs positioned in the system target region TRt are charged by the space charge, pushed out by the electric field formed by the space charge, and come into contact with the ground to be removed eventually. In addition, the system may manage the state and the environment of the fine-particle concentration reduction operation by using the sensor devices.

2.5 System for Reducing Indoor Fine Particle Concentration

2.5.1 Indoor Installation

According to an embodiment of the present disclosure, an operation of reducing a fine particle concentration may be used to reduce the fine particle concentration in indoor space.

The indoor space described in the present disclosure may mean a space having a partially different environment from the atmosphere. The indoor space described in the present disclosure does not mean only an indoor space having a ceiling, a floor, and four sides and being distinguished from the outside, and it may be understood that a semi-indoor space having at least some opened sides and being connected to the outside also corresponds to the indoor space described in the present disclosure.

The operation of reducing the fine particles concentration described in the present disclosure may be performed by the device installed in the indoor space. The device installed in the indoor space may reduce the fine particle concentration in an indoor target region. For example, the device described in the present disclosure may be installed in houses, department stores, large shopping malls, a sporting arena, indoor theaters, libraries, and the like to reduce a fine particle concentration.

2.5.2 Single-Device System

Figure 36:
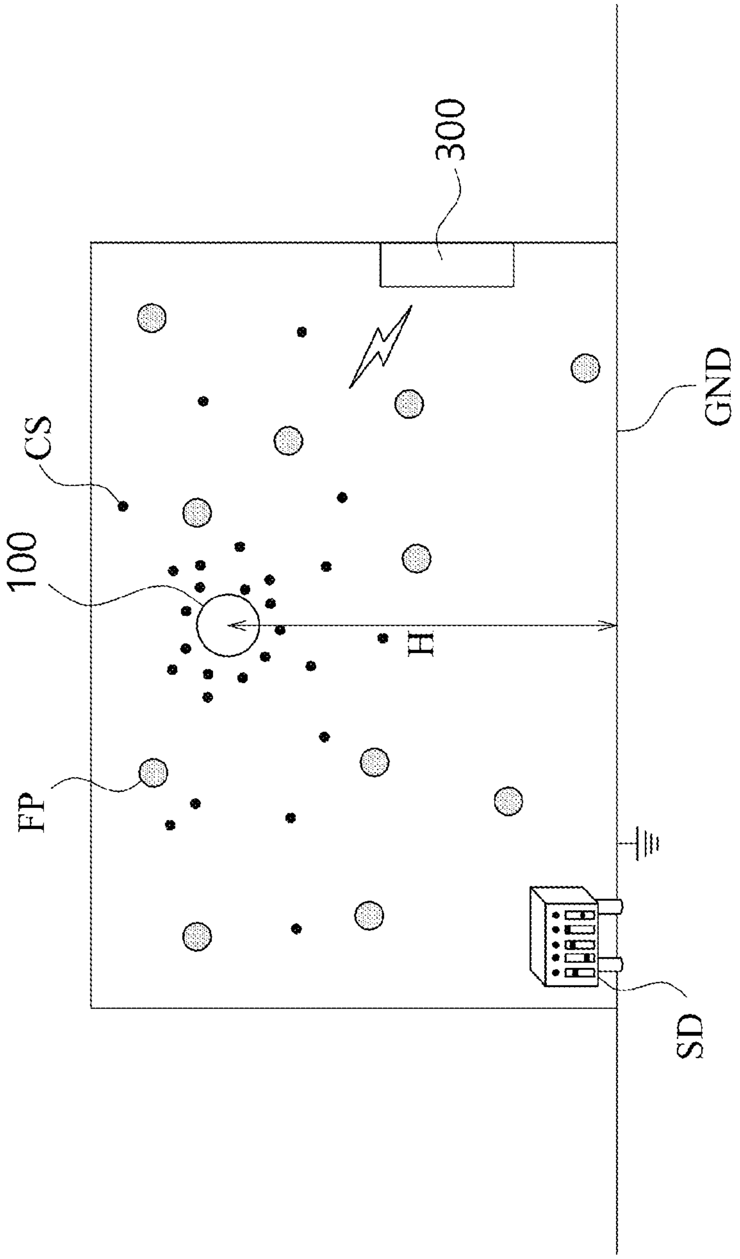
FIG. 36 is a flowchart illustrating an embodiment of a method for managing a device for reducing a fine particle concentration according to the present disclosure.

FIG. 36 is a diagram illustrating an embodiment of a system for reducing an indoor fine particle concentration.

Referring to FIG. 36, the system for reducing the fine particle concentration may include a device 100 for reducing a fine particle concentration, and a sensor device SD. In the system for reducing the indoor fine particle concentration, a target region of the device 100 for reducing the fine particle concentration may be a unit indoor space.

The device 100 for reducing the fine particle concentration may be installed at a location in the indoor space. FIG. 36 shows a case in which the device is installed close to a ceiling as an example for convenience, but the present disclosure is not limited thereto. The device 100 may be located in a region that people mainly pass through. For example, the device 100 may be installed in the air or on the floor of the indoor space. Alternatively, the device 100 may be located in a duct through which the indoor air flow passes.

The device 100 for reducing the fine particle concentration may supply a charged substance CS to the indoor space. The device 100 may supply the charged substance CS to the indoor space by releasing charged droplets. The device 100 may charge the fine particles FPs in the indoor space by supplying the charged substance CS. The device 100 may supply the charged substance CS to induce the charged fine particles FPs to move to a particular location in the indoor space and to be collected. The device 100 may supply the charged substance CS to form the space charge, and may provide electric force so that through the space charge, the charged fine particles FPs adhere to a target location, lose charges, and are removed.

The sensor device SD may obtain environmental information of the indoor space. The sensor device SD may obtain the temperature, humidity, charge density, or fine particle concentration in the indoor space. The sensor device SD and the device 100 for managing the fine particle concentration may be integrated with each other.

Referring to FIG. 36, the system for reducing the fine particle concentration may further include a central control device 300. The central control device 300 may control the operations of the device 100, the sensor device SD, and other air quality management devices installed in the space. For example, the central control device 300 may control the operation of the device 100 and the operation of an air conditioning facility, an air conditioning/heating device, an air blower, or a ventilation fan. The central control device 300 may make the operation of the device 100 cooperate with the operation of another air quality management device. For example, the central control device 300 may stop the operation of the air blower while the device 100 operates.

According to an embodiment, the system for reducing the fine particle concentration may include a dust collection module. The dust collection module may collect the fine particles FPs charged by the device 100. The dust collection module may be installed at a location in the indoor space. The dust collection module may be installed in a duct of an air conditioning system provided inside the building. The dust collection module may have an electrical property opposite to that of the charges released from the device 100. For example, when negative charges are supplied by the device 100, the dust collection module have positive (+) charges. Alternatively, a positive (+) voltage may be applied to the dust collection module. However, this does not limit the present disclosure, and the dust collection module may have a grounded dust collector.

According to an embodiment, the system for reducing the fine particle concentration may further include an air quality management device. The air quality management device may be a device for controlling the humidity, temperature, or wind direction in the indoor air. The central control device 300 may control the air quality management device to improve the operating efficiency of the device for reducing the fine particle concentration.

According to an embodiment, the air quality management device may be an air purifier having a filter. The air quality management device may suck the air in the space and may discharge the air that has passed through the filter. Herein, the air quality management device may have a dust collector functioning similarly to the dust collection module, and may collect fine particles charged by the device for reducing the fine particle concentration.

The system for reducing the fine particle concentration shown in FIG. 36 may operate similarly to that described with reference to FIGS. 30 to 33. The system for reducing the fine particle concentration shown in FIG. 36 may supply a charged substance CS to the indoor region and may charge the fine particles positioned in the indoor space. The system for reducing the fine particle concentration may reduce the concentration of fine particles floating in the indoor space, by applying an electrical effect to the charged fine particles.

In the meantime, with reference to FIG. 36, the indoor fine particle concentration reduction has been described for the indoor space having four sidewalls, the ceiling, and the floor as a reference, but the indoor fine particle concentration reduction operation described in the present disclosure may be applied to a partially opened indoor space, that is, a semi-indoor space.

For example, the fine-particle concentration reduction operation may be applied to an indoor space with an open ceiling. In addition, for example, the fine-particle concentration reduction operation may be applied to an indoor space with at least one side of the sidewalls opened.

Herein, the system for reducing the fine particle concentration may include at least one device for reducing a fine particle concentration, wherein the device is located close to the non-opened side. The system for reducing the fine particle concentration may include a device for reducing a fine particle concentration, wherein the device is located close to the non-opened side, charges fine particles in the indoor space, and provides electric force by forming space charge so that the charged fine particles adhere to some structures in the indoor space or are pushed out of the indoor space.

Alternatively, the system for reducing the fine particle concentration may include at least one device for reducing a fine particle concentration, wherein the device is located close to the opened side. The system for reducing the fine particle concentration may include a device for reducing a fine particle concentration, wherein the device is located close to the opened side, charges fine particles in the indoor space, and provides electric force by forming space charge so that the charged fine particles adhere to some structures in the indoor space or are pushed out of the indoor space.

3. METHOD OF USING DEVICE

Herein, a method of using a device for reducing a fine particle concentration described in the present disclosure will be described.

3.1 Device Installation Method

FIG. 36 is a flowchart illustrating an embodiment of a method for installing a device for reducing a fine particle concentration according to the present disclosure.

Referring to FIG. 36, the method for installing the device for reducing the fine particle concentration according to the embodiment may include: installing a structure for installing the device at step S1301, and installing the device on the installed structure at step S1303.

The installing of the structure for installing the device at step S1301 may include determining an installation location of the device. The determining of the installation location of the device may include determining the height of the location at which the device is installed, from the ground. For example, the installation location of the device may be determined on the basis of the effective radius of the device.

The installing of the structure for installing the device at step S1301 may include providing the structure offering an electrical or magnetic stability. Considering that the device described in the present disclosure releases a charged substance to reduce the fine particle concentration, the environment or structure on which the device is installed may be provided to have electrically or magnetically stable properties. For example, the structure may be provided to have an at least partially insulated section. Alternatively, the structure may be made of an at least partially non-magnetic material.

According to an embodiment, the installing of the structure for installing the device at step S1301 may include installing the structure for installing the device for reducing fine dust, at a first location spaced apart from the ground surface by a first distance.

According to an embodiment, the structure on which the device installed may have a first terminal and a second terminal that is in contact with the device for reducing fine dust. The structure may include an at least partially electrically insulated section between the first terminal and the second terminal. The structure may be electrically grounded via the first terminal. The structure may be in contact with the ground surface via the first terminal. The structure may be fixed to other objects in the building via the first terminal. Between the device and the second terminal at which the structure and the device meet, an insulated section may be located. The first terminal and the second terminal may be spaced apart from each other by a predetermined distance.

The installing of the device on the structure may include installing the device such that a first side of the device is in contact with the structure. The device may include the first side at which the liquid storage container is located, and a second side at which the nozzle is located. Herein, the installing of the device on the structure may include installing the device such that the first side at which the liquid storage container is located is in contact with the structure.

For example, when the device is installed on the structure to establish the system for the outdoor fine particle concentration, the device may be installed in the building such that the first side at which the liquid storage container is located is positioned relatively close to the building and the second side at which the nozzle is located is positioned relatively far from the building.

As another example, when the device is installed on the structure to establish the system for the indoor fine particle concentration, the device may be installed at a location in the indoor space such that the first side at which the liquid storage container is located is positioned relatively close to the inner wall and the second side at which the nozzle is located is positioned relatively far from the inner wall.

The installing of the device on the structure may include positioning the device such that the nozzle of the device faces in the direction perpendicular to the ground. The installing of the device on the structure may include positioning the device such that the nozzle of the device faces in the direction parallel to the ground. In the case in which the device includes multiple nozzles, the device may be positioned such that at least one nozzle of the multiple nozzles is in the direction perpendicular to the ground or parallel to the ground.

The installing of the device on the structure may include installing the device such that the device is close to the second terminal among the first terminal and the second terminal of the structure. The installing of the device on the structure may include installing the device such that the device in installed at the second terminal facing the first terminal of the structure which is in contact with the ground surface.

The installing of the device on the structure may include installing the device such that the device protrudes from the structure. The installing of the device on the structure may include installing the device such that the device protrudes to a sidewall of the structure (for example, a target building) in a direction, for example, a direction perpendicular to the sidewall.

The installing of the device on the structure may include installing the device on multiple structures. For example, the installing of the device may include installing the device on the multiple structures or between the multiple structures such that the device is supported by the multiple structures.

According to an embodiment, the method for reducing the fine particle concentration may further include connecting a liquid path to the device. The device for reducing the fine particle concentration may operate using a cartridge in which liquid is stored in advance or a direct liquid supply method. When the device operates using the direct liquid supply method, the method for installing the device for reducing the fine particle concentration may further include connecting, to the device, the liquid path provided at least partially passing through the structure.

3.2 Device Management Method

Figure 38:
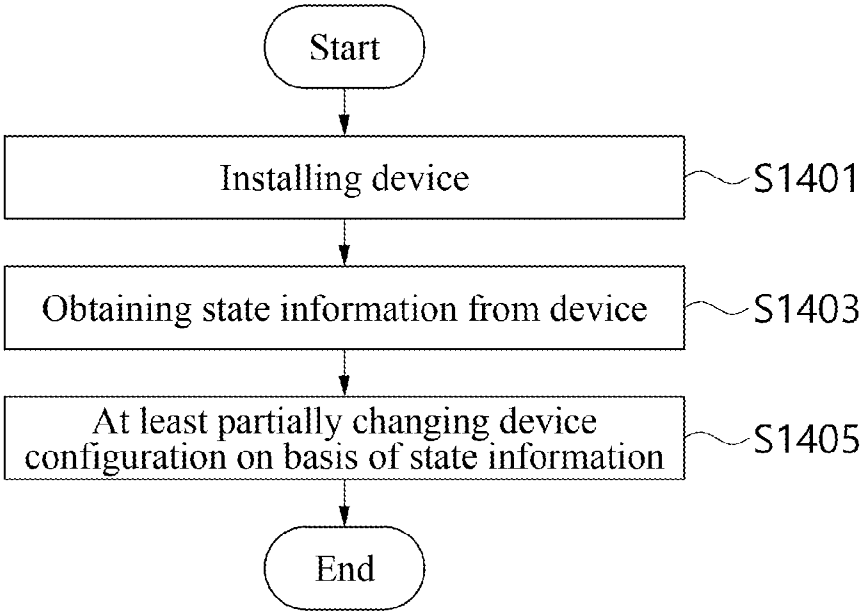
FIG. 38 is a flowchart illustrating an embodiment of a method for managing a device for reducing a fine particle concentration according to the present disclosure.

FIG. 38 is a flowchart illustrating an embodiment of a method for managing a device for reducing a fine particle concentration according to the present disclosure.

Referring to FIG. 38, the method for managing the device for reducing the fine particle concentration according to the embodiment may include: installing the device at step S1301, obtaining state information from the device at step S1303, and at least partially changing the device configuration on the basis of the state information at step S1305.

Figure 37:
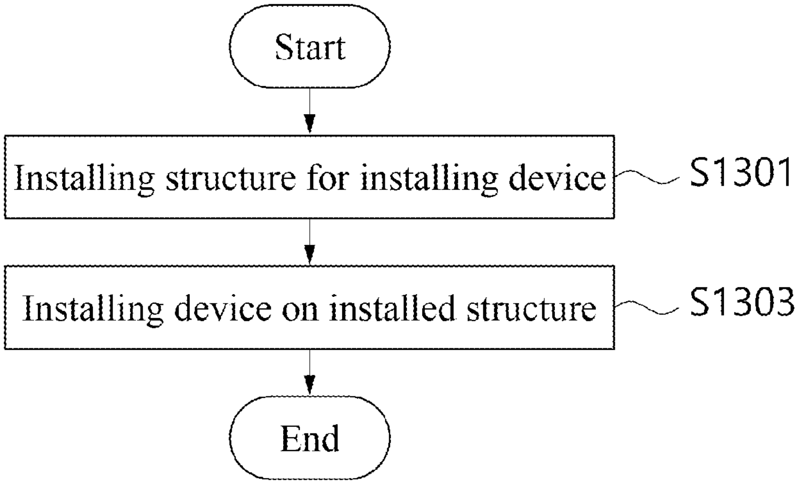
FIG. 37 is a flowchart illustrating an embodiment of a method for managing a device for reducing a fine particle concentration according to the present disclosure.

The installing of the device may be realized similarly to that described above with reference to FIG. 37. The installing of the device may include installing the device in a first state. The installing of the device may include inserting, into the device, a first liquid storage container having a first capacity of liquid. The installing of the device may include inserting, into the device, a first cartridge having a first capacity of liquid. The installing of the device may include connecting a liquid pipe to the device and supplying liquid to the nozzle of the device through the liquid path.

The obtaining of the state information from the device may include obtaining a liquid supply state of the device. The obtaining of the state information from the device may include obtaining the amount of liquid in the cartridge included in the device. The obtaining of the state information from the device may include obtaining the amount of liquid supplied to the nozzle of the device.

The at least partially changing of the device configuration on the basis of the state information may include changing the liquid supply state of the nozzle. For example, the at least partially changing of the device configuration on the basis of the state information may include changing the first cartridge to a second cartridge when the amount of liquid contained in the first cartridge is equal to or smaller than a predetermined ratio of the first capacity. Alternatively, the at least partially changing of the device configuration on the basis of the state information may include supplying the liquid to the first liquid storage container. Alternatively, the at least partially changing of the device configuration on the basis of the state information may include replacing the nozzle or nozzle array of the device.

Although embodiments have been described and shown, various modifications and variations are possible from the above description by those of skilled in the art. For example, although the described techniques are performed in a different order than the described method, and/or the elements of the described system, structure, apparatus, and circuit are coupled or combined in a different form that the described method, or replaced or substituted by other elements or equivalents, appropriate results may be achieved.

Therefore, other implementations, embodiments, and equivalents to the claims are also within the scope of the following claims.

What is claimed is:

1. A device installed in open space for managing a concentration of fine particles in a target region in the open space by supplying electrons to the target region, the device comprising:

a container configured to store water;

at least one nozzle configured to output the water to the open space;

a pump configured to supply the water from the container to the at least one nozzle;

a power supply configured to supply power to the device; and a controller configured to apply a negative voltage to the at least one nozzle by using the power supply such that:

the electrons are supplied to the target region in the open space by providing negatively charged droplets through the at least one nozzle, and electrical field is formed between the at least one nozzle and a surrounding terrain feature where the device is installed, wherein the surrounding terrain feature functions as a counter electrode of the at least one nozzle, wherein the controller is configured to:

apply the negative voltage equal to or greater than a first reference value to the at least one nozzle, wherein the applying of the negative voltage equal to or greater than the first reference values to the at least one nozzle allows the concentration of the fine particles in the target region to be decreased to a reference ratio within a reference time period, supply the stored water from the container to the at least one nozzle such that the stored water is transformed into negatively charged droplets, and provide the negatively charged droplets to the target region in the open space through the at least one nozzle, allowing the fine particles existing in the target region to be negatively charged such that the fine particles can be pushed outwards due to an electrical field between the at least one nozzle and the surrounding terrain feature and spatial electric field formed by the negatively charged fine particles, the negatively charged droplets and the electrons, wherein the negatively charged droplets supplies the electrons to the target region in the open space when the negatively charged droplets are evaporated or fissioned, wherein fine particles in the target region in the open space are charged by the electrons, wherein the spatial electric field induced by the negatively charged fine particles, the negatively charged droplets and the electrons have a non-uniform charge density between the at least one nozzle and the surrounding terrain feature such that the non-uniform charge density provides a driving force for pushing the fine particles outwards.

2. The device of claim 1, wherein the controller is configured to, by supplying the electrons to the target region for more than a predetermined time period, maintain the spatial electric field formed by the electrons, the negatively charged droplets and the negatively charged fine particles for more than the predetermined time period.

3. The device of claim 1, wherein the first reference value is configured to output a current from 10 μA to 10 mA through the at least one nozzle.

4. The device of claim 1, wherein the controller is further configured to determine a second reference value to prevent discharge of a charge from the nozzle, wherein the voltage equal to or less than a second reference value and equal to or greater than the first reference value.

5. A method for managing a concentration of fine particles in a target region in open space by using a device installed in open space, supplying electrons to the target region, wherein the device comprises a container configured to store water, at least one nozzle configured to output the water to the open space, a pump configured to supply the water from the container to the at least one nozzle, a power supply configured to supply power and a controller configured to supply charges to the target region in the open space through the at least one nozzle by using the power supply, the method comprising:

applying, by the controller, a negative voltage equal to or greater than a first reference value to the at least one nozzle by using the power supply, wherein the applying of the negative voltage equal to or greater than the first reference values to the at least one nozzle allows the concentration of the fine particles in the target region to be decreased to a reference ratio within a reference time period;

supplying, by the controller, the water to the at least one nozzle by using the pump such that the stored water is transformed into negatively charged droplets;

outputting, by the controller, the negatively charged droplets through the at least one nozzle by using the power supply and the pump such that the negatively charged droplets supplies the electrons to the target region in the open space when the negatively charged droplets are evaporated or fissioned; and charging, by the controller, the fine particles in the target region by the supplied electrons, wherein spatial electric field induced by the negatively charged fine particles, the negatively charged droplets and the electrons have a non-uniform charge density between the at least one nozzle and a surrounding terrain feature such that the non-uniform charge density provides a driving force for pushing the fine particles outwards.

6. The method of claim 5, wherein the method further comprises:

maintaining, by the controller, the spatial electric field formed by the electrons, the negatively charged droplets and the negatively charged fine particles by supplying the electrons to the target region for more than a predetermined time period.

* * * * *